United States Patent
Ouchi et al.

(10) Patent No.: US 9,854,576 B2
(45) Date of Patent: Dec. 26, 2017

(54) TERMINAL DEVICE, BASE STATION APPARATUS, AND METHOD

(71) Applicant: Sharp Kabushiki Kaisha, Osaka-shi, Osaka (JP)

(72) Inventors: Wataru Ouchi, Osaka (JP); Kazuyuki Shimezawa, Osaka (JP); Toshizo Nogami, Osaka (JP); Naoki Kusashima, Osaka (JP); Kimihiko Imamura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/106,337

(22) PCT Filed: Dec. 22, 2014

(86) PCT No.: PCT/JP2014/083982
§ 371 (c)(1),
(2) Date: Jun. 20, 2016

(87) PCT Pub. No.: WO2015/098880
PCT Pub. Date: Jul. 2, 2015

(65) Prior Publication Data
US 2017/0034808 A1 Feb. 2, 2017

(30) Foreign Application Priority Data
Dec. 27, 2013 (JP) .................. 2013-270654

(51) Int. Cl.
*H04W 72/04* (2009.01)
*H04W 52/22* (2009.01)
*H04W 52/38* (2009.01)
*H04W 52/14* (2009.01)
*H04W 52/28* (2009.01)

(52) U.S. Cl.
CPC ........ *H04W 72/042* (2013.01); *H04W 52/14* (2013.01); *H04W 52/221* (2013.01); *H04W 52/226* (2013.01); *H04W 52/38* (2013.01); *H04W 52/146* (2013.01); *H04W 52/286* (2013.01)

(58) Field of Classification Search
CPC . H04W 72/042; H04W 52/14; H04W 52/221; H04W 52/226
See application file for complete search history.

(56) References Cited

PUBLICATIONS

Motorola Mobility: "Finalization for Introducing Rel-11 features", 3GPP TSG-RAN WG1 Meeting #71 R1-125404, Dec. 1, 2012 (Dec. 1, 2012), pp. 1-151, XP050663246.*
Official Communication issued in International Patent Application No. PCT/JP2014/083982, dated Mar. 24, 2015.
Motorola Mobility, "Introduction of Rel-12 LTE-Advanced features in 36.213", 3GPP TSG-RAN WG1 Meeting #76-BIS, R1-141736, Mar. 31-Apr. 4, 2014, pp. 1-189.

(Continued)

*Primary Examiner* — Siming Liu
(74) *Attorney, Agent, or Firm* — Keating & Bennett, LLP

(57) ABSTRACT

There is provided a terminal device (2) which communicates with a base station apparatus (1). In a case where a PDCCH for a serving cell of frame structure type 2 is monitored in a serving cell of frame structure type 1, a TPC command included in the PDCCH is received based on a predetermined value.

8 Claims, 9 Drawing Sheets

(56) References Cited

PUBLICATIONS

Huawei et al., "Potential solutions of TDD-FDD joint operation", 3GPP TSG RAN WG1 Meeting #74, R1-132886, Aug. 19-23, 2013, 6 pages.
"3rd Generation Partnership Project; Technical Specification Group Radio Access Network; Evolved Universal Terrestrial Radio Access (E-UTRA); Physical Channels and Modulation (Release 8)," 3GPP TS 36.211 V8.8.0, Sep. 2009, pp. 1-83.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.10.0, Jun. 2013, pp. 1-194.
"3rd Generation Partnership Project; Technical Specification Group Radio Access Network; Evolved Universal Terrestrial Radio Access (E-UTRA); Physical layer procedures (Release 11)," 3GPP TS 36.213 V11.1.0, Dec. 2012, pp. 1-160.

\* cited by examiner

FIG. 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Legend: S Special subframe | U Uplink subframe | D Downlink subframe

FIG. 7

| UL-reference UL/DL configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | 7 | 4 | - | - | 6 | 7 | 4 |
| 1 | - | - | 6 | 4 | - | - | - | 6 | 4 | - |
| 2 | - | - | 4 | - | - | - | - | 4 | - | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

FIG. 8

| DL-reference UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

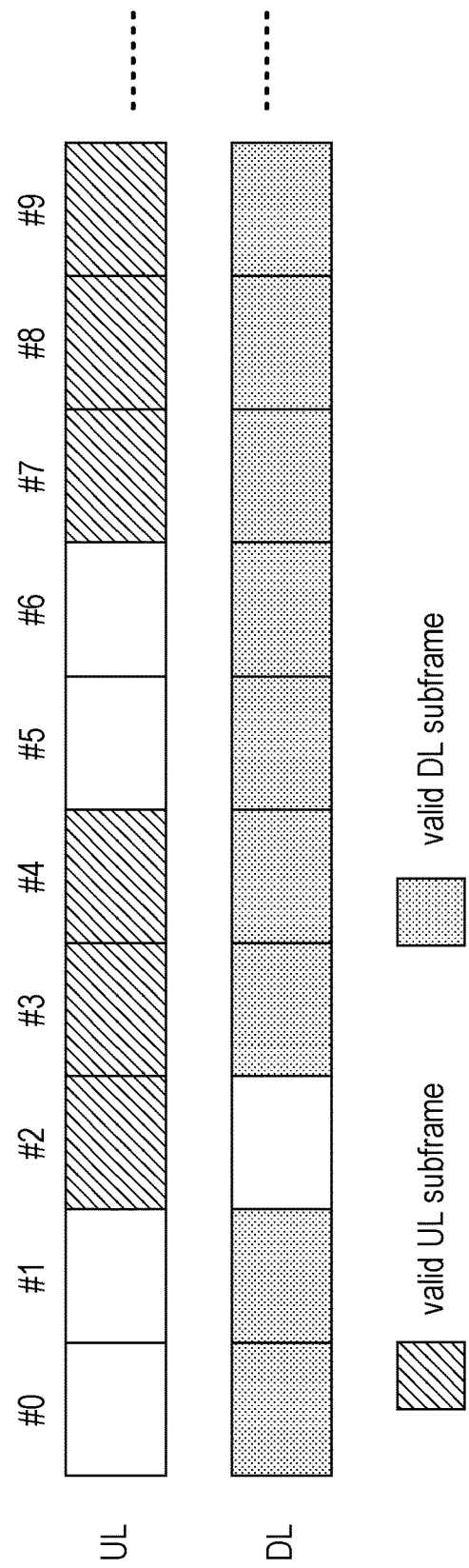

TERMINAL DEVICE, BASE STATION APPARATUS, AND METHOD

TECHNICAL FIELD

The present invention relates to a terminal device, a base station apparatus, and a method.

This application is based upon and claims the benefit of priority of the prior Japanese Patent Application No. 2013-270654, filed on Dec. 27, 2013, the entire contents of which are incorporated herein by reference.

BACKGROUND ART

A base station apparatus (a cell, a first communication apparatus (communication apparatus different from a terminal device), and eNodeB), and a terminal device (a mobile terminal, a mobile station apparatus, a second communication apparatus (communication apparatus different from the base station apparatus), user equipment (UE), and a user device) are included in a communication system such as Wideband Code Division Multiple Access (WCDMA) (registered trademark), Long Term Evolution (LTE), and LTE-Advanced (LTE-A) by Third Generation Partnership Project (3GPP), and a Wireless Local Area Network (WLAN), and Worldwide Interoperability for Microwave Access (Wi-MAX) by The Institute of Electrical and Electronics engineers (IEEE). Each of the base station apparatus and the terminal device includes a plurality of transmit/receive antennae. The base station apparatus and the terminal device perform spatial multiplexing on a data signal by using a Multi Input Multi Output (MIMO) technology, and thus high-speed data communication is realized.

In 3GPP, in order to realize high-speed data communication between the base station apparatus and the terminal device, carrier aggregation (CA) in which simultaneous communication is performed by using a plurality of component carriers is employed (NPL 1).

In 3GPP, as a frame structure type of a bi-directional communication scheme (duplex communication scheme), frequency division duplex (FDD) and time division duplex (TDD) are employed. In FDD, a full duplex scheme in which bi-directional communication can be simultaneously performed, and a half duplex scheme in which uni-directional communication is switched and thus the bi-directional communication is realized are employed (NPL 2). There is also a case where LTE employing the TDD is referred to as TD-LTE or LTE TDD.

In 3GPP, TDD-FDD carrier aggregation (TDD-FDD CA) in which a component carrier (TDD carrier) which supports the TDD, and a component carrier (FDD carrier) which supports the FDD are integrated and communication is performed is examined (NPL 3).

CITATION LIST

Non Patent Literature

NPL 1: 3rd Generation Partnership Project Technical Specification Group Radio Access Network; Evolved Universal Terrestrial Radio Access (E-UTRA) and Evolved Universal Terrestrial Radio Access Network (E-UTRAN); Overall description; Stage 2 (Release 10), T536.300 v10.10.0 (2013-06).

NPL 2: 3rd Generation Partnership Project Technical Specification Group Radio Access Network; Evolved Universal Terrestrial Radio Access (E-UTRA); Physical Channels and Modulation (Release 8), T536.211 v8.8.0 (2009-09).

NPL 3: "Potential solutions of TDD-FDD joint operation", R1-132886, 3GPP TSG-RAN WG1 Meeting #74, Barcelona, Spain, 19-23 Aug. 2013.

SUMMARY OF INVENTION

Technical Problem

There is a problem in that appropriate communication is not performed because a processing delay is increased by performing carrier aggregation of a TDD carrier and an FDD carrier.

Considering the above problem, an object of an aspect of the present invention is to provide a terminal device, a base station apparatus, and a method which allow appropriate communication.

Solution to Problem (1) The invention has been made for solving the above-described problem. According to an aspect of the present invention, there is provided a terminal device which communicates with a base station apparatus. The terminal device includes a transmission unit that sets transmission power for transmission of a physical uplink shared channel (PUSCH) in a subframe i, in a certain serving cell. The transmission unit sets the transmission power for the transmission of the PUSCH, by using a value which is obtained by a transmission power control (TPC) command included in a physical downlink control channel (PDCCH) which is received in a subframe (i-$K_{PUSCH}$). A value of $K_{PUSCH}$ for a serving cell of frame structure type 1 is 4. The value of $K_{PUSCH}$ is given in accordance with an uplink reference UL/DL configuration for a serving cell of frame structure type 2. In a case where a PDCCH for the serving cell of the frame structure type 2 is monitored in the serving cell of the frame structure type 1, the uplink reference UL/DL configuration for the serving cell of the frame structure type 2 corresponds to a UL/DL configuration for the serving cell of the frame structure type 2.

(2) In the terminal device according to the aspect of the present invention, the value of $K_{PUSCH}$ is specified based on a value of a UL index, in a case where the UL/DL configuration for the serving cell of the frame structure type 2 is 0, and the UL index is included in the PDCCH.

(3) In the terminal device according to the aspect of the present invention, the value of KPUSCH is specified based on the uplink reference UL/DL configuration for the serving cell of the frame structure type 2, in a case where a specific radio network temporary identifier (RNTI) is configured for at least one serving cell.

(4) In the terminal device according to the aspect of the present invention, a downlink control information (DCI) format included in the PDCCH is constituted based on the serving cell of the frame structure type 2.

(5) According to another aspect of the present invention, there is provided a base station apparatus which includes a transmission unit. The transmission unit transmits a physical downlink control channel (PDCCH) including a transmission power control (TPC) command to a certain serving cell in a subframe (i-$K_{PUSCH}$), and performs scheduling of transmission of the PUSCH in the subframe i for the serving cell. A value of $K_{PUSCH}$ for a serving cell of frame structure type 1 is 4. The value of $K_{PUSCH}$ is given in accordance with an uplink reference UL/DL configuration for a serving cell of frame structure type 2. In a case where a PDCCH for the serving cell of the frame structure type 2 is monitored in the serving cell of the frame structure type 1, the uplink reference UL/DL configuration for the serving cell of the frame structure type 2 corresponds to a UL/DL configuration for the serving cell of the frame structure type 2.

(6) According to still another aspect of the present invention, there is provided a method in a terminal device which communicates with a base station apparatus. The method includes a step of setting transmission power for transmission of a physical uplink shared channel (PUSCH) in a subframe i, in a certain serving cell, and a step of setting the transmission power for the transmission of the PUSCH, by using a value which is obtained by a transmission power control (TPC) command included in a physical downlink control channel (PDCCH) which is received in a subframe (i-$K_{PUSCH}$). A value of $K_{PUSCH}$ for a serving cell of frame structure type 1 is 4. The value of $K_{PUSCH}$ is given in accordance with an uplink reference UL/DL configuration for a serving cell of frame structure type 2. In a case where a PDCCH for the serving cell of the frame structure type 2 is monitored in the serving cell of the frame structure type 1, the uplink reference UL/DL configuration for the serving cell of the frame structure type 2 corresponds to a UL/DL configuration for the serving cell of the frame structure type 2.

(7) In the aspect of the present invention, the method further includes a step of specifying the value of $K_{PUSCH}$ based on a value of a UL index, in a case where the UL/DL configuration for the serving cell of the frame structure type 2 is 0, and the UL index is included in the PDCCH.

(8) In the aspect of the present invention, the method further includes a step of specifying the value of $K_{PUSCH}$ based on the uplink reference UL/DL configuration for the serving cell of the frame structure type 2, in a case where a specific radio network temporary identifier (RNTI) is configured for at least one serving cell.

With the above configuration, the terminal device and the base station apparatus can perform appropriate transmission power control.

Advantageous Effects of Invention

According to any aspect of the invention, in a communication system in which a base station apparatus and a terminal device communicate with each other, the terminal device performs appropriate transmission control and reception control, and thus it is possible to improve communication efficiency.

BRIEF DESCRIPTION OF DRAWINGS

FIG. 3 is a schematic block diagram illustrating a configuration of a subframe pattern in a TDD UL/DL configuration.

FIG. 7 illustrates an example of a value of $K_{PUSCH}$ corresponding to an uplink reference UL/DL configuration.

FIG. 8 illustrates an example of a downlink association set index corresponding to a downlink reference UL/DL configuration.

FIG. 9 illustrates an example of a valid subframe in a case where a reference UL/DL configuration is applied to each of an uplink/downlink of an FDD cell.

DESCRIPTION OF EMBODIMENTS

Figure 1:
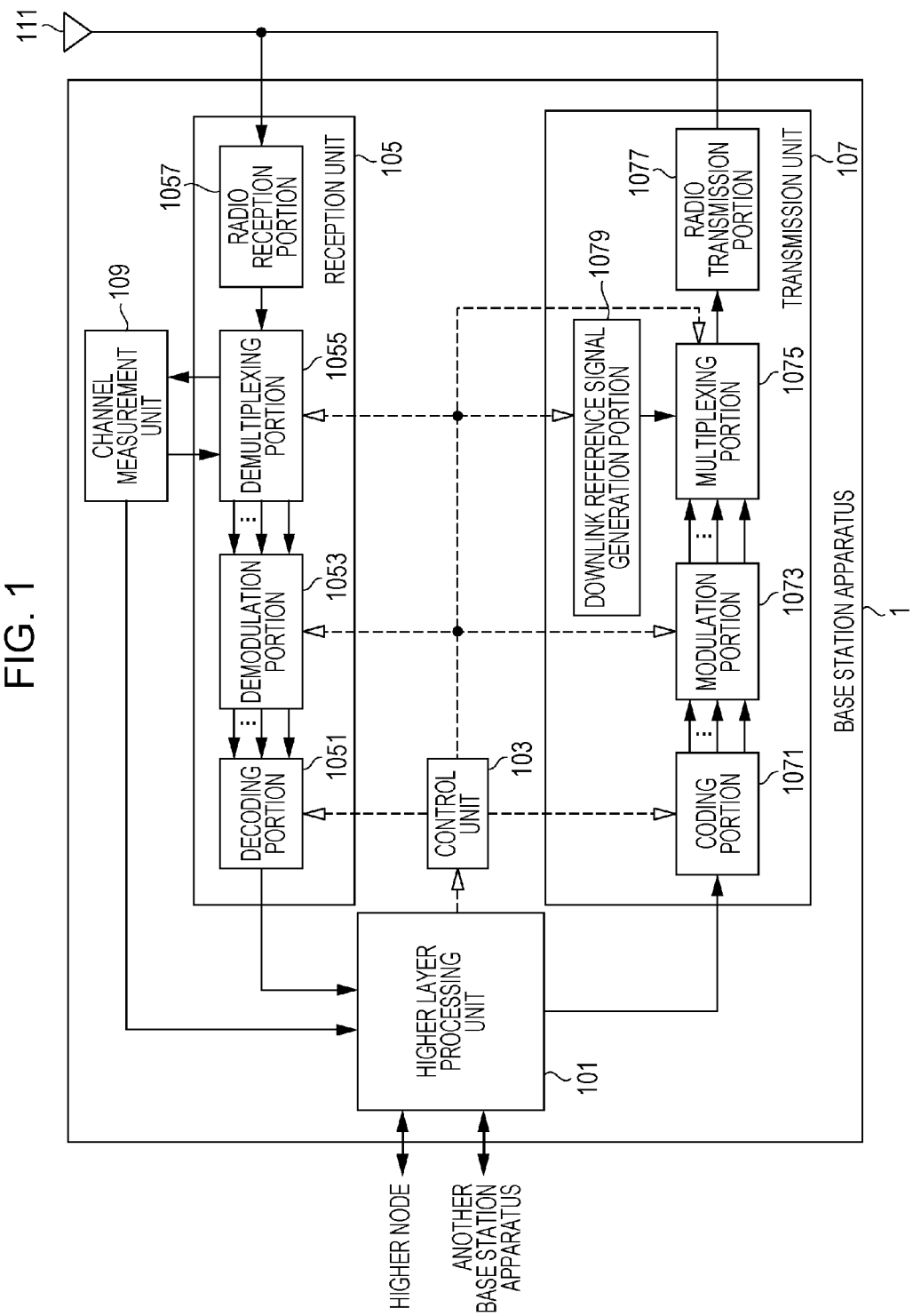
FIG. 1 is a schematic block diagram illustrating a configuration of a base station apparatus 1 according to an embodiment of the present invention.

In a communication system of an embodiment, carrier aggregation in which a plurality of component carriers is integrated so as to perform communication is applied. Because a cell may be configured by using a component carrier, the carrier aggregation may be referred to as cell aggregation. That is, the communication system according to the embodiment may perform communication by using integration of a plurality of cells. In the communication system according to the embodiment, the cell aggregation integrates a cell (TDD cell) to which a TDD scheme is applied, and a cell (FDD cell) to which an FDD scheme is applied, among the plurality of cells, and performs communication. That is, in the communication system according to the embodiment, the cell aggregation is applied in a plurality of cells in which a different frame structure type is configured. The frame structure type may be referred to as duplex mode. In LTE and LTE-A, frame structure type 1 is defined as the FDD, and frame constitution type 2 is defined as the TDD. Regarding the duplex mode, FDD and TDD are described. However, even when a third duplex mode (XDD) or a fourth duplex mode (YDD) is added, the embodiment may be applied.

In the cell aggregation, one primary cell and one or more secondary cells are integrated so as to perform communication. The primary cell may be configured by using an uplink component carrier and a downlink component carrier. On the contrary, the secondary cell may be configured by using only a downlink component carrier.

A plurality of configured serving cells (plurality of configured cells) includes one primary cell and one or a plurality of secondary cells. The primary cell is a serving cell in which initial connection establishment procedure is performed, a serving cell in which connection reestablishment procedure is started, or a cell instructed as a primary cell in a handover procedure. The secondary cell may be configured at a point of time when or after RRC connection is established between a base station apparatus 1 (or serving cell) and a terminal device 2. A plurality of serving cells may be constituted by one base station apparatus 1, and a plurality of serving cells may be constituted by a plurality of base station apparatuses 1. One serving cell may be constituted by a plurality of base station apparatuses 1.

A frequency band in an uplink and a downlink (UL/DL operating band) and a duplex mode (TDD, FDD) are correlated with one index. The frequency band in an uplink and a downlink (UL/DL operating band) and the duplex mode are managed on one table. This index may be also referred to as an E-UTRA operating band, an E-UTRA band, or a band. For example, Index 1 may be also referred to as Band 1, Index 2 may be also referred to as Band 2, and Index n may be also referred to as Band n. For example, in Band 1, an uplink operating band is from 1920 MHz to 1980 MHz, a downlink operating band is from 2110 MHz to 2170 MHz, and the duplex mode is FDD. In Band 33, the uplink and downlink operating band is from 1900 MHz to 1920 MHz, and the duplex mode is TDD.

In the E-UTRA operating band, a new uplink and downlink frequency band may be configured, and a new duplex mode may be correlated.

A combination (E-UTRA CA Band) of bands in which performing carrier aggregation is possible may be configured. For example, the carrier aggregation performed by using component carriers in Band 1 and Band 5 may be indicated to be possible. That is, it may be indicated whether or not the carrier aggregation is performed by using component carriers in bands different from each other.

A combination of a band supported by a terminal device 2, and a band in which performing the carrier aggregation is possible is configured in function information (UE capability, UE-EUTRA-Capability) of the terminal device 2. The base station apparatus 1 can recognize a function included in the terminal device 2 by the terminal device 2 transmitting the function information.

The present invention may be applied to some of a plurality of configured cells. A cell configured in the terminal device 2 may be also referred to as a serving cell.

TDD is a technology in which time division multiplexing is performed on an uplink signal and a downlink signal, and thus communication between an uplink and a downlink is allowed in a single frequency band (carrier frequency, component carrier). In LTE, configuration is performed in advance, and thus a downlink and an uplink may be switched in a subframe unit. In TDD, a subframe (downlink subframe, and subframe reserved for downlink transmission) in which downlink transmission is allowed, and a subframe (uplink subframe, and subframe reserved for uplink transmission) in which uplink transmission is allowed, and further a guard period (GP) are configured, and thus a subframe (special subframe) in which downlink transmission and uplink transmission can be switched in a time region (symbol region) is defined. In a special subframe, a time region (symbol corresponding to the time region) in which downlink transmission is allowed is referred to as a downlink pilot time slot (DwPTS), and a time region (symbol corresponding to the time region) in which uplink transmission is allowed is referred to as an uplink pilot time slot (UpPTS). For example, in a case where a subframe i is a downlink subframe in the terminal device 2, a downlink signal transmitted from the base station apparatus 1 can be received. In a case where a subframe j different from the subframe i is an uplink subframe, an uplink signal can be transmitted from the terminal device 2 to the base station apparatus 1. In a case where a subframe k which is different from the subframe i or the subframe j is a special subframe, a downlink signal can be received in a downlink time region DwPTS, and an uplink signal can be transmitted in an uplink time region UpPTS.

In order to perform communication by using the TDD scheme in LTE and LTE-A, notification is performed by using a specific information element (TDD UL/DL configuration (TDD UL/DL configuration(s), TDD uplink-downlink configuration(s)), TDD configuration (TDD configuration(s), tdd-Config, TDD config), and UL/DL (UL-DL) configuration (uplink-downlink configuration(s))). The terminal device 2 may consider a certain subframe as any one of an uplink subframe, a downlink subframe, and a special subframe, based on notified information, and may perform transmission and reception processing. The TDD UL/DL configuration may be referred to as subframe configuration (subframeConfig) or subframe assignment (subframeAssignment). FIG. 3 illustrates an example of the TDD UL/DL configuration. FIG. 3 illustrates a correspondence relationship between a subframe pattern and an index (or value, parameter). The subframe pattern is constituted by a downlink subframe, a special subframe, and an uplink subframe. In a case where the base station apparatus 1 performs communication by using a specific TDD UL/DL configuration, the base station apparatus 1 transmits an index corresponding to the specific TDD UL/DL configuration to the terminal device 2.

Regarding a constitution of a special subframe (DwPTS, UpPTS, and length of GP in the special subframe), a plurality of patterns is defined, and is managed in a manner of a table. The plurality of patterns is correlated with values (indices), and notification of the value corresponding to the pattern is performed, and thus the terminal device performs processing of the special subframe. That is, the terminal device 2 may be notified of information (specialSubframe-Patterns) regarding a constitution of the special subframe, from the base station apparatus 1 by higher layer signaling or by using system information (system information block). In a case where a function of expanding the constitution of the special subframe is supported in the terminal device 2, the base station apparatus 1 is notified of function information (tdd-specialsubframe) regarding the expansion, and thus a constitution of a new special subframe may be added and used.

A traffic adaptive control technology in which a ratio of an uplink resource and a downlink resource is changed in accordance with traffic of an uplink and traffic of a downlink (information quantity, data quantity, and communication volume) may be applied to TDD. For example, a ratio of a downlink subframe and an uplink subframe may be dynamically changed. Regarding a certain subframe, the downlink subframe and the uplink subframe may be adaptively switched. Such a subframe is referred to as a flexible subframe. The base station apparatus 1 can receive an uplink signal or transmit a downlink signal in a flexible subframe, in accordance with a condition (situation). The terminal device 2 may perform reception processing considering a flexible subframe as the downlink subframe, as long as the base station apparatus 1 does not perform an instruction of transmission of an uplink signal in the flexible subframe. Such TDD in which the ratio of the downlink subframe and the uplink subframe, subframes of the uplink and the downlink, or the TDD UL/DL (re)configuration is dynamically changed may be also referred to as dynamic TDD (DTDD) or enhanced interference mitigation and traffic adaptation (eIMTA). For example, TDD UL/DL configuration information may be transmitted through L1 signaling.

FDD is a technology in which communication between a downlink and an uplink is allowed different frequency bands (carrier frequencies, component carriers). In other words, in FDD, a component carrier for a downlink is different from a component carrier for an uplink.

As the communication system, a cellular communication system in which a plurality of areas which are covered by the base station apparatus 1 and have a cell shape is disposed may be applied. A single base station apparatus 1 may manage a plurality of cells. A single base station apparatus 1 may manage a plurality of remote radio heads (RRHs). A single base station apparatus 1 may manage a plurality of local areas. A single base station apparatus 1 may manage a plurality of heterogeneous networks (HetNets). A single base station apparatus 1 may manage a plurality of low power base station apparatuses (LPN: Low Power Node).

In the communication system, the terminal device 2 measures reference signal received power (RSRP) based on a cell-specific reference signal(s) (CRS).

In the communication system, communication may be performed by using carriers (component carriers) in which some of physical channels or signals defined in LTE are not mapped. Here, such a carrier is referred to as a new carrier type (NCT). For example, in the new carrier type, a cell-specific reference signal, a physical downlink control channel, or a synchronization signal (primary synchronization signal, secondary synchronization signal) may be not mapped. In a cell in which the new carrier type is configured, application of a physical channel (PDCH: Physical Discovery Channel, NDS: New Discovery Signal(s), DRS: Discovery Reference Signal, and DS: Discovery Signal) for measuring mobility or detecting time/frequency synchronization is examined. The NCT may be also referred to as an additional carrier type (ACT). Regarding the NCT, a known carrier type may be also referred to as a legacy carrier type (LCT).

In the embodiment of the present invention, "X/Y" includes a meaning of "X or Y". In the embodiment of the present invention, "X/Y" includes a meaning of "X and Y". In the embodiment of the present invention, "X/Y" includes a meaning of "X and/or Y".

(Physical Channel)

The main physical channel (or physical signal) used in LTE and LTE-A will be described. The channel means a medium used in transmission of a signal. The physical channel means a physical medium used in transmission of a signal. The physical channel may be added after now, or the structure or a format type thereof may be changed or added in LTE and LTE-A, and release of the subsequent standard. However, even when such a case occurs, the case does not influence the descriptions for the embodiment of the present invention.

In LTE and LTE-A, scheduling of the physical channel is managed by using a radio frame. One radio frame is 10 ms and one radio frame is constituted by 10 subframes. Further, one subframe is constituted by 2 slots (that is, one slot is 0.5 ms). The scheduling is managed by using a resource block as a smallest unit for the scheduling, to which the physical channel is allocated. The resource block is defined as a region which includes a constant frequency region in which a frequency axis is constituted by a set of a plurality of subcarriers (for example, 12 subcarriers), and a constant transmission time interval (for example, one slot, seven symbols).

In order to improve communication accuracy, a cyclic prefix (CP) allocated to a redundant portion of the physical channel is applied to the physical channel and is transmitted. The length of the CP causes the number of symbols allocated in one slot to be changed. For example, in a case of a normal CP, seven symbols may be allocated in one slot. In a case of an extended CP, six symbols may be allocated in one slot.

A spacing between subcarriers is narrowed, and thus 24 subcarriers may be allocated in one resource block. Such a case may be applied to a specific physical channel.

The physical channel corresponds to a set of resource elements for transmitting information which is output from a higher layer. A physical signal is used in a physical layer, and does not transmit information which is output from a higher layer. That is, control information of a higher layer, such as a radio resource control (RRC) message or system information (SI) is transmitted on a physical channel.

As a downlink physical channel, there are a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), and an enhanced physical downlink control channel (EPDCCH). As a downlink physical signal, various reference signals and various synchronization signals are provided. As a downlink reference signal (DL-RS), there are a cell-specific reference signal (CRS), an UE specific reference signal (UERS), and a channel state information reference signal (CSI-RS). As a synchronization signal, there are a primary synchronization signal (PSS), and a secondary synchronization signal (SSS).

As an uplink physical channel, there are a physical uplink shared channel (PUSCH), a physical uplink control channel (PUCCH), and a physical random access channel (PRACH). As an uplink physical signal, various reference signals are provided. As an uplink reference signal, there are a demodulation reference signal (DMRS) and a sounding reference signal (SRS).

The synchronization signals are a PSS and an SSS. The PSS is three types. The SSS is constituted by 31 types of codes which are arranged at different positions in a frequency domain. A physical layer cell identity (PCI: physical layer cell identity, physical cell identity, physical cell identifier) and a frame timing for radio synchronization are indicated by combining the PSS and the SSS. The physical layer cell identity is used for identifying the base station apparatus 1 like 504. The terminal device 2 specifies a cell identifier of the received synchronization signal, by cell searching. The cell identifier may be also referred to as a cell ID. The physical layer cell identity may be also referred to as a physical cell ID.

A physical broadcast channel (PBCH) is transmitted for the purpose of performing a notification of a control parameter (broadcast information or system information) which is commonly used in terminal devices 2 in a cell. Broadcast information (for example, SIB1 or portion of system information) of which notification on the PBCH is not performed is transmitted through a DL-SCH on a PDSCH. Notification of a cell global identifier (CGI), a tracking area identifier (TAI), random access configuration information (transmission timing timer and the like), common radio resource configuration information (shared radio resource configuration information), and the like as the broadcast information is performed. The cell global identifier (CGI) indicates an identifier specific to a cell. The tracking area identifier is for managing an area waiting by paging.

The DL-RS is classified into a plurality of types in accordance with the use thereof. For example, the cell-specific reference signal (CRS) is a pilot signal transmitted with predetermined power for each cell, and is a DL-RS of which transmission is periodically repeated in the frequency domain and in the time domain, based on a predetermined rule. The terminal device 2 receives the CRS, and thus measures reception quality for each cell. The terminal device 2 may use the CRS as a reference signal for demodulating a PDCCH/EPDCCH, or a PDSCH transmitted by an antenna port which is the same as that used for the CRS. As a sequence used for the CRS, a sequence which can be identified for each cell is used. The CRS may be transmitted in all downlink subframes by the base station apparatus 1. However, the terminal device 2 may receive the CRS only on a designated downlink subframe.

The DL-RS is also used in estimating propagation fluctuation in a downlink. Each of DL-RSs used in estimating propagation fluctuation may be referred to as a channel state information reference signal (CSI-RS) or a CSI reference signal. The CSI-RS which is not transmitted in practice or is transmitted with zero power may be referred to as a zero power channel state information reference signals (ZP CSI-RS) or a zero power CSI reference signal. The CSI-RS which is transmitted in practice may be referred to as a non zero power channel state information reference signal (NZP CSI-RS) or a non zero power CSI reference signal.

Each of downlink resources used in measuring an interference component may be referred to as a channel state information-interference measurement resource (CSI-IMR) or a CSI-IM resource. The terminal device 2 may measure interference signal by using a zero power CSI-RS included in a CSI-IM resource, so as to calculate a value of a CQI. A DL-RS which is configured dedicatedly for each terminal device 2 is a reference signal of each terminal device 2 which is referred to as UE specific reference signals (UERS) or dedicated reference signals, downlink demodulation reference signals (DL DMRS), and the like. Such a CSI-RS is used in demodulating a PDCCH or a PDSCH transmitted by an antenna port which is the same as that used for the UERS.

A sequence for the DL-RSs may be generated based on a pseudo-random sequence. The sequence for the DL-RSs may be generated based on a Zadoff-Chu sequence. The sequence for the DL-RSs may be generated based on a Gold sequence. The sequence for the DL-RSs may be subspecies or modifications of the pseudo-random sequence, the Zadoff-Chu sequence, or the Gold sequence.

The physical downlink shared channel (PDSCH) is used for transmitting downlink data (DL-SCH). The PDSCH is also used in a case where system information is transmitted on the DL-SCH. Information (Resource Block assignment, Resource allocation) regarding radio resource assignment for a PDSCH is transmitted by using a PDCCH (DCI format). The PDSCH is also used for performing notification of a parameter (information element, RRC message) relating to a downlink and an uplink.

The physical downlink control channel (PDCCH) is transmitted by using some OFDM symbols from the leading of each subframe, and is used for instructing the terminal device 2 of resource assignment information or an adjusted quantity of an increase or a decrease of transmission power in accordance with scheduling of the base station apparatus 1. It is necessary that the terminal device 2 monitors a PDCCH thereof before a message of Layer 3 (paging, handover command, RRC message, and the like) is transmitted and received, and acquires resource assignment information from the PDCCH. The resource assignment information is referred to as an uplink grant when transmission is performed, and is referred to as a downlink grant (also referred to as downlink assignment) when reception is performed. The PDCCH may be constituted so as to be transmitted with the above-described OFDM symbols, and to be transmitted in a region of resource blocks which are dedicatedly allocated to the terminal device 2 from the base station apparatus 1. The PDCCH transmitted in the region of the resource blocks (RBs) which are dedicatedly allocated to the terminal device 2 from the base station apparatus 1 may be also referred to as an enhanced physical downlink control channel (EPDCCH: Enhanced PDCCH). The PDCCH transmitted with the above-described OFDM symbols may be also referred to as a first control channel. The EPDCCH may be also referred to as a second control channel. The resource region to which the PDCCH can be allocated may be also referred to as a first control channel region. The resource region to which the EPDCCH can be allocated may be also referred to as a second control channel region. A PDCCH in the present invention is assumed to basically include an EPDCCH.

The base station apparatus 1 may transmit a PCFICH, a PHICH, a PDCCH, an EPDCCH, a PDSCH, a synchronization signal (PSS/SSS), and a DL-RS in a DwPTS of a special subframe. The base station apparatus 1 may not transmit a PBCH in the DwPTS of the special subframe.

The terminal device 2 may transmit a PRACH and a SRS in an UpPTS of the special subframe. At this time, the PRACH may be transmitted with Format 4 (PRACH Format 4). The terminal device 2 may not transmit a PUCCH, a PUSCH, and a DMRS in the UpPTS of the special subframe.

In a case where the special subframe is constituted only by a GP and an UpPTS, the terminal device 2 may transmit the PUCCH and/or the PUSCH and/or the DMRS in the UpPTS of the special subframe.

Here, the terminal device 2 monitors PDCCH candidates and/or EPDCCH candidates. Hereinafter, for simple descriptions, a PDCCH may include an EPDCCH. The PDCCH candidates indicate candidates having a probability of the base station apparatus 1 mapping and transmitting a PDCCH. Each of the PDCCH candidates is constituted from one or a plurality of control channel elements (CCEs). The monitoring may include a case where the terminal device 2 attempts to decode each of PDCCHs in a set of the PDCCH candidates, in accordance to all monitored DCI formats.

Here, the set of PDCCH candidates monitored by the terminal device 2 is also referred to as a search space. The search space means a set of resources having a probability of being used in transmitting the PDCCH by the base station apparatus 1. A common search space (CSS) and a terminal device specific search space (USS: UE-specific search space) are constituted (defined, configured) in a PDCCH region. The CSS and the USS may be overlapped with each other in the primary cell.

The CSS is used in transmitting downlink control information to a plurality of terminal devices 2. That is, the CSS is defined by a common resource for the plurality of terminal devices 2. The USS is used in transmitting the downlink control information to a certain specific terminal device 2. That is, the USS is dedicatedly configured for the certain specific terminal device 2. The USS may be configured so as to be duplicated in a plurality of terminal devices 2.

The terminal device 2 monitors one CSS at each of Aggregation levels 4 and 8 in each non-DRX subframe of the primary cell.

The terminal device 2 monitors a CSS for a PDCCH (DCI format) which does not have an attached carrier indicator field (CIF). The base station apparatus 1 does not transmit a PDCCH having an attached CIF, in the CSS.

Downlink control information (DCI) is transmitted to the terminal device 2 from the base station apparatus 1 in a specific format (constitution, form). The format may be referred to as a DCI format. Transmission of the DCI format includes a case where DCI having a certain format is transmitted. The DCI format may be restated as a format for transmitting the DCI. As the DCI format transmitted to the terminal device 2 from the base station apparatus 1, a plurality of formats is prepared (for example, DCI format 0/1/1A/1B/1C/1D/2/2A/2B/2C/2D/3/3A/4). Fields (bit fields) corresponding to various types of downlink control information are set in the DCI format.

In a case where a common DCI (single DCI) is transmitted to a plurality of terminal devices 2 in a certain DCI format, the base station apparatus 1 performs transmission in a PDCCH (or EPDCCH) CSS. In a case where DCI is dedicatedly transmitted to each of the terminal devices 2 in a certain DCI format, the base station apparatus 1 performs transmission in a PDCCH (or EPDCCH) USS.

As the DCI transmitted in the DCI format, there are resource assignment of a PUSCH or a PDSCH, modulation and coding scheme, a sounding reference signal request (SRS request), a channel state information request (CSI request), an instruction of first transmission or retransmission of a single transport block, a transmission power control command for a PUSCH, a transmission power control command for a PUCCH, cyclic shift of a UL DMRS, an index of an orthogonal cover code (OCC), and the like. In addition, various types of DCI are defined in a specification (standard) document.

A format used in uplink transmission control (for example, scheduling of a PUSCH, and the like) may be referred to as an uplink DCI format (for example, DCI format 0/4) or DCI associated with an uplink. A DCI format used in the uplink transmission control may be referred to as an uplink grant (UL grant). A format used in downlink reception control (for example, scheduling of a PDSCH, and the like) may be referred to as a downlink DCI format (for example, DCI format 1/1A/1B/1C/1D/2/2A/2B/2C/2D), or DCI associated with a downlink. A DCI format used in the downlink reception control may be referred to as a downlink grant (DL grant), downlink assignment (DL assignment). A format used for adjusting transmission power of each of a plurality of terminal devices 2 may be referred to as a group triggering DCI format (for example, DCI format 3/3A).

For example, DCI format 0 is used for transmitting information regarding resource assignment of a PUSCH, which is required for performing scheduling of one PUSCH in one serving cell, or information regarding a modulation scheme, information regarding a transmit power control (TPC) command for the PUSCH, and the like. The DCI is transmitted on a PDCCH/EPDCCH. It is stated that the DCI format is constituted by at least one piece of DCI.

As the DCI format, there is a DCI which is transmitted depending on whether transmission is performed for FDD (FDD cell) or TDD (TDD cell) even when the same DCI format is used. For example, in DCI format 0, in a case of the TDD UL/DL configuration 0, an uplink index (UL index) is transmitted. In DCI format 0, in a case of the TDD UL/DL configurations 1 to 6, a downlink assignment index (DAI) is transmitted. Even when the same DCI is used, a bit size in FDD may be different from a bit size in TDD. For example, regarding a HARQ process number, a bit size in FDD may be different from a bit size in TDD (3 bits for FDD, and 4 bits for TDD). In a case of DCI format 2B/2C/2D, an SRS request is transmitted only for TDD.

The terminal device 2 monitors PDCCHs in a CSS and/or a USS of a PDCCH region, and detects a PDCCH of the terminal device 2.

An RNTI allocated to the terminal device 2 by the base station apparatus 1 is used in transmitting downlink control information (transmission on the PDCCH). Specifically, a cyclic redundancy check (CRC) parity bit is added to a DCI format (which may be downlink control information), and after addition is performed, the CRC parity bit is scrambled by using the RNTI.

The terminal device 2 attempts to decode a DCI format to which the CRC parity bit scrambled by using the RNTI is added, and detects a DCI format of which the CRC is determined to succeed, as the DCI format of the terminal device 2 (such a process is also referred to as blind decoding). That is, the terminal device 2 attempts to decode a PDCCH in accordance with the CRC scrambled by using the RNTI, and detects a PDCCH of which the CRC is determined to succeed, as the PDCCH of the terminal device 2.

The terminal device 2 examines decoding (performs blind decoding) in accordance with Aggregation levels of the CSS and the USS, and the number of PDCCH candidates, and the size of the DCI format (DCI format size, payload size of the DCI format). For example, since Aggregation levels are 4 and 8, the number of PDCCH candidates thereof is the sum of 4 and 2, that is, 6, and the number of types of DCI formats having different sizes is 2 in the CSS, the number of performing blind decoding for the CSS is 12. That is, if a DCI of the terminal device 2 is transmitted in the CSS by using a PDCCH, the terminal device 2 performs blind decoding 12 times (which is the maximum) in the CSS, and thus can detect any DCI format. Since Aggregation levels are 1, 2, 4 and 8, the number of PDCCH candidates thereof is the sum of 6, 6, 2, and 2, that is, 16 in the USS, and the number of types of DCI formats having different sizes is 3 in the USS, the number of performing blind decoding for the USS is 48. That is, if the DCI of the terminal device 2 is transmitted in the USS by using the PDCCH, the terminal device 2 performs blind decoding 48 times (which is the maximum) in the USS, and thus can detect any DCI format. That is, if the DCI of the terminal device 2 is transmitted by using the PDCCH, the terminal device 2 performs blind decoding 60 times (which is the maximum), and thus can detect any DCI format. The number of performing blind decoding is determined based on the number of DCI formats having different sizes (DCI formats having different sizes such as 40 bits and 44 bits), Aggregation level of the search space, the number of PDCCH candidates, or the number of component carriers (cells) which perform cross carrier scheduling. If the sizes are the same as each other, the terminal device 2 performs blind decoding by using one DCI format even when different types of DCI formats are provided. For example, since the size of the DCI format 0 is the same as the size of the DCI format 1A, blind decoding is performed in a state where consideration as one DCI format is performed. A DCI format monitored by the terminal device 2 depends on a transmission mode configured in each serving cell. The terminal device 2 may recognize which the DCI format 0 or the DCI format 1A is configured, based on a DCI (Flag for format0/format1A differentiation) for identifying the DCI format 0/1A transmitted in the DCI format. A field for performing switching between DCI formats which are different from each other and have the same format size (payload size, bit size) may be set in each DCI format by using the similar method. That is, a DCI field indicating whether a certain DCI format is a first DCI format or a second DCI format may be set in the first DCI format and the second DCI format.

Considering a reception processing delay of the terminal device 2, the total number (or threshold value) of performing blind decoding may be set (defined) in advance. The total number of performing blind decoding may vary depending on whether or not carrier aggregation is configured. That is, the total number of performing blind decoding may be changed depending on the number of component carriers (serving cells) which perform blind decoding.

In a case where carrier aggregation is configured, the terminal device 2 may be scheduled in a plurality of serving cells. However, the random access procedure is performed in at most one serving cell regardless of the number of serving cells. In cross carrier scheduling with a carrier indicator field (CIF), scheduling of resources for other serving cells may be performed on a PDCCH of one certain serving. However, cross carrier scheduling is not applied to a primary cell. A primary cell is scheduled on a PDCCH of the primary cell. In a case where a PDCCH of a secondary cell is configured, cross carrier scheduling is not applied to the secondary cell. In a case where the PDCCH of a secondary cell is not configured, cross carrier scheduling may be applied to the secondary cell.

Regarding cross carrier scheduling, in a certain cell, a carrier indicator field (CIF) is included in an uplink grant (DCI format associated with an uplink) or a downlink grant (DCI format associated with a downlink) and is transmitted, and thus the uplink grant or the downlink grant may be transmitted to different cells. That is, one cell may control uplink/downlink transmission to a plurality of cells, by using a DCI format including a CIF.

A terminal device 2 in which a CIF associated with monitoring of a PDCCH in a serving cell c is configured monitors a CIF and a PDCCH in which a CRC scrambled in a PDCCH USS of the serving cell c by a C-RNTI is configured.

A terminal device 2 in which a CIF associated with monitoring of a PDCCH in the primary cell is configured monitors a CIF and a PDCCH in which a CRC scrambled in a PDCCH USS of the primary cell by an SPS-RNTI is configured.

In cross carrier scheduling, the base station apparatus 1 is notified that the terminal device 2 supports the function, by using function information (UE-EUTRA-Capability). The base station apparatus 1 performs a configuration (Cross-CarrierSchedulingConfig) relating to the cross carrier scheduling, for the terminal device 2. In a case where the base station apparatus 1 transmits configuration information to the terminal device 2, communication can be performed by using the cross carrier scheduling. Notification of such configuration information may be performed by using higher layer signaling.

The configuration relating to the cross carrier scheduling includes information (cif-Presence) indicating whether or not a DCI format of a PDCCH/EPDCCH includes a CIF. The configuration relating to the cross carrier scheduling may include information (schedulingCellId) indicating a cell which performs signaling of downlink allocation (downlink grant) and an uplink grant (that is, which cell performs signaling of downlink allocation and an uplink grant). Such information is referred to as scheduling cell ID information. The configuration relating to the cross carrier scheduling may include information (pdsch-Start) indicating a starting OFDM symbol of a PDSCH for a cell indicated by the scheduling cell ID information. The scheduling cell ID information may be independently configured in an uplink and a downlink, a terminal device 2 that independently supports a function of performing cross carrier scheduling for the uplink and the downlink. Information indicating the starting OFDM symbol of a PDSCH may be configured only for a downlink.

In a case where carrier aggregation is configured, a downlink resource for semi-persistent scheduling may be configured in a primary cell, and only PDCCH allocation for the primary cell may be performed prior to semi-persistent allocation.

In a case where carrier aggregation is configured, an uplink resource for the semi-persistent scheduling may be configured in a primary cell, and only PDCCH allocation for the primary cell may be performed prior to semi-persistent allocation.

A link between an uplink and a downlink allows a serving cell to which a downlink grant or an uplink grant is applied in a case where there is no CIF, to be recognized. A downlink grant received in the primary cell corresponds to transmission of a downlink in a primary cell. An uplink grant received in the primary cell corresponds to transmission of an uplink in the primary cell. A downlink grant received in a secondary cell #n corresponds to transmission of a downlink in the secondary cell #n. An uplink grant received in a secondary cell #n corresponds to transmission of an uplink in the secondary cell #n. In a case where a use of an uplink is not configured for the secondary cell #n, the uplink grant is ignored by a terminal device 2 which has received the uplink grant.

In another serving cell, in a case where monitoring of a PDCCH having an attached CIF which corresponds to a certain secondary cell is configured, the terminal device 2 does not expect that the PDCCH of the secondary cell is monitored. At this time, the base station apparatus 1 may not transmit a DCI to the terminal device 2 in the secondary cell by using the PDCCH.

Here, the RNTI includes a cell-radio network temporary identifier (C-RNTI). The C-RNTI is a unique identifier used for RRC connection and identification of scheduling. The C-RNTI is used for uni-cast transmission which is dynamically scheduled. In a case where carrier aggregation is configured, the C-RNTI (same C-RNTI) having the same value is applied in all serving cells.

The RNTI includes a Temporary C-RNTI. The Temporary C-RNTI is an identifier used for a random access procedure. For example, the terminal device 2 may decode the DCI format (for example, DCI format 0) to which the CRC scrambled by using the Temporary C-RNTI is added and which is associated with an uplink, only in the CSS. The terminal device 2 may attempt to decode the DCI format (for example, DCI format 1A) to which the CRC scrambled by using the Temporary C-RNTI is added and which is associated with a downlink, in the CSS and the USS.

In a case where the DCI is transmitted in the CSS, the base station apparatus 1 adds a CRC parity bit scrambled by using the Temporary C-RNTI or the C-RNTI, to the DCI (DCI format). In a case where the DCI is transmitted in the USS, the base station apparatus 1 may add CRC scrambled by using the C-RNTI, to the DCI (DCI format).

A physical uplink shared channel (PUSCH) is mainly used for transmitting uplink data and uplink control information (UCI). The UCI transmitted on a PUSCH includes channel state information (CSI), and/or ACK/NACK. The CSI transmitted on a PUSCH includes aperiodic CSI (A-CSI) and periodic CSI (P-CSI). Similarly to a case of the downlink, resource assignment information of the physical uplink shared channel is indicated by a physical downlink control channel. The PUSCH scheduled by a dynamic scheduling grant transmits the uplink data. The PUSCH scheduled by a random access response grant transmits information (for example, identification information of the terminal device 2, and Message 3) of the base station apparatus 1, which is associated to random access. Parameters used for setting transmission power for transmission on the PUSCH may be different in accordance with the type of the detected grant. Control data is transmitted in a form of channel quality information (CQI and/or PMI), HARQ response information (HARQ-ACK, HARQ-ACK response), and rank information (RI). That is, the control data is transmitted in a form of uplink control information.

A physical uplink control channel (PUCCH) is used for notification of reception acknowledgement response (ACK/NACK: Acknowledgement/Negative Acknowledgement) of downlink data transmitted on a physical downlink shared channel, or notification of channel information (channel state information) of a downlink, and is used for performing a scheduling request (SR) which is a resource assignment request (radio resource request) of an uplink. Channel state information (CSI) includes a channel quality indicator (CQI), a precoding matrix indicator (PMI), a precoding type indicator (PTI), and a rank indicator (RI). Each of the indicators may be described as indication, but the use and the meaning thereof is the same. A format of the PUCCH may be switched in accordance with the transmitted UCI. For example, in a case where the UCI is constituted from HARQ ACK and/or SR, the UCI may be transmitted on a PUCCH of a format 1/1a/1b/3 (PUCCH format 1/1a/1b/3). In a case where the UCI is constituted from the CSI, the UCI may be transmitted on a PUCCH of a format 2/2a/2b (PUCCH format 2/2a/2b). In order to avoid collision with a SRS, a shortened format obtained by performing puncturing by one symbol, and a normal format obtained by not performing puncturing by one symbol are provided in the PUCCH format 1/1a/1b. For example, in a case where simultaneous transmission of a PUCCH and a SRS in the same subframe is enabled, the PUCCH format 1/1a/1b in a SRS subframe is transmitted in the shortened format. In a case where simultaneous transmission of a PUCCH and a SRS in the same subframe is disabled, the PUCCH format 1/1a/1b in a SRS subframe is transmitted in the normal format. At this time, even when transmission of the SRS occurs, the SRS may not be transmitted.

As a CSI report (CSI report), a periodic CSI report (P-CSI reporting) and an aperiodic CSI report (A-CSI reporting) are provided. The periodic CSI report is for periodically reporting channel state information or for reporting channel state information in a case where an event condition for triggering a CSI report is satisfied. The aperiodic CSI report is for reporting the channel state information in response to a CSI request included in the DCI format, in a case where the CSI report is requested. The periodic CSI report is performed on a PUCCH or a PUSCH. The aperiodic CSI report is performed on a PUSCH. In a case where an instruction is performed based on information (CSI request) included in the DCI format, the terminal device 2 may transmit CSI which is not followed by uplink data, on the PUSCH. That is, P-CSI is transmitted by using a PUCCH or a PUSCH, and A-CSI is transmitted by using a PUSCH. In a case where the CSI reporting is request based on information (CSI request) included in a DCI format, the terminal device 2 may transmit CSI (A-CSI) without uplink data, on a PUSCH.

A PUCCH subframe (reporting instances) in which CSI reporting is possible is determined based on a period and a subframe offset which are associated with an index (CQIPMI index, RI index) configured in a higher layer. The index configured in the higher layer may be configured for each subframe set which is configured for measuring CSI. In a case where only one index is configured for a plurality of subframe sets, the index may be considered as being common between subframe sets.

One P-CSI report for each serving cell is configured for a terminal device 2 in which Transmission modes 1 to 9 are configured, by higher layer signaling.

One or more P-CSI reports for each serving cell are configured for a terminal device 2 in which Transmission mode 10 is configured, by higher layer signaling.

8 CSI-RS ports are configured for a terminal device 2 in which Transmission mode 9 or 10 is configured, and a reporting mode (Mode 1-1) of a single PMI in a wide band CQI is configured in Submode 1 or Submode 2, by using a certain parameter (PUCCH_format1-1_CSI_reporting_mode) and by higher layer signaling.

A CQI report for an UE-selected subband CQI in a certain subframe of a certain serving cell is a report of channel quality in a specific part (portion) of a bandwidth of a serving cell which is indicated as a bandwidth part.

A CSI reporting type is for supporting a PUCCH CSI reporting mode. The CSI reporting type may be referred to as a PUCCH reporting type. The type 1 report supports CQI feedback for an UE-selected subband. The type 1a report supports subband CQI and second PMI feedback. The type 2 report, the type 2b report, and the type 2c report support wide band CQI and PMI feedback. The type 2a report supports wide band PMI feedback. The type 3 report supports RI feedback. The type 4 report supports the wide band CQI. The type 5 supports RI and the wide band PMI feedback. The type 6 supports the RI and PTI feedback.

As an uplink reference signal (UL-RS), a demodulation reference signal (DMRS) and a sounding reference signal (SRS) are included. The demodulation reference signal is used for demodulating a physical uplink control channel (PUCCH) and a physical uplink shared channel (PUSCH) by the base station apparatus 1. The sounding reference signal is mainly used for estimating a channel state of an uplink by the base station apparatus 1. As the sounding reference signal, a periodic sounding reference signal (P-SRS: Periodic SRS) and an aperiodic sounding reference signal (A-SRS: Aperiodic SRS) are provided. The periodic sounding reference signal is configured so as to be periodically transmitted by a higher layer. The aperiodic sounding reference signal is used for requiring transmission by an SRS request included in a downlink control information format. Here, the uplink reference signal may be referred to as an uplink reference signal, an uplink pilot signal, or an uplink pilot channel.

A sequence for the uplink reference signals may be generated based on a pseudo-random sequence. The sequence for the uplink reference signals may be generated based on a Zadoff-Chu sequence. The sequence for the uplink reference signals may be generated based on a Gold sequence. The sequence for the uplink reference signals may be generated based on subspecies or modifications of the pseudo-random sequence, the Zadoff-Chu sequence, or the Gold sequence.

The periodic sounding reference signal may be also referred to as a periodic sounding reference signal and a Trigger Type 0 sounding reference signal (Trigger Type 0 SRS). The aperiodic sounding reference signal may be also referred to as an aperiodic sounding reference signal and a Trigger Type 1 sounding reference signal (Trigger Type 1 SRS).

The A-SRS may be classified into a signal specialized for estimating a channel of an uplink (for example, which may be also referred to as a Trigger Type 1aSRS), and a signal used for causing the base station apparatus 1 to measure a channel state (CSI, CQI, PMI, and RI) by using channel reciprocity in TDD (for example, which may be also referred to as a Trigger Type 1bSRS) in coordinated communication. The DMRS is configured corresponding to each of the PUSCH and the PUCCH. The DMRS is time-multiplexed in the same subframe as that of the PUSCH or the PUCCH, and is transmitted.

The time multiplexing method of the DMRS may be different in a case of the DMRS for the PUSCH and in a case of the DMRS for the PUCCH. For example, regarding the DMRS for the PUSCH, only one symbol is allocated in one slot which is constituted by seven symbols. On the contrary, regarding the DMRS for the PUCCH, three symbols are allocated in one slot which is constituted by seven symbols.

Regarding the SRS, notification of various parameters (such as a bandwidth, a cyclic shift, and a transmission subframe) is performed by higher layer signaling. Regarding the SRS, a subframe for transmitting the SRS is determined based on information regarding a transmission subframe which is included in a configuration of the SRS and of which notification is performed by the higher layer signaling. As the information regarding the transmission subframe, information (shared information) configured so as to be specific to a cell, and information (dedicated information, individual information) configured so as to be specific to a terminal device are provided. The information configured so as to be specific to a cell includes information indicating a subframe in which the SRS shared by all terminal devices 2 in the cell is transmitted. The information configured so as to be specific to a terminal device includes information indicating periodicity and a subframe offset which functions as a subset of the subframe configured so as to be specific to the cell. The terminal device 2 may determine a subframe (which may be also referred to as a SRS subframe and a SRS transmission subframe) for transmitting the SRS, by using the pieces of information. When the terminal device 2 transmits a PUSCH in a subframe in which the SRS configured so as to be specific to a cell is transmitted, the terminal device 2 may puncture a time resource of the PUSCH by symbols for transmitting the SRS, and may transmit the PUSCH by using the punctured time resource. Thus, it is possible to avoid collision of transmission of the PUSCH with transmission of the SRS between terminal devices 2. It is possible to prevent deterioration of characteristics of the terminal device 2 which transmits the PUSCH. It is possible to ensure channel estimation accuracy in the terminal device 2 which transmits the SRS. Here, the information configured so as to be specific to a terminal device may be independently configured as the P-SRS and the A-SRS.

For example, in a case where the various parameters are configured by the higher layer signaling, a first uplink reference signal is periodically transmitted based on the configured transmission subframe. In a case where an instruction of a transmission request is performed by using a field (SRS request) regarding a transmission request of a second uplink reference signal included in the downlink control information format, the second uplink reference signal is aperiodically transmitted. In a case where a SRS request included in certain downlink control information format indicates being positive or indicates an index (value) corresponding to being positive, the terminal device 2 transmits an A-SRS in a predetermined transmission subframe. In a case where the detected SRS request indicates being negative or indicates an index (value) corresponding to being negative, the terminal device 2 does not transmit an A-SRS in a predetermined subframe. Notification of the information (shared parameter, shared information) configured so as to be specific to a cell is performed by using system information or a dedicated control channel (DCCH). Notification of the information (dedicated parameter, individual parameter, dedicated information, and individual information) configured so as to be specific to a terminal device is performed by using a common control channel (CCCH). Notification of the pieces of information may be performed by using a RRC message. Notification of the RRC message may be performed by a higher layer.

A physical random access channel (PRACH) is a channel used for notification of a preamble sequence. The physical random access channel has a guard time. The preamble sequence is constituted such that 64 types of sequences are prepared so as to express 6-bit information. The physical random access channel is used as an access unit of the terminal device 2 to the base station apparatus 1. The terminal device 2 uses the physical random access channel in order to transmit a radio resource request when the physical uplink control channel is not configured, in response to a scheduling request (SR), or in order to request transmission timing adjustment information (which is also referred to as timing advance (TA)) to the base station apparatus 1. The transmission timing adjustment information is needed for causing an uplink transmission timing to match with a reception timing window of the base station apparatus.

Specifically, the terminal device 2 transmits a preamble sequence by using a radio resource for the physical random access channel, which is configured by the base station apparatus 1. The terminal device 2 which receives the transmission timing adjustment information configures a transmission timing timer. The transmission timing timer tracks an effective time of the transmission timing adjustment information which is commonly configured by broadcast information (or which is individually configured by the layer 3 message). The terminal device 2 manages a state of the uplink in a manner that a state is set as a transmission timing adjusted state during the effective time of the transmission timing timer (during tracking), and the state is set as a transmission timing non-adjusted state (transmission timing not-adjusted state) during a period which is out of the effective period (during stopping). The layer 3 message is a message of a control-plane (C-plane), which is transmitted and received in a radio resource control (RRC) layer between the terminal device 2 and the base station apparatus 1. The layer 3 message is used as having the same meaning as RRC signaling or a RRC message. The RRC signaling may be also referred to as higher layer signaling or dedicated signaling.

The random access procedure includes two random access procedures of a contention based random access procedure and a non-contention based random access procedure. The contention based random access procedure is a random access having a probability of collision occurring between a plurality of terminal devices 2.

The non-contention based random access procedure is a random access in which collision does not occur between the plurality of terminal devices 2.

The non-contention based random access procedure is formed from three steps. The terminal device 2 is notified of random access preamble assignment from the base station apparatus 1 by dedicated signaling of the downlink. At this time, in the random access preamble assignment, the base station apparatus 1 assigns a non-contention random access preamble to the terminal device 2. The random access preamble assignment is transmitted for handover by a source base station apparatus (Source eNB). The random access preamble assignment is subjected to signaling by a handover command which is by a target base station apparatus (Target eNB), or is subjected to signaling by a PDCCH in a case of downlink data arrival.

The terminal device 2 which receives the random access preamble assignment transmits a random access preamble (Message 1) on a RACH in an uplink. At this time, the terminal device 2 transmits the assigned non-contention random access preamble.

The base station apparatus 1 which receives the random access preamble transmits a random access response in the downlink data (DL-SCH: Downlink Shared Channel) to the terminal device 2. Information transmitted in the random access response includes a first uplink grant (random access response grant) and timing alignment information for handover, and timing alignment information and a random access preamble identifier for downlink data arrival. The downlink data may be also referred to as downlink shared channel data (DL-SCH data).

Here, the non-contention based random access procedure is applied to handover, downlink data arrival, and positioning. The contention based random access procedure is applied to an initial access from RRC_IDLE, reestablishment of RRC connection, handover, downlink data arrival, and uplink data arrival.

The random access procedure according to the embodiment is the contention based random access procedure. An example of the contention based random access procedure will be described.

The terminal device 2 acquires System information block type 2 (SIB2) transmitted by the base station apparatus 1. The SIB2 corresponds to a common configuration (common information) for all terminal devices 2 (or a plurality of terminal devices 2) in a cell. For example, the common configuration includes a configuration of the PRACH.

The terminal device 2 randomly selects the number of the random access preamble. The terminal device 2 transmits a random access preamble (Message 1) of the selected number to the base station apparatus 1 by using the PRACH. The base station apparatus 1 estimates a transmission timing of the uplink by using the random access preamble.

The base station apparatus 1 transmits a random access response (Message 2) by using the PDSCH. The random access response includes plural pieces of information for the random access preamble detected by the base station apparatus 1. For example, the plural pieces of information include the number of the random access preamble, a Temporary C-RNTI, a timing advance command (TA command), and a random access response grant.

The terminal device 2 transmits (initially transmits) uplink data (Message 3) on the PUSCH scheduled by using the random access response grant. The uplink data includes an identifier (InitialUE-Identity or information indicating a C-RNTI) for identifying the terminal device 2.

In a case where decoding of uplink data fails, the base station apparatus 1 performs an instruction of retransmission of the uplink data by using a DCI format to which a CRC parity bit scrambled by using the Temporary C-RNTI is added. In a case where the instruction of retransmission of the uplink data is received by the DCI format, the terminal device 2 retransmits the same uplink data on a PUSCH scheduled by using the DCI format to which the CRC parity bit scrambled by using the Temporary C-RNTI is added.

In a case where decoding of uplink data fails, the base station apparatus 1 may perform an instruction of retransmission of the uplink data by using a PHICH (NACK). In a case where the instruction of retransmission of the uplink data is received by using the NACK, the terminal device 2 retransmits the same uplink data on the PUSCH.

The base station apparatus 1 succeeds decoding of the uplink data, and thus acquires the uplink data. Thus, it is possible to recognize which terminal device 2 transmits the random access preamble and the uplink data. That is, before decoding of the uplink data is determined to succeed, the base station apparatus 1 recognizing which terminal device 2 transmits the random access preamble and the uplink data is not possible.

In a case where Message 3 including InitialUE-Identity is received, the base station apparatus 1 transmits a contention resolution identity (Message 4) generated based on the received InitialUE-Identity, to the terminal device 2 by using the PDSCH. In a case where the received contention resolution identity matches with the transmitted InitialUE-Identity, the terminal device 2 (1) considers that contention resolution of the random access preamble succeeds, (2) sets the value of the Temporary C-RNTI in the C-RNTI, (3) discards the Temporary C-RNTI, and (4) considers that the random access procedure is correctly completed.

In the base station apparatus 1 receives Message 3 including information which indicates the C-RNTI, the base station apparatus 1 transmits a DCI format (Message 4) to which a CRC parity bit scrambled by using the received C-RNTI is added, to the terminal device 2. In a case where the terminal device 2 decodes the DCI format to which the CRC parity bit scrambled by using the received C-RNTI is added, the terminal device 2 (1) considers that contention resolution of the random access preamble succeeds, (2) discards the Temporary C-RNTI, and (3) considers that the random access procedure is correctly completed.

That is, the base station apparatus 1 performs scheduling of a PUSCH by using the random access response grant as a part of the contention based random access procedure.

The terminal device 2 transmits the uplink data (Message 3) on the PUSCH scheduled by using the random access response grant. That is, the terminal device 2 performs transmission on a PUSCH corresponding to the random access response grant, as a part of the contention based random access procedure.

The base station apparatus 1 performs scheduling of a PUSCH by using the DCI format to which a CRC scrambled by using the Temporary C-RNTI is added, as a part of the contention based random access procedure. The base station apparatus 1 performs scheduling/instruction of transmission on the PUSCH by using a PHICH (NACK), as a part of the contention based random access procedure.

The terminal device 2 transmits (retransmits) the uplink data (Message 3) on the PUSCH scheduled by using the DCI format to which a CRC scrambled by using the Temporary C-RNTI is added. The terminal device 2 transmits (retransmits) the uplink data (Message 3) on the scheduled PUSCH, in response to reception of the PHICH. That is, the terminal device 2 performs transmission on the PUSCH corresponding to the retransmission of the same uplink data (transport block), as a part of the contention based random access procedure.

In the TDD scheme, the base station apparatus 1 may transmit a PCFICH, a PHICH, a PDCCH, an EPDCCH, a PDSCH, a synchronization signal, and a downlink reference signal in a DwPTS of a special subframe. The base station apparatus 1 may not transmit a PBCH in the DwPTS of the special subframe.

In the TDD scheme, the terminal device 2 may transmit a PRACH and an SRS in an UpPTS of a special subframe. The terminal device 2 may not transmit a PUCCH, a PUSCH, and a DMRS in the UpPTS of the special subframe.

In the TDD scheme, in a case where a special subframe is constituted only by a GP and an UpPTS, the terminal device 2 may transmit a PUCCH and/or a PUSCH and/or a DMRS in the UpPTS of a special subframe.

A logical channel will be described below. The logical channel is used for transmitting a RRC message or an information element. The logical channel is transmitted on a physical channel through a transport channel.

A broadcast control channel (BCCH) is a logical channel used for broadcasting system control information. For example, system information or information needed for an initial access is transmitted by using the broadcast control channel. A master information block (MIB) or System Information Block Type 1 (SIB1) is transmitted by using this logical channel.

A common control channel (CCCH) is a logical channel used for transmitting control information between a network, a terminal device which does not have RRC connection, and a network. For example, terminal-specific control information or configuration information is transmitted by using this logical channel.

A dedicated control channel (DCCH) is a logical channel used for transmitting dedicated control information (individual control information) between a terminal device 2 having RRC connection, and a network in a bi-directional manner. For example, cell-specific reconfiguration information is transmitted by using this logical channel.

Signaling using a CCCH or a DCCH may be generically referred to as RRC signaling.

Information regarding uplink power control includes information of which notification as broadcast information is performed, information of which notification as information (shared information) shared between terminal devices 2 in the same cell is performed, and information of which notification as terminal device-specific dedicated information is performed. The terminal device 2 sets transmission power based on only the information of which notification as broadcast information is performed, or based on the information of which notification as the broadcast information/shared information is performed, and the information of which notification as dedicated information is performed.

Notification of radio resource control configuration shared information as the broadcast information (or the system information) may be performed. Notification of the radio resource control configuration shared information as dedicated information (mobility control information) may be performed.

A radio resource configuration includes a random access channel (RACH) configuration, a broadcast control channel (BCCH) configuration, a paging control channel (PCCH) configuration, a physical random access channel (PRACH) configuration, a physical downlink shared channel (PDSCH) configuration, a physical uplink shared channel (PUSCH) configuration, a physical uplink control channel (PUCCH) configuration, a sounding reference signal (SRS) configuration, a configuration relating to the uplink power control, a configuration relating to an uplink cyclic prefix length, and the like. That is, the radio resource configuration is configured so as to perform notification of a parameter used for generating a physical channel/physical signal. Parameters (information elements) of which notification is performed may be different in a case where notification as the broadcast information is performed, and in a case where notification as reconfiguration information is performed.

An information element needed for configuring the parameter relating to various physical channels/physical signals (PRACH, PUCCH, PUSCH, SRS, UL DMRS, CRS, CSI-RS, PDCCH, PDSCH, PSS/SSS, UERS, PBCH, PMCH, and the like) is constituted by shared configuration information (or shared parameter, set of shared parameters) and dedicated configuration information (or dedicated parameter, set of dedicated parameters). The shared configuration information is information shared between terminal devices 2 in the same cell. The dedicated configuration information is configured for each of the terminal devices 2. The shared configuration information may be transmitted in the system information. In a case where reconfiguration is performed, the shared configuration information may be transmitted as the dedicated information. The configurations include a configuration of a parameter. The configuration of a parameter includes a configuration of a value of the parameter. In a case where the parameter is managed in a manner of a table, the configuration of a parameter includes a configuration of the value of an index.

Information regarding the parameter of the physical channel is transmitted to the terminal device 2 by using a RRC message. That is, the terminal device 2 configures resource assignment or transmission power for each physical channel, based on the received RRC message. As the RRC message, there are a message relating to a broadcast channel, a message relating to a multicast channel, a message relating to a paging channel, a message relating to each of channels of a downlink, a message relating to each of channels of an uplink, and the like. Each of the RRC messages may include an information element (IE). The information element may include information corresponding to a parameter. The RRC message may be also referred to as a message. A message class is a set of one or more message. The message may include the information element. As the information element, there are an information element relating to radio resource control, an information element relating to security control, an information element relating to mobility control, an information element relating to measurement, an information element relating to a multimedia broadcast multicast service (MBMS), and the like. The information element may include a lower information element. The information element may be configured as the parameter. The information element may be defined as control information which indicates one or more parameters. A RRC message may be transmitted by using system information.

The information element (IE) is used for defining (designating, configuring) parameters for the system information (SI) or various types of channels/signals/information in dedicated signaling. A certain information element includes one or more fields. The information element may be configured by one or more information elements. A field included in the information element may be also referred to as a parameter. That is, the information element may include one or more types of parameters (one or more parameters). The terminal device 2 performs radio resource assignment control, uplink power control, transmission control, and the like, based on various parameters. The system information may be defined as the information element.

An information element may be configured in a field constituting an information element. A parameter may be configured in a field constituting an information element.

The RRC message includes one or more information elements. A RRC message in which a plurality of RRC messages is set is referred to as a message class.

As parameters which are related to uplink transmission power control, and of which the terminal device 2 is notified by using the system information, there are standard power for a PUSCH, standard power for a PUCCH, a channel loss compensation coefficient α, a list of power offsets obtained by being configured for each PUCCH format, and a power offset of a preamble and Message 3. As parameters which are related to the random access channel, and of which the terminal device 2 is notified by using the system information, there are a parameter relating to the preamble, a parameter relating to transmission power control of the random access channel, and a parameter relating to transmission control of a random access preamble. The parameters are used at a time of the initial access, or at a time of reconnection/reestablishment after radio link failure (RLF) occurs.

The terminal device 2 may be notified of information used for configuring the transmission power, as the broadcast information. The terminal device 2 may be notified of information for configuring transmission power, as the shared information. The terminal device 2 may be notified of information for configuring transmission power, as the dedicated information (individual information).

Embodiment

An embodiment of the present invention will be described below. In the embodiment, a communication system includes a primary base station apparatus as the base station apparatus 1. The base station apparatus 1 is also referred below to an access point, a point, a transmission point, a reception point, a cell, a serving cell, a transmission apparatus, a reception apparatus, a transmission station, a reception station, a transmit antenna group, a transmit antenna port group, a receive antenna group, a receive antenna port group, a communication apparatus, a communication terminal, and eNodeB. The primary base station apparatus is also referred below to a macro base station apparatus, a first base station apparatus, a first communication apparatus, a serving base station apparatus, an anchor base station apparatus, a master base station apparatus, a first access point, a first point, a first transmission point, a first reception point, a macro cell, a first cell, a primary cell, a master cell, a master small cell. The primary cell and the master cell (master small cell) may be independently constituted. In the embodiment, the communication system may include a secondary base station apparatus. The secondary base station apparatus is also referred below to a remote radio head (RRH), a remote antenna, an overhang antenna, a distributed antenna, a second access point, a second point, a second transmission point, a second reception point, a reference node, a low power base station apparatus (LPN: Low Power Node), a micro base station apparatus, a pico base station apparatus, a femto base station apparatus, a small base station apparatus, a local area base station apparatus, a phantom base station apparatus, a home (indoor) base station apparatus (Home eNodeB, Home NodeB, HeNB, HNB), a second base station apparatus, a second communication apparatus, a coordinated base station apparatus group, a coordinated base station apparatus set, a coordinated base station apparatus, a micro cell, a pico cell, a femto cell, a small cell, a phantom cell, a local area, a second cell, and a secondary cell. The communication system according to the embodiment may include a terminal device 2. The terminal device 2 is also referred below to a mobile station, a mobile station apparatus, a mobile terminal, a reception apparatus, a transmission apparatus, a reception terminal, a transmission terminal, a third communication apparatus, a receive antenna group, a receive antenna port group, a transmit antenna group, a transmit antenna port group, a user device, and a user terminal (UE: User Equipment). Here, the secondary base station apparatus may be illustrated as a plurality of secondary base station apparatuses. For example, the primary base station apparatus and the secondary base station apparatus may communicate with a terminal device by using heterogeneous network arrangement, in such a manner that a portion or the entirety of coverage of the secondary base station apparatus is included in coverage of the primary base station apparatus.

The communication system according to the embodiment is configured by the base station apparatus 1 and the terminal device 2. The single base station apparatus 1 may manage one or more terminal devices 2. The single base station apparatus 1 may manage one or more cells (serving cell, primary cell, secondary cell, femto cell, pico cell, small cell, phantom cell). The single base station apparatus 1 may manage one or more frequency bands (component carriers, carrier frequencies). The single base station apparatus 1 may manage one or more low power base station apparatuses (LPN: Low Power Nodes). The single base station apparatus 1 may manage one or more home (indoor) base station apparatuses (HeNB: Home eNodeBs). The single base station apparatus 1 may manage one or more access points. Base station apparatuses 1 may be connected to each other in a wired (optical fiber, copper wire, coaxial cable, and the like) or wireless (X2 interface, X3 interface, Xn interface, and the like) manner. That is, a plurality of base station apparatuses 1 may communicate with each other at a high speed (without delay) by using an optical fiber (Ideal backhaul), or may communicate with each other at a low speed through the X2 interface (Non ideal backhaul). At this time, communication of various types of information of the terminal device 2 (configuration information or channel state information (CSI), function information (UE capability, UE-EUTRA-Capability) of the terminal device 2, information for handover, and the like) may be performed. The plurality of base station apparatuses 1 may be managed on a network. The single base station apparatus 1 may manage one or more relay station apparatus (Relay).

The communication system according to the embodiment may realize coordinated communication (CoMP: Coordination Multiple Points) using a plurality of base station apparatuses, low power base station apparatuses, or home base station apparatuses. That is, the communication system according to the first embodiment may perform dynamic point selection (DPS) in which a point (transmission point and/or reception point) which communicates with the terminal device 2 is dynamically switched. The communication system according to the embodiment may perform coordinated scheduling (CS) or coordinated beamforming (CB). The communication system according to the first embodiment may perform joint transmission (JT) or joint reception (JR).

A plurality of low power base station apparatuses or small cells which are disposed so as to be close to each other may be clustered (grouped). The plurality of clustered low power base station apparatuses may perform notification of the same configuration information. An area (coverage) of the clustered small cells may be also referred to as a local area.

In downlink transmission, the base station apparatus 1 may be also referred to as a transmission point (TP). In uplink transmission, the base station apparatus 1 may be also referred to as a reception point (RP). The downlink transmission point and the uplink reception point may function as a pathloss reference point (reference point) for measuring downlink pathloss. The reference point for measuring pathloss may be configured independently from the transmission point and the reception point.

The small cell, the phamton cell, or the local area cell may be configured as a third cell. The small cell, the phamton cell, or the local area cell may be reconfigured as the primary cell. The small cell, the phamton cell, or the local area cell may be reconfigured as the secondary cell. The small cell, the phamton cell, or the local area cell may be reconfigured as the serving cell. The small cell, the phamton cell, or the local area cell may be included in the serving cell.

The base station apparatus 1 allowed to constitute the small cell may perform discrete reception (DRX) or discrete transmission (DTX), if necessary. The base station apparatus 1 allowed to constitute the small cell may cause power of some apparatuses (for example, transmission unit or reception unit) to intermittently or quasi-stationarily turn ON/OFF.

Independent identifiers (IDs: Identities) may be configured for base station apparatuses 1 constituting a macro cell and base station apparatuses 1 constituting a small cell. That is, identifiers of the macro cell and the small cell may be independently configured. For example, in a case where cell-specific reference signals (CRSs) are transmitted from the macro cell and the small cell, even when transmission frequencies are the same as each other, and radio resources are the same as each other, scrambling may be performed by using different identifiers. The cell-specific reference signal for the macro cell may be scrambled by using a physical layer cell ID (PCI: Physical layer Cell Identity). The cell-specific reference signal for the small cell may be scrambled by using a virtual cell ID (VCI: Virtual Cell Identity). Scrambling may be performed in the macro cell by using the physical layer cell ID (PCI: Physical layer Cell Identity), and scrambling may be performed in the small cell by using a global cell ID (GCI: Global Cell Identity). Scrambling may be performed in the macro cell by using a first physical layer ID, and scrambling may be performed in the small cell by using a second physical layer cell ID. Scrambling may be performed in the macro cell by using a first virtual cell ID, and scrambling may be performed in the small cell by using a second virtual cell ID. Here, the virtual cell ID may be an ID configured in a physical channel/physical signal. The virtual cell ID may be an ID which is configured independently from the physical layer cell ID. The virtual cell ID may be an ID used in scrambling a sequence used in the physical channel/physical signal.

Some of physical channels/physical signals may not be transmitted in a small cell, or a serving cell configured as the small cell, or a component carrier corresponding to the small cell. For example, a cell-specific reference signal (CRS) or a physical downlink control channel (PDCCH) may be not transmitted. A new physical channel/physical signal may be transmitted in the small cell, or the serving cell configured as the small cell, or the component carrier component carrier corresponding to the small cell.

In the embodiment, in a case where different frame structure types (FDD (type 1) and TDD (type 2)) are respectively applied to a primary cell and at least one secondary cell, if the terminal device 2 does not have a function (performance, capacity) of simultaneously performing transmission and reception between bands supported by each of the primary cell and the secondary cell, the terminal device 2 which performs cell aggregation (carrier aggregation) does not simultaneously perform transmission and reception between the primary cell and the secondary cell.

Figure 4:
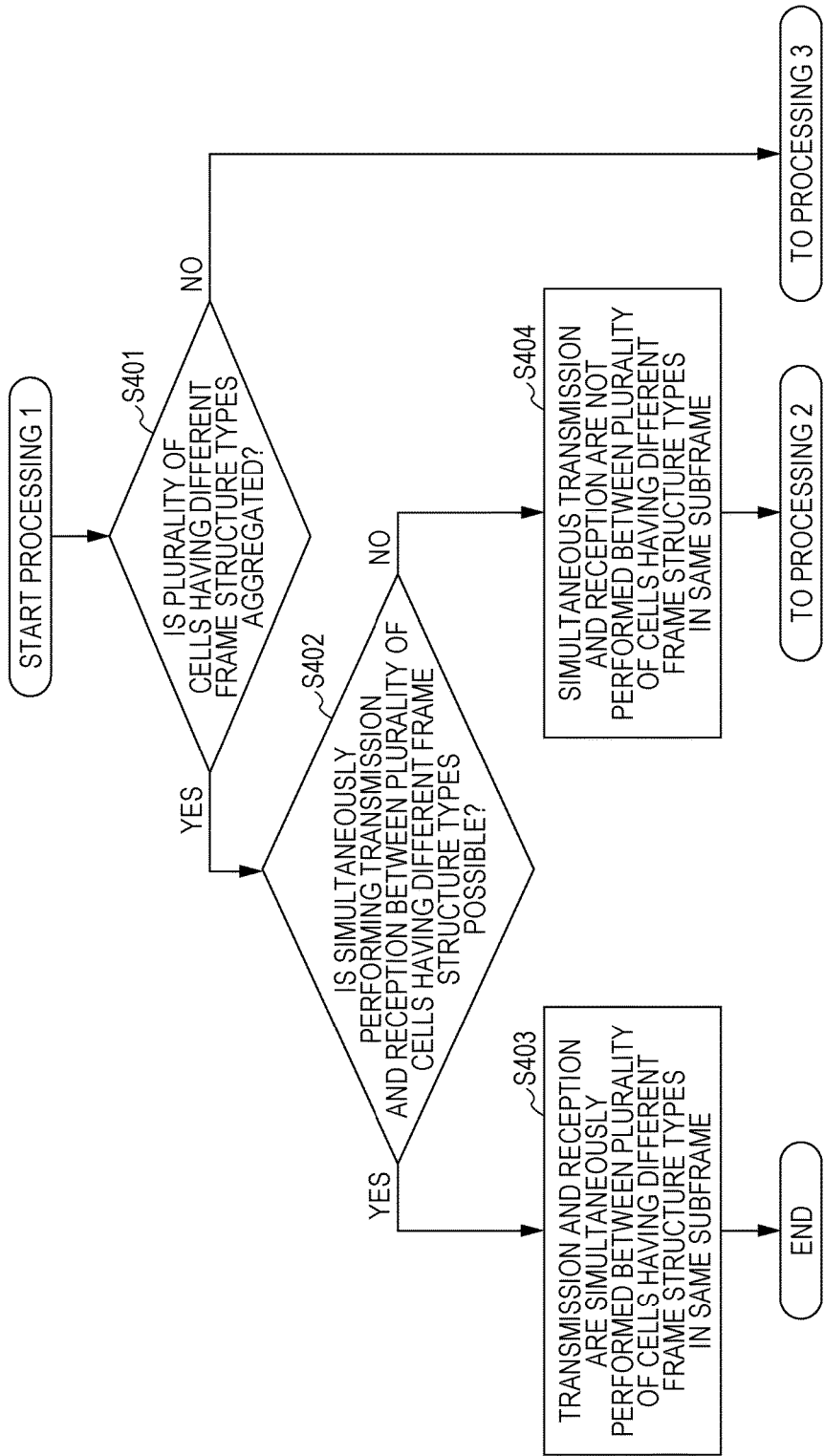
FIG. 4 is a flowchart illustrating procedures of Processing 1 in the terminal device 2 according to the embodiment of the present invention.

FIG. 4 is a flowchart illustrating procedures of Processing 1 of the terminal device 2 according to the embodiment of the present invention. In a case where cell aggregation is performed between a plurality of cells, the terminal device 2 determines whether or not a plurality of cells having different frame structure types is aggregated (Step S401). In a case where the plurality of cells having different frame structure types is aggregated (S401: YES), the terminal device 2 determines whether or not a function of simultaneously performing transmission and reception between the plurality of cells having different frame structure types is provided (Step S402). In a case where the function of simultaneously performing transmission and reception between the plurality of cells having different frame structure types is provided (S402: YES), the terminal device 2 may simultaneously perform transmission and reception between the plurality of cells having different frame structure types, in the same subframe (Step S403). In a case where the plurality of cells having different frame structure types is not aggregated (S401: NO), that is, in a case where a plurality of cells having the same frame structure type is aggregated, the process proceeds to Processing 3. In a case where the function of simultaneously performing transmission and reception between the plurality of cells having different frame structure types is not provided (S402: NO), the process proceeds to Processing 2.

An example of Processing 2 will be described below.

In a case where a plurality of cells to which different frame structure types are respectively applied is aggregated, and the function (performance, capacity) of simultaneously performing transmission and reception between the plurality of cells which have been aggregated for the terminal device 2 is not provided, the terminal device 2 determines whether transmission and reception is simultaneously performed in a secondary cell of a subframe, in accordance with the type of the same subframe of a primary cell.

In a case where a plurality of cells to which different frame structure types are respectively applied is aggregated, and the function of simultaneously performing transmission and reception between the plurality of cells which have been aggregated for the terminal device 2 is not provided, if the subframe of the primary cell is a downlink subframe, the terminal device 2 does not transmit an uplink signal (a certain channel or a certain signal including the uplink signal) in the secondary cell of the same subframe. At this time, the base station apparatus 1 does not expect that the uplink signal is transmitted from the terminal device 2 in the subframe. That is, the base station apparatus 1 may not receive the uplink signal which has been transmitted from the terminal device 2 in the subframe.

In a case where a plurality of cells to which different frame structure types are respectively applied is aggregated, and the function of simultaneously performing transmission and reception between the plurality of cells which have been aggregated for the terminal device 2 is not provided, if the subframe of the primary cell is an uplink subframe (valid uplink subframe) in which transmission of an uplink is required, the terminal device 2 does not expect that a downlink signal can be received in the secondary cell of the same subframe. That is, in this case, the terminal device 2 does not expect that a downlink signal is transmitted from the base station apparatus 1 (that transmission of a downlink occurs). Thus, in this case, the terminal device 2 may not receive the downlink signal in the secondary cell. In this case, the base station apparatus 1 may not transmit the downlink signal to the terminal device 2 in the secondary cell.

In a case where a plurality of cells to which different frame structure types are respectively applied is aggregated, and the function of simultaneously performing transmission and reception between the plurality of cells which have been aggregated for the terminal device 2 is not provided, if the subframe of the primary cell is an uplink subframe (invalid uplink subframe) in which transmission of an uplink is not required, the terminal device 2 may receive a downlink signal in the secondary cell of the same subframe. In this case, the base station apparatus 1 may transmit the downlink signal to the terminal device 2 in the secondary cell.

In a case where a plurality of cells to which different frame structure types are respectively applied is aggregated, and the function of simultaneously performing transmission and reception between the plurality of cells which have been aggregated for the terminal device 2 is not provided, if transmission of an uplink is required for a certain subframe of a secondary cell by cross carrier scheduling in a primary cell (or secondary cell), the terminal device 2 does not expect that a downlink signal can be received in the primary cell of the same subframe. That is, in this case, the terminal device 2 does not expect that the downlink signal is transmitted from the base station apparatus 1. Thus, in this case, the terminal device 2 may not receive the downlink signal.

In a case where a plurality of cells to which different frame structure types are respectively applied is aggregated, and the function of simultaneously performing transmission and reception between the plurality of cells which have been aggregated for the terminal device 2 is not provided, if transmission of an uplink is required for a certain subframe of a secondary cell by multi-subframe scheduling or cross subframe scheduling in a primary cell (secondary cell), the terminal device 2 does not expect that a downlink signal can be received in the primary cell of the same subframe. That is, in this case, the terminal device 2 does not expect that the downlink signal is transmitted from the base station apparatus 1. Thus, in this case, the terminal device 2 may not receive the downlink signal. In this case, the base station apparatus 1 may not transmit the downlink signal to the terminal device 2 in the secondary cell.

In a case where a plurality of cells to which different frame structure types are respectively applied is aggregated, and the function of simultaneously performing transmission and reception between the plurality of cells which have been aggregated for the terminal device 2 is not provided, if transmission of a downlink is required for a subframe of a secondary cell by multi-subframe scheduling or cross subframe scheduling in a primary cell (or secondary cell), the terminal device 2 does not expect that an uplink signal can be received in the primary cell of the same subframe. That is, in this case, the terminal device 2 does not expect that transmission of an uplink is required in the subframe. Thus, in this case, the terminal device 2 may not transmit an uplink signal. For example, transmission of P-SRS may be dropped even in the same subframe as a transmission subframe of P-SRS.

In a case where a plurality of cells to which different frame structure types are respectively applied is aggregated, and the function of simultaneously performing transmission and reception between the plurality of cells which have been aggregated for the terminal device 2 is not provided, if the subframe of a primary cell is a special subframe, the terminal device 2 does not expect that a PDSCH/EPDCCH/PMCH/PRS can be received in a secondary cell of the same subframe. In this case, the terminal device 2 may not transmit PUSCH/PUCCH/PRACH formats 1 to 3. In this case, the base station apparatus 1 does not expect that the PUSCH/PUCCH/PRACH formats 1 to 3 are transmitted from the terminal device 2.

In a case where a plurality of cells to which different frame structure types are respectively applied is aggregated, and the function of simultaneously performing transmission and reception between the plurality of cells which have been aggregated for the terminal device 2 is not provided, if a special subframe of a primary cell and a downlink subframe of a secondary cell are the same subframe as each other, the terminal device 2 does not expect that a downlink signal can be received with OFDM symbols of the secondary cell, which overlap a guard period and an UpPTS in the subframe of the primary cell. In this case, the terminal device 2 may not receive the downlink signal. In this case, the terminal device 2 may receive the downlink signal (for example, PDCCH) with the OFDM symbols of the secondary cell, which do not overlap the guard period and the UpPTS in the subframe of the primary cell. In this case, the base station apparatus 1 may transmit the downlink signal with OFDM symbols of the secondary cell, which do not overlap the guard period and the UpPTS in the subframe of the primary cell.

In a case where a plurality of cells to which different frame structure types are respectively applied is aggregated, and the function of simultaneously performing transmission and reception between the plurality of cells which have been aggregated for the terminal device 2 is not provided, if a special subframe of a primary cell and an uplink subframe of a secondary cell are the same subframe as each other, the terminal device 2 does not expect that an uplink signal can be received with SC-FDMA symbols (OFDM symbols) of the secondary cell, which overlap a guard period and a DwPTS in the subframe of the primary cell. In this case, the terminal device 2 may not transmit the uplink signal. In this case, the terminal device 2 may transmit the uplink signal (for example, SRS or PRACH format 4 which is allowed to be disposed at an UpPTS) with SC-FDMA symbols of the secondary cell, which do not overlap the guard period and the DwPTS in the subframe of the primary cell. In this case, the base station apparatus 1 may transmit the uplink signal with SC-FDMA symbols of the secondary cell, which do not overlap the guard period and the DwPTS in the subframe of the primary cell.

In a case where a plurality of cells to which different frame structure types are respectively applied is aggregated, and the function of simultaneously performing transmission and reception between the plurality of cells which have been aggregated for the terminal device 2 is not provided, if transmission of an uplink is required in a certain subframe of a certain cell among the plurality of cells, even when another cell uses a downlink subframe, the terminal device 2 does not expect that a downlink signal can be received in the downlink subframe. In other words, the terminal device 2 does not expect that the downlink signal is transmitted from the base station apparatus 1 in the same subframe as that of another cell. That is, in this case, the terminal device 2 does not expect that the downlink signal is transmitted from the base station apparatus 1. Thus, in this case, the terminal device 2 may not receive the downlink signal. In this case, the base station apparatus 1 may not transmit the downlink signal to the terminal device 2.

In a case where a plurality of cells to which different frame structure types are respectively applied is aggregated, and the function of simultaneously performing transmission and reception between the plurality of cells which have been aggregated for the terminal device 2 is not provided, and does not have a function of performing uplink carrier aggregation, if transmission of an uplink is required for a subframe of a primary cell, the terminal device 2 does not simultaneously perform transmission of an uplink signal and reception of a downlink signal in a secondary cell having the same subframe. If transmission of an uplink is required for a certain subframe of the secondary cell by cross carrier scheduling (or cross subframe scheduling, multi-subframe scheduling), transmission of the uplink signal and reception of the downlink signal may not be performed in the primary cell having the same subframe. In this case, the base station apparatus 1 may not perform reception of the uplink signal and transmission of the downlink signal in the primary cell having the same subframe.

In a case where a plurality of cells to which different frame structure types are respectively applied is aggregated, the function of simultaneously performing transmission and reception between the plurality of cells which have been aggregated for the terminal device 2 is not provided, and a function of performing downlink carrier aggregation is not provided, if transmission of an uplink is required for a certain subframe of a primary cell, the terminal device 2 does not expect that a downlink signal can be received in a secondary cell having the same subframe. If transmission of an uplink is required for a certain subframe of the secondary cell by cross carrier scheduling (or cross subframe scheduling, multi-subframe scheduling), the terminal device 2 does not expect that a downlink signal can be received in a primary cell having the same subframe. That is, in this case, the terminal device 2 does not expect that the downlink signal is transmitted from the base station apparatus 1. Thus, in this case the terminal device 2 may not receive the downlink signal.

In a case where a plurality of cells to which different frame structure types are respectively applied is aggregated, and the function of simultaneously performing transmission and reception between the plurality of cells which have been aggregated for the terminal device 2, is not provided in an uplink, if a subframe of a primary cell is a downlink subframe, the terminal device 2 does not transmit an uplink signal in a secondary cell having the same subframe. In this case, the base station apparatus 1 does not expect that the uplink signal is transmitted from the terminal device 2 in the secondary cell having the same subframe.

In a case where a plurality of cells to which different frame structure types are respectively applied is aggregated, and the function of simultaneously performing transmission and reception between the plurality of cells which have been aggregated for the terminal device 2 is not provided in an uplink, if a subframe of a primary cell is a special subframe, the terminal device 2 does not expect that a PDSCH/EPDCCH/PMCH/PRS can be received in a secondary cell having the same subframe. In this case, the terminal device 2 may not receive the PDSCH/EPDCCH/PMCH/PRS. In this case, the terminal device 2 may not transmit PUSCH/PUCCH/PRACH formats 1 to 3.

In a case where a plurality of cells to which different frame structure types are respectively applied is aggregated, and the function of simultaneously performing transmission and reception between the plurality of cells which have been aggregated for the terminal device 2 is not provided in a downlink, if a subframe of a primary cell is an uplink subframe, the terminal device 2 does not expect that a downlink signal can be received in a secondary cell having the same subframe. That is, in this case, the terminal device 2 may not receive the downlink signal.

In a case where a plurality of cells to which different frame structure types are respectively applied is aggregated, and the function of simultaneously performing transmission and reception between the plurality of cells which have been aggregated for the terminal device 2 is not provided in a downlink, if a special subframe of a primary cell and an uplink subframe of a secondary cell are the same subframe as each other, the terminal device 2 does not expect that an uplink signal can be received with SC-FDMA symbols (OFDM symbols) of the secondary cell, which overlap a guard period and a DwPTS in the subframe of the primary cell. In this case, the terminal device 2 may not transmit the uplink signal. In this case, the terminal device 2 may transmit the uplink signal (for example, SRS or PRACH format 4 which is allowed to be disposed at an UpPTS) with SC-FDMA symbols of the secondary cell, which do not overlap the guard period and the DwPTS in the subframe of the primary cell.

In a case where a plurality of cells to which different frame structure types are respectively applied is aggregated, and the function of simultaneously performing transmission and reception is not provided in an uplink of a secondary cell among the plurality of cells which have been aggregated for the terminal device 2, if a subframe of a primary cell is a downlink subframe, the terminal device 2 does not transmit an uplink signal in the secondary cell having the same subframe.

In a case where a plurality of cells to which different frame structure types are respectively applied is aggregated, and the function of simultaneously performing transmission and reception is not provided in an uplink of a secondary cell among the plurality of cells which have been aggregated for the terminal device 2, if a subframe of a primary cell is a special subframe, the terminal device 2 does not expect that a PDSCH/EPDCCH/PMCH/PRS can be received in a secondary cell having the same subframe. In this case, the terminal device 2 may not receive the PDSCH/EPDCCH/PMCH/PRS. In this case, the terminal device 2 may not transmit PUSCH/PUCCH/PRACH formats 1 to 3.

In a case where a plurality of cells to which different frame structure types are respectively applied is aggregated, and the function of simultaneously performing transmission and reception is not provided in a downlink of a secondary cell among the plurality of cells which have been aggregated for the terminal device 2, if a subframe of a primary cell is an uplink subframe, the terminal device 2 does not expect that a downlink signal can be received in a secondary cell having the same subframe. That is, in this case, the terminal device 2 may not receive the downlink signal.

In a case where a plurality of cells to which different frame structure types are respectively applied is aggregated, and the function of simultaneously performing transmission and reception is not provided in a downlink of a secondary cell among the plurality of cells which have been aggregated for the terminal device 2, if a special subframe of a primary cell and an uplink subframe of a secondary cell are the same subframe as each other, the terminal device 2 does not expect that an uplink signal can be received with SC-FDMA symbols (OFDM symbols) of the secondary cell, which overlap a guard period and a DwPTS in the subframe of the primary cell. In this case, the terminal device 2 may not transmit the uplink signal. In this case, the terminal device 2 may transmit the uplink signal (for example, SRS or PRACH format 4 which is allowed to be disposed at an UpPTS) with SC-FDMA symbols of the secondary cell, which do not overlap the guard period and the DwPTS in the subframe of the primary cell.

Here, integration of the plurality of cells to which different frame structure types are applied includes, for example, a case where a cell in which a frame structure type is Type 1 (FDD), and a cell in which a frame structure type is Type 2 (TDD) are integrated. The integration of the plurality of cells to which different frame structure types are applied includes, for example, a case where a plurality of cells in which a frame structure type is Type 1 (FDD), and a plurality of cells in which a frame structure type is Type 2 (TDD) are integrated. That is, the integration of the plurality of cells to which different frame structure types are applied includes, for example, a case where one or more cells in which a frame structure type is Type 1 (FDD), and one or more cells in which a frame structure type is Type 2 (TDD) are integrated.

The descriptions for the frame structure type are an example, and may be similarly applied to a case where Type 3 or Type 4 is defined.

In a case where the frame structure type for a primary cell is FDD, the frame structure type for at least one secondary cell among secondary cells is TDD, and the function of simultaneously performing transmission and reception between the plurality of cells which have been aggregated for the terminal device 2 and respectively have different frame structure types is not provided, the terminal device 2 does not transmit an uplink signal in an uplink subframe in the secondary cell in which TDD is configured.

In a case where the frame structure type for a primary cell is FDD, the frame structure type for at least one secondary cell among secondary cells is TDD, and the function of simultaneously performing transmission and reception between the plurality of cells which have been aggregated for the terminal device 2 and respectively have different frame structure types is not provided, if transmission of an uplink is required for a certain subframe of the primary cell, the terminal device 2 may not receive a downlink signal in a secondary cell having the same subframe. In other words, if transmission of an uplink is required for a certain subframe of the primary cell, the terminal device 2 does not expect that the downlink signal is transmitted from the base station apparatus 1 in the secondary cell having the same subframe.

In a case where the frame structure type for a primary cell is FDD, the frame structure type for at least one secondary cell among secondary cells is TDD, and the function of simultaneously performing transmission and reception between the plurality of cells which have been aggregated for the terminal device 2 and respectively have different frame structure types is not provided, if half duplex for an FDD band of the primary cell is supported, the terminal device 2 does not normally monitor a downlink subframe, a PDCCH, or a CRS in the primary cell. Thus, in a case where switching from a downlink subframe to an uplink subframe is performed in the primary cell, the uplink signal may be transmitted in the secondary cell having the same subframe. Similarly, in this case, the terminal device 2 does not expect that the downlink signal can be received in a secondary cell having the same subframe as the subframe in which transmission of the uplink is required in the primary cell. However, the downlink signal may be received in a secondary cell having the same subframe as the subframe in which transmission of the uplink is not required in the primary cell.

In a case where FDD is set for a primary cell, TDD is set for at least one secondary cell among secondary cells, and the function of simultaneously performing transmission and reception between the plurality of cells which have been aggregated for the terminal device 2 and respectively have different frame structure types is not provided, if transmission of an uplink is required for a certain subframe of the secondary cell by cross carrier scheduling (or cross subframe scheduling, multi-subframe scheduling), the terminal device 2 may not receive a downlink signal in the primary cell having the same subframe. In other words, in a case where transmission of an uplink is required for a certain subframe of the secondary cell by cross carrier scheduling (or cross subframe scheduling, multi-subframe scheduling), the terminal device 2 does not expect that the downlink signal is transmitted from the base station apparatus 1 in the primary cell having the same subframe. In a case where transmission of a downlink is indicated for a certain subframe of the secondary cell by the cross carrier scheduling (or cross subframe scheduling, multi-subframe scheduling), the terminal device 2 may not transmit an uplink signal in the primary cell having the same subframe.

In a case where TDD is set for a primary cell, FDD is set for at least one secondary cell among secondary cells, and the function of simultaneously performing transmission and reception between the plurality of cells which have been aggregated for the terminal device 2 and respectively have different frame structure types is not provided, if the subframe of the primary cell is a downlink subframe, the terminal device 2 does not transmit an uplink signal in the same subframe of the secondary cell.

In a case where TDD is set for a primary cell, FDD is set for at least one secondary cell among secondary cells, and the function of simultaneously performing transmission and reception between the plurality of cells which have been aggregated for the terminal device 2 and respectively have different frame structure types is not provided, if an uplink signal is scheduled in a certain subframe of the primary cell, the terminal device 2 does not expect that a downlink signal is transmitted from the base station apparatus 1 in the same subframe of the secondary cell. If transmission of an uplink is not required in the certain subframe of the primary cell, the terminal device 2 may receive the downlink signal in the secondary cell having the same subframe.

In a case where TDD is set for a primary cell, FDD is set for at least one secondary cell among secondary cells, and the function of simultaneously performing transmission and reception between the plurality of cells which have been aggregated for the terminal device 2 and respectively have different frame structure types is not provided, if transmission of an uplink is required in a certain subframe of the secondary cell by cross carrier scheduling (or cross subframe scheduling, multi-subframe scheduling), the terminal device 2 does not expect that a downlink signal is transmitted from the base station apparatus 1 in the primary cell having the same subframe. If transmission of a downlink is indicated for the certain subframe of the secondary cell by the cross carrier scheduling (or cross subframe scheduling, multi-subframe scheduling), the terminal device 2 may not transmit an uplink signal in the same subframe of the primary cell.

In a case where TDD is set for a primary cell, a TDD UL/DL configuration different from that of the primary cell is set for at least one secondary cell among secondary cells, and the function of simultaneously performing transmission and reception between the plurality of cells which have been aggregated for the terminal device 2 and respectively have different frame structure types is not provided, the terminal device 2 does not simultaneously perform transmission and reception between the primary cell and the secondary cell in the same subframe. TDD UL/DL configurations of which comparison is performed between the plurality of cells may be an uplink reference TDD UL/DL configuration. The TDD UL/DL configurations of which comparison is performed between the plurality of cells may be a downlink reference TDD UL/DL configuration. The TDD UL/DL configurations of which comparison is performed between the plurality of cells may be a TDD UL/DL configuration transmitted by SIB1. The TDD UL/DL configurations of which comparison is performed between the plurality of cells may be a TDD UL/DL configuration transmitted by RRC signaling (may be a TDD UL/DL configuration subjected to signaling by a RRC). Regarding the TDD UL/DL configurations of which comparison is performed between the plurality of cells, one thereof may be transmitted by SIB1, and another thereof may be transmitted by RRC signaling.

In a case where a plurality of cells having the same frame structure type is aggregated, if the frame structure type is FDD, transmission and reception may be simultaneously performed between cells. In a case where a plurality of cells having the same frame structure type is aggregated, if the frame structure type is TDD, it may be determined whether or not transmission and reception may be simultaneously performed between cells, in accordance with whether or not different TDD UL/DL configurations are respectively set in cells.

Here, requiring transmission of an uplink may mean that an uplink signal is scheduled by a grant (dynamic scheduled grant, semi-persistent scheduling grant, random access response grant, uplink grant) relating to transmission of the uplink. Requiring transmission of an uplink may mean that a PUSCH or an SRS is required by an SRS request or a CSI request included in a DCI format. Requiring transmission of an uplink may mean that an uplink signal is scheduled by a parameter which has been set by a higher layer. Here, an uplink subframe in which transmission of an uplink is required is referred to as an valid uplink subframe. An uplink subframe in which transmission of an uplink is not required is referred to as an invalid uplink subframe.

A valid downlink subframe may be a subframe to which resources of a PDSCH is assigned by a downlink grant. The valid downlink subframe may be a downlink subframe in which a transmission interval or a reception interval of a downlink signal, and a measurement interval of the downlink signal are set by a higher layer. For example, the valid downlink subframe may be indicated in a manner of a bitmap, by using a CSI measurement subframe set. The valid downlink subframe may be indicated in a manner of a bitmap, by using a measurement subframe pattern. A downlink subframe to be measured may be indicated by a period and a subframe offset. The terminal device 2 may not expect that a downlink signal is transmitted as an invalid downlink subframe in a downlink subframe in which the measurement interval is not indicated by the higher layer.

Figure 5:
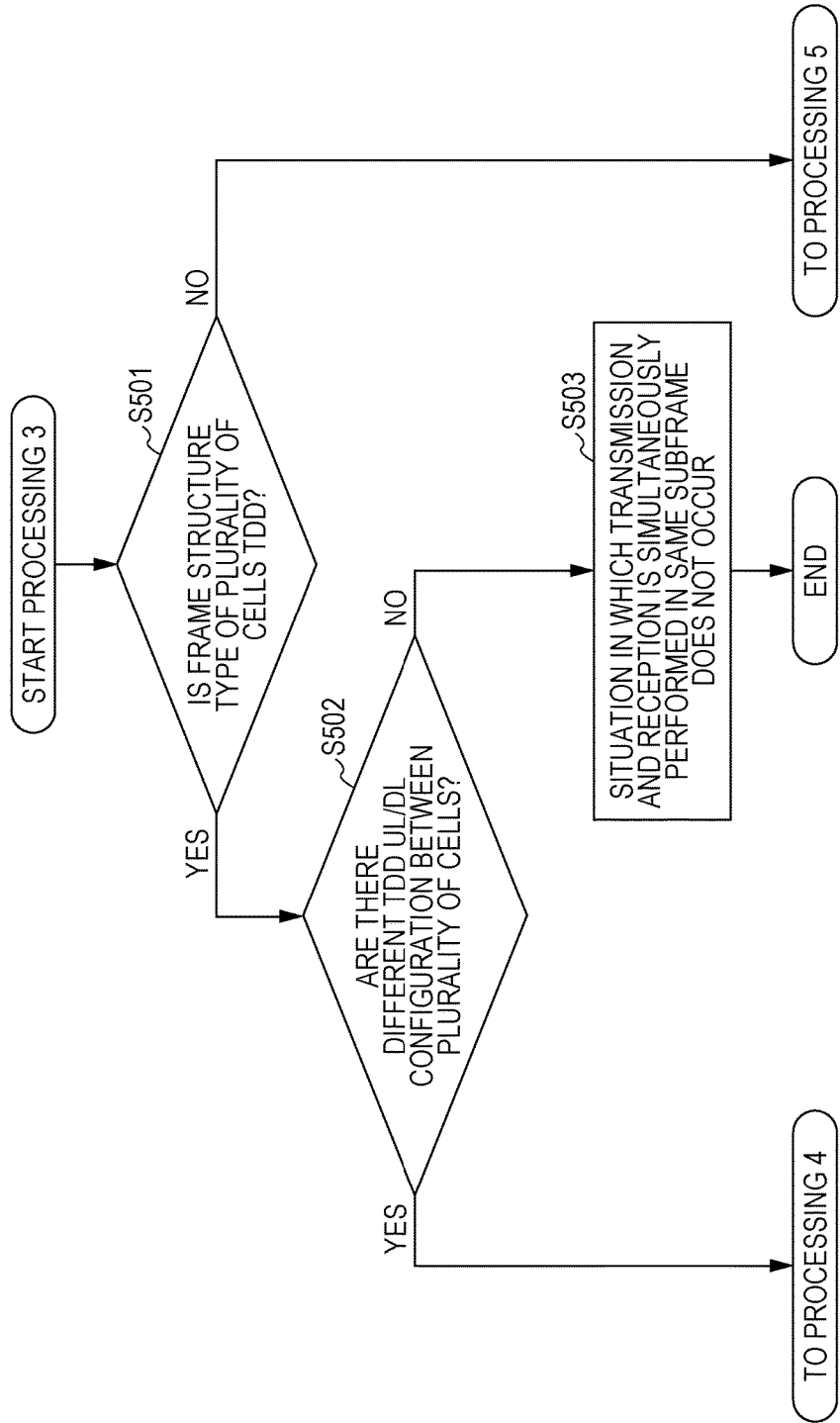
FIG. 5 is a flowchart illustrating procedures of Processing 3 in the terminal device 2 according to the embodiment of the present invention.

FIG. 5 is a flowchart illustrating procedures of Processing 3 of the terminal device 2 according to the embodiment of the present invention. It is determined whether or not frame structure types of a plurality of cells which have been aggregated are TDD (Step S501). In a case where the frame structure types of a plurality of cells which have been aggregated are TDD (S501: YES), it is determined whether or not different TDD UL/DL configurations are respectively set in the plurality of cells (S502). In a case where the different TDD UL/DL configurations are respectively set in the plurality of cells (S502: YES), the process proceeds to Processing 4. In a case where the different TDD UL/DL configurations are not respectively set in the plurality of cells (S502: NO), that is, in a case where TDD UL/DL configurations are set in the plurality of cells, even when transmission may be simultaneously performed or reception may be simultaneously performed in the plurality of cells having the same subframe, transmission and reception is not simultaneously performed. Thus, the subsequent processes do not occur (Step S503). In a case where the frame structure types of a plurality of cells which have been aggregated are not TDD (S501: NO), for example, in a case where the frame structure types of a plurality of cells which have been aggregated are FDD, the process proceeds to Processing 5.

An example of Processing 4 will be described below.

In a case where a plurality of cells having different TDD UL/DL configurations is aggregated and the function of simultaneously performing transmission and reception between the plurality of cells which have been aggregated for the terminal device 2 is not provided, the terminal device 2 determines whether transmission and reception is simultaneously performed in a secondary cell of a subframe, in accordance with the type of the same subframe of a primary cell.

In a case where a plurality of cells having different TDD UL/DL configurations is aggregated and the function of simultaneously performing transmission and reception between the plurality of cells which have been aggregated for the terminal device 2 is not provided, if the subframe of the primary cell is a downlink subframe, the terminal device 2 does not transmit an uplink signal (a certain channel or a certain signal including the uplink signal) in the secondary cell of the same subframe.

In a case where a plurality of cells having different TDD UL/DL configurations is aggregated and the function of simultaneously performing transmission and reception between the plurality of cells which have been aggregated for the terminal device 2 is not provided, if a subframe of a primary cell is an uplink subframe, the terminal device 2 does not expect that a downlink signal can be received in a secondary cell having the same subframe. That is, in this case, the terminal device 2 does not expect that the downlink signal is transmitted from the base station apparatus 1. Thus, in this case, the terminal device 2 may not receive the downlink signal in the secondary cell.

In a case where a plurality of cells having different TDD UL/DL configurations is aggregated and the function of simultaneously performing transmission and reception between the plurality of cells which have been aggregated for the terminal device 2 is not provided, if a subframe of a primary cell is a special subframe, the terminal device 2 does not expect that a PDSCH/EPDCCH/PMCH/PRS can be received in a secondary cell having the same subframe. In this case, the terminal device 2 may not transmit PUSCH/PUCCH/PRACH formats 1 to 3.

In a case where a plurality of cells having different TDD UL/DL configurations is aggregated and the function of simultaneously performing transmission and reception between the plurality of cells which have been aggregated for the terminal device 2 is not provided, if a special subframe of a primary cell and a downlink subframe of a secondary cell are the same subframe as each other, the terminal device 2 does not expect that a downlink signal can be received with OFDM symbols of the secondary cell, which overlap a guard period and an UpPTS in the subframe of the primary cell. In this case, the terminal device 2 may not receive the downlink signal. In this case, the terminal device 2 may receive the downlink signal (for example, PDCCH) with the OFDM symbols of the secondary cell, which do not overlap the guard period and the UpPTS in the subframe of the primary cell.

An example of Processing 5 will be described below.

In a case where the frame structure types of a plurality of cells are FDD, the terminal device 2 determines whether or not performing transmission and reception between the plurality of cells is allowed, based on whether or not uplink carrier aggregation and/or downlink carrier aggregation is applied in different FDD bands (bands in which the duplex mode is FDD) in which aggregation is simultaneously performed. In a case where the uplink carrier aggregation and/or downlink carrier aggregation is possible in the different FDD bands in which aggregation is simultaneously performed, performing transmission and reception between the plurality of cells is possible in the plurality of cells having the same subframe. In a case where half duplex is applied in different FDD bands, transmission and reception may not be simultaneously performed in the plurality of cells having the same subframe. In a case where the terminal device 2 includes two or more radio transmission units and/or radio reception units (radio transmission and reception units, RF units), transmission and reception may be simultaneously performed in the plurality of cells.

The embodiment may be also applied to a band (E-UTRA Operating Band, E-UTRA Band, or Band) different from that in the above descriptions.

Here, a band in which the duplex mode is TDD may be referred to as a TDD band, and a band in which the duplex mode is FDD may be referred to as an FDD band. Similarly, a cell (carrier) in which a frame structure type is FDD (type 1) may be referred to as an FDD cell (FDD carrier), and a cell (carrier) in which a frame structure type is TDD (type 2) may be referred to as a TDD cell (TDD carrier).

In a case where the terminal device 2 has the function of simultaneously performing transmission and reception between a plurality of cells in different bands, the terminal device 2 which performs cell aggregation may simultaneously perform transmission and reception in a plurality of cells in different bands in the same subframe. In a case where a plurality of cells in which the duplex mode is TDD is provided, transmission and reception may be simultaneously performed even in a case where TDD UL/DL configurations of the plurality of cells (TDD cells) are different from each other. In cell aggregation between different bands in which TDD is supported, it may be determined whether or not the cell aggregation can be performed in the plurality of TDD cells, based on whether or not the function of simultaneously performing transmission and reception is provided.

In a case where a plurality of cells in different bands is aggregated, and the terminal device 2 does not have a function of simultaneously performing transmission and reception between the plurality of cells in the different bands, if the subframe of the primary cell is a downlink subframe, the terminal device 2 does not transmit an uplink signal (physical channel, physical signal) in a secondary cell having the same subframe.

In a case where a plurality of cells in different bands is aggregated, and the terminal device 2 does not have a function of simultaneously performing transmission and reception between the plurality of cells in the different bands, if a subframe of a primary cell is a special subframe and a subframe of a secondary cell is a downlink subframe in the same subframe, the terminal device 2 does not expect that a PDSCH/EPDCCH/PMCH/PRS can be received in the secondary cell.

In a case where a plurality of cells in different bands is aggregated, and the terminal device 2 does not have a function of simultaneously performing transmission and reception between the plurality of cells in the different bands, if a subframe of a primary cell is a special subframe and a subframe of a secondary cell is a downlink subframe in the same subframe, the terminal device 2 does not expect that another signal (downlink signal) can be received with OFDM symbols of the secondary cell, which overlap a guard period and an UpPTS of the primary cell.

In a case where a plurality of cells in different bands is aggregated, and the terminal device 2 does not have a function of simultaneously performing transmission and reception between the plurality of cells in the different bands, if a subframe of a primary cell is an uplink subframe in which transmission of an uplink is required, the terminal device 2 does not expect that a downlink signal can be received in the same subframe of a secondary cell.

In a case where a plurality of cells in different bands is aggregated, and the terminal device 2 does not have a function of simultaneously performing transmission and reception between the plurality of cells in the different bands, if a subframe of a secondary cell is an uplink subframe in which transmission of an uplink is required, the terminal device 2 does not expect that a downlink signal can be received in the same subframe of a primary cell.

That is, in a case where a plurality of cells in different bands is aggregated, and the terminal device 2 does not have a function of simultaneously performing transmission and reception between the plurality of cells in the different bands, if an uplink subframe in which transmission of an uplink is required in a certain cell is provided, the terminal device 2 may not receive a downlink signal in the same subframe of another cell, regardless of a primary cell or a secondary cell.

In a case where a plurality of cells in different bands is aggregated, and the terminal device 2 does not have a function of simultaneously performing transmission and reception between the plurality of cells in the different bands, if there is no uplink subframe in which transmission of an uplink is required in a cell supported by the terminal device 2, the terminal device 2 may receive a downlink signal in the same subframe regardless of a primary cell or a secondary cell.

In a case where a plurality of cells in different bands is aggregated, the terminal device 2 does not have a function of simultaneously performing transmission and reception between the plurality of cells in the different bands, and a function of performing uplink carrier aggregation between bands supported by the terminal device 2, if transmission of an uplink is required for a certain subframe of a primary cell, the terminal device 2 does not transmit an uplink signal and receive a downlink signal in a secondary cell having the same subframe. If transmission of an uplink is required for a certain subframe of the secondary cell by cross carrier scheduling (or cross subframe scheduling, multi-subframe scheduling), transmission of the uplink signal and reception of the downlink signal is not performed in the primary cell having the same subframe.

In a case where a plurality of cells in different bands is aggregated, the terminal device 2 does not have a function of simultaneously performing transmission and reception between the plurality of cells in the different bands, and a function of performing downlink carrier aggregation between bands supported by the terminal device 2, if transmission of an uplink is required for a certain subframe of a primary cell, the terminal device 2 may not receive a downlink signal in a secondary cell having the same subframe. If transmission of an uplink is required for a certain subframe of the secondary cell by cross carrier scheduling (or cross subframe scheduling, multi-subframe scheduling), the terminal device 2 may not receive the downlink signal in the primary cell having the same subframe. In this case, the terminal device 2 does not expect that the downlink signal can be received. If transmission of a downlink is indicated for the certain subframe of the secondary cell by the cross carrier scheduling (or cross subframe scheduling, multi-subframe scheduling), the terminal device 2 may not transmit an uplink signal in the primary cell having the same subframe.

In the embodiment, in a case where a subframe in which a CRS or a CSI-RS is measured for each of a plurality of cells, and a subframe in which a PDCCH or an EPDCCH is monitored are set by higher layer signaling, if transmission of an uplink is not required for a first cell in the subframe thereof, the terminal device 2 may measure the CRS or the CSI-RS for a second cell and monitor the PDCCH or the EPDCCH. In a case where transmission of P-SRS to the first cell occurs in the subframe thereof, the transmission of P-SRS may be dropped. In a case where transmission of a PUCCH having an attached CSI, to the first cell occurs in the subframe thereof, the transmission of a PUCCH having an attached CSI has priority, and the CRS or the CSI-RS for the second cell may not be measured, and the PDCCH or the EPDCCH may not be monitored. In a case where transmission of a PUCCH having HARQ-ACK and/or SR to the first cell occurs in the subframe thereof, the transmission of a PUCCH having HARQ-ACK and/or SR has priority, and the CRS or the CSI-RS for the second cell may not be measured, and the PDCCH or the EPDCCH may not be monitored.

In the embodiment, in a case where a subframe in which a CRS or a CSI-RS is measured for each of a plurality of cells, and a subframe in which a PDCCH or an EPDCCH is monitored are not set by higher layer signaling, in the same subframe of the terminal device 2, the subframe is an uplink subframe in the first cell and the subframe is a downlink subframe in the second cell. In a case where transmission of P-SRS occurs in the uplink subframe of the first cell, the P-SRS may be transmitted in the subframe as long as detection of a PDCCH in the second cell is not possible.

In the embodiment, in a case where a plurality of cells having a TDD band and an FDD band is aggregated, and a function of simultaneously performing transmission and reception between the plurality of cells which have been aggregated is not provided, the terminal device 2 may support only half duplex in a band of FDD (cell of an FDD band) (may not support full duplex in the FDD band). In this case, whether or not half duplex is supported in an FDD band applied to at least one cell among the plurality of cells which have been aggregated may be correlated with whether or not a function of simultaneously performing transmission and reception between cells of the TDD band and cells of the FDD band which have been aggregated is supported.

In a case where a plurality of cells having a TDD band and an FDD band is aggregated, and a function of simultaneously performing transmission and reception between the plurality of cells which have been aggregated is provided, one of half duplex or full duplex in the FDD band may be determined based on whether or not half duplex is supported in the FDD band. That is, in this case, supporting half duplex in the FDD band may be independently indicated.

The terminal device 2 in which cross carrier scheduling is set may perform cross carrier scheduling of an uplink and a downlink. However, the terminal device 2 which performs carrier aggregation by a TDD carrier and an FDD carrier independently sets cross carrier scheduling for the uplink and cross carrier scheduling for the downlink. Thus, communication efficiency is improved.

Figure 6:
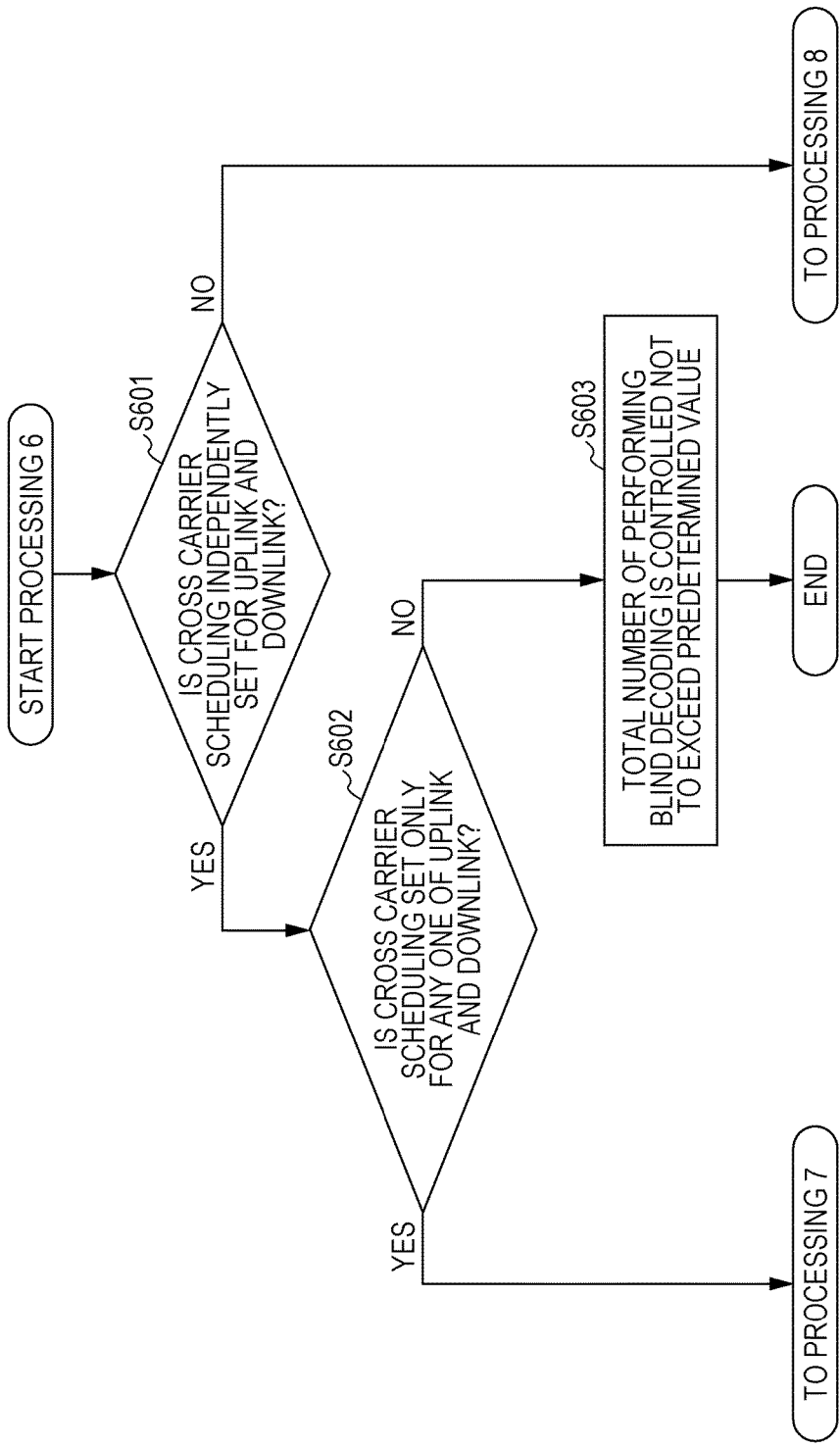
FIG. 6 is a flowchart illustrating procedures of Processing 6 in the terminal device 2 according to the embodiment of the present invention.

FIG. 6 is a flowchart illustrating procedures of Processing 6 in the terminal device 2 according to the embodiment of the present invention. The terminal device 2 determines whether or not a function of performing cross carrier scheduling of an uplink and a downlink is independently supported in functions of the terminal device 2 (Step S601). In a case where the function of performing cross carrier scheduling of an uplink and a downlink is independently supported in functions of the terminal device 2 (S601: YES), the terminal device 2 transmits function information thereof to the base station apparatus 1. The base station apparatus 1 independently sets a configuration relating to cross carrier scheduling of an uplink and a downlink, in the terminal device 2 based on the function information. The base station apparatus 1 transmits configuration information thereof to the terminal device 2. The terminal device 2 performs cross carrier scheduling of an uplink and a downlink, based on the configuration information. At this time, it is determined whether or not the cross carrier scheduling of the uplink and the downlink is set to be performed only one of the uplink and the downlink (Step S602). In a case where the cross carrier scheduling of the uplink and the downlink is set to be performed on only one of the uplink and the downlink (S602: YES), the terminal device 2 causes the process to proceed to Processing 7. In a case where the cross carrier scheduling of the uplink and the downlink is not set to be performed on any of the uplink and the downlink or the cross carrier scheduling of the uplink and the downlink is set to be performed on all of the uplink and the downlink (S602: NO), the total number of performing blind decoding does not exceed a preset (predefined) value. In a case where the function of performing cross carrier scheduling of an uplink and a downlink is not independently supported (S601: NO), the terminal device 2 causes the process to proceed to Processing 8.

An example of Processing 7 will be described below.

Regarding cross carrier scheduling for an uplink and cross carrier scheduling for a downlink, only the cross carrier scheduling for either of the uplink and the downlink is set, and thus a DCI format (PDCCH) including a CIF and a DCI format which does not include the CIF are distinguished from each other. The number of DCI formats having different DCI format sizes is increased in accordance with whether or not the CIF is included, and the number of performing blind decoding is also increased by the increased number of DCI formats.

In a case where a function of independently performing cross carrier scheduling for an uplink and a downlink is provided, and cross carrier scheduling for either of the uplink and the downlink is set, scheduling is performed by using the DCI format which includes a CIF, and the DCI format which does not include the CIF, and thus the total number of performing blind decoding is increased.

In a case where cross carrier scheduling for a TDD cell and cross carrier scheduling for an FDD cell is performed, in a DCI format for the TDD cell and a DCI format for the FDD cell, even when the DCI formats are the same as each other, DCI included in the DCI formats may be different. Thus, because there is a case where the DCI formats do not have the same DCI format size in the DCI format for the TDD cell and the DCI format for the FDD cell, the number of performing blind decoding is increased. The base station apparatus 1 sets the DCI format for the TDD cell and the DCI format for the FDD cell to have the same DCI format size, and thus may perform a control not to increase the total number of performing blind decoding.

The cross carrier scheduling is independently set for an uplink and a downlink, and thus an uplink grant and a downlink grant are respectively transmitted in different cells (component carriers). Thus, blind decoding is independently performed in DCI formats which have the same format size, and have been transmitted from different cells, and the number of performing blind decoding is increased by the number of being independently performed. That is, in a case where cross carrier scheduling is performed together in an uplink and a downlink, communication control can be performed so as not to increase the total number of performing blind decoding. In a case where the cross carrier scheduling is not performed together in the uplink and the downlink, communication control can be performed so as not to increase the total number of performing blind decoding.

In a case where the cross carrier scheduling is independently set for an uplink and a downlink, if cross carrier scheduling for neither of the uplink and the downlink is set, the total number of performing blind decoding is increased. In this case, in order not to increase a reception processing delay, setting not to increase the total number of performing blind decoding is necessary.

For example, in a case where only cross carrier scheduling for the downlink is performed, a downlink grant for each cell may be normally subjected to transmission control/reception control so as to be transmitted from only one cell. The one cell may be configured by a higher layer. That is, the terminal device 2 may be notified from the base station apparatus 1 by using higher layer signaling. In this case, the number of performing blind decoding in an USS of each cell may be decreased. In this case, the number of PDCCH candidates in the USS of each cell is decreased, and thus the number of performing blind decoding may be decreased. In this case, Aggregation level for the USS of each cell is restricted, and thus the number of performing blind decoding may be decreased. In a case where only cross carrier scheduling for the uplink is performed, similar processing may be also performed. In this case, a CIF may be included in a grant (DCI format) which causes the cross carrier scheduling not to be performed.

In a case where the cross carrier scheduling is independently set for an uplink and a downlink, and thus the total number of performing blind decoding exceeds a predetermined value, the number of performing blind decoding is restricted so as not to exceed the predetermined value.

An example of Processing 8 will be described below.

In a case where a function of performing cross carrier scheduling for an uplink and a downlink is not independently supported by the terminal device 2 or a common function of performing cross carrier scheduling for an uplink and a downlink is supported by the terminal device 2, a DCI format for the uplink and a DCI format for the downlink normally include a CIF or does not include the CIF. Thus, the total number of performing blind decoding does not exceed the predetermined value.

Next, an example of Processing 9 will be described.

In a case where one or more serving cells are configured for the terminal device 2 which performs TDD-FDD carrier aggregation, frame structure types (duplex modes) of at least two serving cells are different from each other, one serving cell is a primary cell, the frame structure type of the serving cell is FDD, and monitoring a PDCCH/EPDCCH is not configured in another serving cell (for example, TDD serving cell) in which the frame structure type for scheduling the serving cell is different (which has a different frame structure type), an uplink reference UL/DL configuration may not be set in the serving cell.

That is, in a case where a carrier indicator field (CIF) is not configured for a TDD serving cell (or for a DCI format transmitted in the TDD serving cell), the uplink reference UL/DL configuration may not be set in an FDD serving cell. In other words, in a case where each serving cell performs self-scheduling, the uplink reference UL/DL configuration (virtual UL/DL configuration) may be not set in the FDD serving cell.

In a case where one or more serving cells are configured for the terminal device 2 which performs TDD-FDD carrier aggregation, frame structure types (duplex modes) of at least two serving cells are different from each other, one serving cell is a primary cell, the frame structure type of the serving cell is TDD, and monitoring a PDCCH/EPDCCH is not configured for the terminal device 2 in another serving cell in which the frame structure type for scheduling the serving cell is different, a UL/DL configuration of the serving cell may be the uplink reference UL/DL configuration.

That is, in a case where a CIF is configured for a TDD serving cell (or for a DCI format transmitted in the TDD serving cell), an uplink reference UL/DL configuration may be set in an FDD serving cell. In other words, in a case where the TDD serving cell performs cross carrier scheduling on the FDD serving cell, the uplink reference UL/DL configuration (virtual UL/DL configuration) may be set in the FDD serving cell.

In a case where one or more serving cells are configured for the terminal device 2 which performs TDD-FDD carrier aggregation, frame structure types (duplex modes) of at least two serving cells are different from each other, one serving cell is a secondary cell, the frame structure type of the serving cell is FDD, and the terminal device 2 does not set monitoring a PDCCH/EPDCCH in another serving cell in which the frame structure type for scheduling the serving cell is different (which has a different frame structure type), a UL/DL configuration of a serving cell which has a frame structure type different from that of the serving cell, and an uplink reference UL/DL configuration corresponding to a pair constituted by FDD serving cells are set for the serving cell. The uplink reference UL/DL configuration may be managed in a manner of a table. The uplink reference UL/DL configuration may be set based on a UL/DL configuration of a serving cell having a different frame structure type. The uplink reference UL/DL configuration may be a UL/DL configuration of a serving cell having a different frame structure type.

That is, in a case where the FDD serving cell is a secondary cell, an uplink reference UL/DL configuration for the TDD serving cell, and an uplink reference UL/DL configuration for the FDD serving cell may correspond to a pair constituted by TDD serving cells and FDD serving cells. The uplink reference UL/DL configurations in this case, that is, the uplink reference UL/DL configurations corresponding to the pair constituted by TDD serving cells and TDD serving cells may be independently defined or may be defined by using the same table.

That is, in a case where a CIF is not configured for the TDD serving cell and the FDD serving cell is a secondary cell, an uplink reference UL/DL configuration (virtual UL/DL configuration) may be set in the FDD serving cell.

In a case where one or more serving cells are configured for the terminal device 2 which performs TDD-FDD carrier aggregation, frame structure types (duplex modes) of at least two serving cells are different from each other, one serving cell is a secondary cell, the frame structure type of the serving cell is FDD, and the terminal device 2 does not set monitoring a PDCCH/EPDCCH in another serving cell in which the frame structure type for scheduling the serving cell is different (which has a different frame structure type), an uplink reference UL/DL configuration (virtual UL/DL configuration) may not be set in the serving cell.

That is, if there is a case where the FDD serving cell is a secondary cell and self-scheduling is performed, an uplink reference UL/DL configuration (virtual UL/DL configuration) may not be set for the FDD serving cell.

In a case where one or more serving cells are configured for the terminal device 2 which performs TDD-FDD carrier aggregation, frame structure types (duplex modes) of at least two serving cells are different from each other, one serving cell is a secondary cell, the frame structure type of the serving cell is TDD, and the terminal device 2 does not set monitoring a PDCCH/EPDCCH in another serving cell in which the frame structure type for scheduling the serving cell is different (which has a different frame structure type), a UL/DL configuration of a serving cell which has a frame structure type different from that of the serving cell, and an uplink reference UL/DL configuration corresponding to a pair constituted by FDD serving cells may be set for the serving cell. The uplink reference UL/DL configuration may be managed in a manner of a table. The uplink reference UL/DL configuration may be set based on a UL/DL configuration of the serving cell. The uplink reference UL/DL configuration may be a UL/DL configuration of the serving cell.

That is, in a case where a CIF is not configured for the FDD serving cell, the uplink reference UL/DL configuration for the TDD serving cell may be a TDD UL/DL configuration for the TDD serving cell. In this case, the uplink reference UL/DL configuration may not be set in the TDD serving cell.

That is, in a case where a CIF is not configured for both of the TDD serving cell and the FDD serving cell, an uplink reference UL/DL configuration (virtual UL/DL configuration) which corresponds to a pair constituted by a plurality of serving cells may be set for each of the serving cells. In other words, an uplink reference UL/DL configuration (virtual UL/DL configuration) may be set for each of the TDD serving cell and the FDD serving cell which performs self-scheduling. Regarding whether or not the uplink reference UL/DL configuration (virtual UL/DL configuration) is set in a serving cell which performs self-scheduling (in which a scheduling grant/DCI format which does not have a CIF is transmitted), function information of the terminal device 2 may indicate whether or not supporting is provided, the terminal device 2 may be notified from the base station apparatus 1 by using an RRC message, or notification as system information or report information from the base station apparatus 1 may be performed.

Whether or not an uplink reference UL/DL configuration and/or a downlink reference UL/DL configuration and/or a virtual UL/DL configuration may be applied to an FDD cell which is used in TDD-FDD carrier aggregation may be determined based on the function information of the terminal device 2. That is, in a case where the uplink reference UL/DL configuration and/or the downlink reference UL/DL configuration and/or the virtual UL/DL configuration may be applied to the FDD cell which is used in TDD-FDD carrier aggregation in the terminal device 2, the base station apparatus 1 may apply the uplink reference UL/DL configuration and/or the downlink reference UL/DL configuration and/or the virtual UL/DL configuration to the FDD cell used in TDD-FDD carrier aggregation, for the terminal device 2.

In a case where a virtual TDD UL/DL configuration (virtual UL/DL configuration) is set in an FDD serving cell for the terminal device 2 which performs TDD-FDD carrier aggregation, an uplink reference UL/DL configuration for an FDD serving cell may be determined based on a pair constituted by a UL/DL configuration of a TDD serving cell and a virtual UL/DL configuration of the FDD serving cell. The terminal device 2 may be notified of the virtual UL/DL configuration from the base station apparatus 1 by a higher layer (higher layer signaling). The virtual UL/DL configuration may be transmitted to the terminal device 2 from the base station apparatus 1 by suing a certain DCI format. The virtual UL/DL configuration may be transmitted by using a DCI format having attached CRC which is scrambled by a specific RNTI. That is, in a case where the CRC scrambled by a specific RNTI is detected, the terminal device 2 considers that a field relating to the virtual UL/DL configuration is set in the DCI format, and performs demodulation and decoding processing. In other words, in a case where the virtual UL/DL configuration is set in a certain DCI format, the base station apparatus 1 transmits the DCI format to the terminal device 2 by using CRC scrambled by the specific RNTI. The specific RNTI may be an eIMTA-RNTI. The specific RNTI may be a TDD-RNTI. The specific RNTI may be a FDD-RNTI. The specific RNTI may be a TDD-FDD CA-RNTI. The specific RNTI may be used for recognizing to be a specific DCI format. The specific RNTI may indicate that a specific DCI is set in an appended DCI format.

In a case where a virtual TDD UL/DL configuration (virtual UL/DL configuration) is set in an FDD secondary cell for the terminal device 2 which performs TDD-FDD carrier aggregation, downlink reference UL/DL configurations for a TDD primary cell and an FDD secondary cell may be determined based on a pair constituted by a UL/DL configuration of the TDD primary cell and a virtual UL/DL configuration of the FDD secondary cell.

In a case where a virtual TDD UL/DL configuration (virtual UL/DL configuration) is set in an FDD primary cell for the terminal device 2 which performs TDD-FDD carrier aggregation, downlink reference UL/DL configurations for an FDD primary cell and a TDD secondary cell may be determined based on a pair constituted by a virtual UL/DL configuration of the FDD primary cell and a UL/DL configuration of a TDD secondary cell.

In a case where a virtual TDD UL/DL configuration (virtual UL/DL configuration) is set in an FDD serving cell for the terminal device 2 which performs TDD-FDD carrier aggregation, a UL index (uplink index) or a DAI may be set in a DCI format for the FDD serving cell.

In a case where the base station apparatus 1 and the terminal device 2 perform TDD-FDD carrier aggregation, if one or more serving cells are configured in the terminal device 2, and duplex modes (frame structure types) of at least two serving cells are not the same as each other, a subframe constitution in an FDD cell may be set based on a TDD UL/DL configuration configured in a TDD cell. UL/DL configurations (uplink reference UL/DL configuration, downlink reference UL/DL configuration, virtual UL/DL configuration, reference UL•DL configuration) corresponding to the TDD cell and the FDD cell may be set. A downlink subframe for a downlink component carrier of the FDD cell may be set based on a downlink subframe of an uplink reference UL/DL configuration and a downlink reference UL/DL configuration. An uplink subframe for an uplink component carrier of the FDD cell may be set based on an uplink subframe of the uplink reference UL/DL configuration and the downlink reference UL/DL configuration. In a case where TDD-FDD carrier aggregation is performed, an uplink grant (PDCCH/EPDCCH, DCI format) in the FDD cell may be monitored based on the uplink reference UL/DL configuration. A downlink grant (PDCCH/EPDCCH, DCI format) in the FDD cell may be monitored based on the downlink reference UL/DL configuration. That is, a subframe in which a PDCCH/EPDCCH having an attached DCI format which is for transmitting a TPC command is monitored may be determined based on the uplink reference UL/DL configuration. In this case, the uplink reference UL/DL configuration and the downlink reference UL/DL configuration may be set not to be the same each other. In a case where the uplink reference UL/DL configuration is set, the uplink grant may be transmitted in a downlink subframe indicated by the uplink reference UL/DL configuration. A PHICH for a PUSCH may be transmitted in the downlink subframe indicated by the uplink reference UL/DL configuration. In a case where the downlink reference UL/DL configuration is set, the downlink grant may be transmitted in the downlink subframe indicated by the downlink reference UL/DL configuration. HARQ response information for a PDSCH may be transmitted in an uplink subframe indicated by the downlink reference UL/DL configuration.

In an FDD cell to which the virtual UL/DL configuration (virtual uplink reference UL/DL configuration, virtual downlink UL/DL configuration, virtual reference UL/DL configuration), a subframe indicating a special subframe may be a downlink subframe. For example, the terminal device 2 may perform processing on Subframe #1 or Subframe #6 as the downlink subframe.

The terminal device 2 may not examine decoding of a PDCCH/EPDCCH having DCI format 0/4 which has an attached C-RNTI of the terminal device 2 or DCI format 0 for an SPS C-RNTI, and decoding of a PDCCH having DCI format 3/3A which has an attached TPC-PUSCH-RNTI of the terminal device 2, for an FDD cell in which the uplink reference UL/DL configuration is set, in each subframe. That is, except for a case where the terminal device 2 is in DRX or an FDD cell is deactivated, the terminal device 2 examines decoding of a PDCCH/EPDCCH of DCI format 0/4 having an attached C-RNTI or DCI format 0 for an SPS C-RNTI of the terminal device 2, and decoding of a PDCCH of DCI format 3/3A having an attached TPC-PUSCH-RNTI of the terminal device 2, in a downlink subframe of the uplink reference UL/DL configuration, for the FDD cell in which the uplink reference UL/DL configuration is set.

If one or more serving cells are constituted in the terminal device 2 and duplex modes of at least two serving cells which have been constituted are not the same as each other, a value (value of $K_{PUSCH}$) for applying a TPC command to a PUSCH may be determined with reference to the uplink reference UL/DL configuration for a serving cell c. The value of $K_{PUSCH}$ corresponding to the uplink reference UL/DL configuration may be managed with a table. The value of $K_{PUSCH}$ corresponding to the uplink reference UL/DL configuration may be indicated by a bitmap. The value of $K_{PUSCH}$ corresponding to the uplink reference UL/DL configuration may be indicated by an offset and a period. Here, when transmission of a PUSCH is performed in a subframe i, $K_{PUSCH}$ is information indicating a subframe in which a TPC command to be applied to transmission power for a PUSCH transmitted in the subframe i is transmitted. For example, in a case of $K_{PUSCH}=7$, the terminal device 2 applies a TPC command which has been received in a subframe before 7 subframes from the subframe i. That is, in a case where transmission of a PUSCH is performed in the subframe i, the terminal device 2 applies a value ($\delta_{PUSCH}$ of i-$K_{PUSCH}$ in a subframe (that is, $\delta_{PUSCH}$(i-$K_{PUSCH}$))) obtained by the TPC command which is subjected to signaling in a PDCCH/EPDCCH having DCI format 0/4 (or PDCCH having DCI format 3/3A), for the serving cell c in a subframe before $K_{PUSCH}$ subframes from the subframe i. Regarding a PUCCH, similar processing may be performed. For example, in a case where transmission of a PUCCH is performed in the subframe i, a value ($\delta_{PUCCH}$ of i-$K_{PUCCH}$ in a subframe (that is, $\delta_{PUCCH}$(i-$K_{PUSCH}$))) obtained by a TPC command for a PUCCH which is subjected to signaling in a PDCCH/EPDCCH having a DCI format may be applied to the serving cell c in a subframe before $K_{PUCCH}$ subframes from the subframe i.

Here, the uplink reference UL/DL configuration may be a TDD UL/DL configuration configured in a TDD serving cell. The uplink reference UL/DL configuration may be determined based on a table set as being used for TDD-FDD carrier aggregation. The uplink reference UL/DL configuration may be applied to only a case where a duplex mode configured in the primary cell is TDD. That is, in a case where a frame structure type configured in the primary cell is FDD, the uplink reference UL/DL configuration may not be applied. In a case where an uplink UL/DL configuration is not applied to the FDD cell, the value of $K_{PUSCH}$ is a predetermined value. The uplink reference UL/DL configuration may be set based on a TDD UL/DL configuration which is configured in a TDD serving cell. That is, regarding the uplink reference UL/DL configuration, a UL/DL configuration may be set so as to be independent from that of the TDD serving cell.

In a case of an FDD secondary cell, an uplink reference UL/DL configuration and/or a downlink reference UL/DL configuration (or virtual UL/DL configuration) may be applied in accordance with the frame structure type of the primary cell. For example, in a case where the frame structure type of the primary cell is FDD, the uplink reference UL/DL configuration and/or the downlink reference UL/DL configuration (or virtual UL/DL configuration) may not be applied to the FDD secondary cell. In a case where the frame structure type of the primary cell is TDD, the uplink reference UL/DL configuration and/or the downlink reference UL/DL configuration (or virtual UL/DL configuration) may be applied to the FDD secondary cell.

In a case where a CIF (CIF corresponding to the FDD serving cell) indicating the FDD serving cell is not configured, the value of $K_{PUSCH}$ for a certain uplink subframe of the FDD serving cell is a predetermined value (for example, 4). That is, in a case where the FDD serving cell performs self-scheduling, the value of $K_{PUSCH}$ is predetermined value (for example, 4).

In a case where a CIF indicating the FDD serving cell is configured, if the frame structure type of a serving cell which performs scheduling of the FDD serving cell is FDD, the value of $K_{PUSCH}$ for a certain uplink subframe of the FDD serving cell is a predetermined value (for example, 4).

In a case where a CIF indicating the FDD serving cell is configured, if the frame structure type of a serving cell which performs scheduling of the FDD serving cell is TDD, the value of $K_{PUSCH}$ for a certain uplink subframe of the FDD serving cell is specified based on an uplink reference UL/DL configuration (virtual UL/DL configuration) which is applied to the FDD serving cell, and/or a value of a UL index.

FIG. 7 illustrates an example of a value of $K_{PUSCH}$ corresponding to the uplink reference UL/DL configuration (UL-reference UL/DL configuration). For example, in a case where the uplink reference UL/DL configuration 1 is set, a value obtained by a TPC command which is subjected to signaling in a DCI format before 6 subframes is applied to a TPC command corresponding to the subframe #2. That is, $K_{PUSCH}=6$ is satisfied. A value obtained by a TPC command which is subjected to in a DCI format before 4 subframes is applied to a TPC command corresponding to the subframe #3. That is, a value of $K_{PUSCH}$ is 4. In this manner, a relationship between the subframe i and $K_{PUSCH}$ may be managed with a table. In the example, in a case where the uplink reference UL/DL configuration 0 is set, subframes corresponding to the subframe #2 and the subframe #3 (or the subframe #7 and the subframe #8) are the same subframes as each other. In order to distinguish the subframe #2 and the subframe #3 (or the subframe #7 and the subframe #8) which are the same subframes, a UL index included in a DCI format may be used. For example, in a case where the least significant bit (LSB) of the UL index is set to be "1", the subframe #2 (or the subframe #7) may be indicated. That is, a predetermined subframe may be designated by using the UL index. If it is assumed that transmission of a PUSCH in the subframe #2 or the subframe #7 is scheduled by using DCI format 0/4 in which the least significant bit of the UL index is set to be "1", the value of $K_{PUSCH}$ in the subframe #2 or the subframe #7 is 7. A TPC command in different subframes and information regarding scheduling of the PUSCH may be transmitted in the subframe #2 and the subframe #7. The base station apparatus 1 may transmit a DCI format or a TPC command for a specific subframe to the terminal device 2 by using the UL index.

In a case where the uplink reference UL/DL configuration is applied to the FDD cell, if the uplink reference UL/DL configuration is assumed to be a constitution in which the number of uplink subframes is more than the number of downlink subframes (for example, constitution such as the UL/DL configuration 0 illustrated in FIG. 3), the value of $K_{PUSCH}$ for transmission of the PUSCH in the subframe #2 or #7 is specified based on the value of the least significant bit of the UL index transmitted in DCI format 0/4. That is, in this case, if it is assumed that transmission of the PUSCH is scheduled by a DCI format in which the least significant bit of the UL index is set to be "1", the value of $K_{PUSCH}$ for transmission of the PUSCH in the subframe #2 or #7 is specified as a predetermined value (for example, 7). The value of $K_{PUSCH}$ for an uplink subframe other than the subframe #2 or #7 may be specified based on the table illustrated in FIG. 7. If the uplink reference UL/DL configuration is assumed to be a constitution in which the number of uplink subframes is equal to or less than the number of downlink subframes (for example, constitution such as the UL/DL configurations 1 to 6 illustrated in FIG. 3), the value of $K_{PUSCH}$ for a certain uplink subframe may be specified based on the table illustrated in FIG. 7. In a case where a UL index is not included in DCI format 0/4 for an FDD cell to which the uplink reference UL/DL configuration is applied, the terminal device 2 may specify the value of $K_{PUSCH}$ as a predetermined value (for example, 4).

In a case where the uplink reference UL/DL configuration (virtual UL/DL configuration) is not applied to the FDD cell, the value of $K_{PUSCH}$ for a certain uplink subframe is specified as a predetermined value (for example, 4).

If one or more serving cells are constituted in the terminal device 2 and duplex modes of at least two serving cells which have been constituted are not the same as each other, a value (M and $k_m$) for applying a TPC command to a PUCCH may be determined with reference to a downlink reference UL/DL configuration for a serving cell c. A power control adjustment state (power control adjustment value) g(i) for the PUCCH is obtained by the sum of a power control adjustment value g(i−1) of a subframe (i−1) and an addition value (addition value of $\delta_{PUCCH}$ from m=0 to m=M−1) of a value ($\delta_{PUCCH}$(i−$k_m$)). The value ($\delta_{PUCCH}$(i−$k_m$)) is obtained by a TPC command for the PUCCH transmitted in a subframe (i−$k_m$) ($k_0$, $k_1$, . . . , $k_{M-1}$).

FIG. 8 illustrates an example of a downlink association set index K: {$k_0$, $k_1$, . . . , $k_m$} corresponding to the downlink reference UL/DL configuration (DL-reference UL/DL configuration). FIG. 8 illustrates a downlink subframe in which a TPC command for the PUCCH is transmitted, based on the DL reference UL/DL configuration. In other words, it may be stated that FIG. 8 illustrates a transmission subframe for the PUCCH. That is, the PUCCH may be transmitted based on an uplink subframe set in the DL reference UL/DL configuration. In FIG. 8, the terminal device 2 may transmit the PUCCH in a subframe which is not indicated by "-". For example, in the downlink reference UL/DL configuration 0, the PUCCH (or UCI using the PUCCH) may be transmitted in the subframe #2, the subframe #4, the subframe 7, and the subframe #9. In the DL reference UL/DL configuration 5, the PUCCH (or UCI using the PUCCH) may be transmitted only in the subframe #2.

In a case where the uplink reference UL/DL configuration for an FDD serving cell is set in the terminal device 2 which performs TDD-FDD carrier aggregation, an SRS request may be transmitted to the FDD serving cell by using DCI format 2B/2C/2D. That is, in a case where the uplink reference UL/DL configuration for the FDD serving cell is set in the terminal device 2, the base station apparatus 1 may transmit the SRS request to the FDD serving cell by using DCI format 2B/2C/2D.

In a case where the uplink reference UL/DL configuration is set in the FDD serving cell, the HARQ process number which is transmitted by using DCI format 2B/2C/2D may also have 4 bits. That is, in a case where the uplink reference UL/DL configuration for the FDD serving cell is set in the terminal device 2, the base station apparatus 1 may transmit the 4-bit HARQ process number to the FDD serving cell by using DCI format 2B/2C/2D.

In a case where the uplink reference UL/DL configuration is set for the FDD serving cell, a UL index or a DAI may be transmitted by using DCI format 0/4. That is, in a case where the uplink reference UL/DL configuration for the FDD serving cell is set in the terminal device 2, the base station apparatus 1 may transmit the UL index or the DAI may be transmitted by using DCI format 0/4.

In a case where the uplink reference UL/DL configuration (virtual UL/DL configuration) for the FDD serving cell is not set, the base station apparatus 1 may not transmit the UL index or the DAI by using DCI format 0/4. In this case, even when the terminal device 2 receives DCI format 0/4, the terminal device 2 does not perform reception processing in consideration of the UL index or the DAI.

In a case where the uplink reference UL/DL configuration is applied to the FDD serving cell, the UL index or the DAI may be transmitted by using DCI format 1/1A/1B/1D/2/2A/2B/2C/2D. That is, if the uplink reference UL/DL configuration for the FDD serving cell is applied to the terminal device 2, the base station apparatus 1 transmits the UL index or the DAI by using DCI format 1/1A/1B/1D/2/2A/2B/2C/2D.

In a case where the uplink reference UL/DL configuration is not applied to the FDD serving cell, the base station apparatus 1 may not transmit the UL index or the DAI to the terminal device 2 by using DCI format 1/1A/1B/1D/2/2A/2B/2C/2D. In this case, even when DCI format 1/1A/1B/1D/2/2A/2B/2C/2D is received, the terminal device 2 does not perform reception processing in consideration of the UL index or the DAI.

In a case where the uplink reference UL/DL configuration is not applied to the FDD serving cell, if the subframe i is not an uplink subframe in the uplink reference UL/DL configuration in the FDD serving cell in which the uplink reference UL/DL configuration is set, a power control adjustment value $f_c$(i) in the subframe i for the serving cell c is $f_c$(i−1). The power control adjustment value $f_c$(i) of the subframe i for the serving cell c in a case where a PDCCH/EPDCCH having DCI format 0/4 for the serving cell c is not decoded is $f_c$(i−1). The power control adjustment value $f_c$(i)

for the serving cell c in the subframe i in which DRX occurs is $f_c(i-1)$. The power control adjustment value $f_c(i)$ for the serving cell c in the subframe i which is not an uplink subframe in TDD is $f_c(i-1)$. That is, in a case where the conditions are satisfied, the power control adjustment value $f_c(i)$ for the serving cell c in the subframe i is the same as the power control adjustment value $f_c(i-1)$ for the serving cell c in the subframe (i-1).

In a case where the uplink reference UL/DL configuration is set for the FDD serving cell, if it is assumed that a configuration of SRS periodicity and an SRS subframe offset (SRS configuration index for the SRS periodicity and the SRS subframe offset) is set for the FDD, SRS is transmitted only in a subframe in which an uplink subframe indicated by the uplink reference UL/DL configuration overlaps an SRS subframe which is set for FDD based on the configuration of the SRS periodicity and the SRS subframe offset. In other words, if an SRS subframe is not set as an uplink subframe indicated by the uplink reference UL/DL configuration, the terminal device 2 does not perform SRS transmission in the SRS subframe. The base station apparatus 1 does not transmit an SRS request which is used for transmitting SRS in such an SRS subframe. The base station apparatus 1 does not transmit an SRS request at such a timing at which SRS is transmitted in such an SRS subframe. The terminal device 2 may transmit P-SRS in such an SRS subframe. The terminal device 2 may not transmit A-SRS in such an SRS subframe. In a case where the SRS request for such an SRS subframe is transmitted by cross scheduling, the terminal device 2 may not transmit A-SRS in such an SRS subframe. That is, in a case where an SRS request for such an SRS subframe is transmitted by self-scheduling, the terminal device 2 may transmit A-SRS in such an SRS subframe.

In a case where the uplink reference UL/DL configuration is similar to the UL/DL configuration 0 illustrated in FIG. 3, the UL index is set in DCI format 0/4 for an FDD serving cell in which the uplink reference UL/DL configuration is set. A subframe defined as a special subframe in the FDD serving cell may be set as a downlink subframe.

In a case where the uplink reference UL/DL configuration is similar to the UL/DL configurations 1 to 6 illustrated in FIG. 3, the DAI is set in DCI format 0/4 for the FDD serving cell in which the uplink reference UL/DL configuration is set.

In a case where a reference UL/DL configuration is applied to an FDD cell, reference UL/DL configurations may be independently applied to an uplink component carrier and a downlink component carrier which are used in an FDD cell. That is, the uplink reference UL/DL configuration may be applied to the uplink component carrier used in an FDD cell, and the downlink reference UL/DL configuration may be applied to the downlink component carrier used in the FDD cell.

FIG. 9 illustrates an example of a valid subframe in a case where the reference UL/DL configuration is applied to the uplink/downlink of the FDD cell. FIG. 9 illustrates a case of the uplink reference UL/DL configuration 0 and the downlink reference UL/DL configuration 5. However, other configurations may be set. The terminal device 2 does not expect that a plurality of DCI formats which have the same type and indicate different resource alignments or different configurations is detected for one uplink subframe. That is, the base station apparatus 1 does not transmit a plurality of DCI formats which have the same type and indicate different configurations, to one uplink subframe in the same downlink subframe. For example, the DCI format 0 of the PUSCH, which has a different resource alignment is not transmitted in a different downlink subframe (for example, downlink subframes #7 and #8) to the uplink subframe #2. The above descriptions are similarly applied to a CSI request or an SRS request. For example, the terminal device 2 in which trigger type 1 SRS transmission is configured does not expect that a type 1 SRS triggering event associated with a different value of a parameter for trigger type 1 SRS transmission configured by higher layer signaling is received for the same subframe in the same serving cell. That is, the terminal device 2 does not expect that A-SRS having a different configuration is required in the same subframe of the same serving cell. The base station apparatus 1 does not require the A-SRS having a different configuration to the terminal device 2 in the same subframe of the same serving cell.

In a case where the uplink reference UL/DL configuration and the downlink reference UL/DL configuration (virtual UL/DL configuration) are applied in self-scheduling and/or cross carrier scheduling, the terminal device 2 performs transmission and reception processing based on the uplink reference UL/DL configuration and the downlink reference UL/DL configuration, regardless of the frame structure type of a serving cell. In a case where the uplink reference UL/DL configuration and the downlink reference UL/DL configuration (virtual UL/DL configuration) are not applied in self-scheduling and/or cross carrier scheduling, the terminal device 2 performs transmission and reception processing based on the frame structure type of a serving cell.

In the base station apparatus 1 and the terminal device 2 which perform communication by using TDD-FDD carrier aggregation, a DCI format in which a cell (Scheduling cell) which performs scheduling corresponds to a cell (Scheduled cell) which is scheduled may be constituted based on the frame structure type of the scheduled cell. That is, the base station apparatus 1 transmits a DCI format to the terminal device 2 based on the frame structure type of the scheduled cell. The terminal device 2 performs reception processing based on the frame structure type of the scheduled cell. A DCI format which is transmitted from a cell (Scheduling cell) which performs scheduling, and corresponds to the scheduled cell (Scheduled cell) may be constituted based on the frame structure type of the cell which performs scheduling. That is, the base station apparatus 1 transmits a DCI format to the terminal device 2 in accordance with the frame structure type of the cell which performs scheduling. The terminal device 2 performs reception processing of the DCI format based on the frame structure type of the cell which performs scheduling. A cell to which the DCI format is transmitted may be determined based on the function information of the terminal device 2. That is, in the terminal device 2, whether or not a function of supporting reception processing of a DCI format is provided for the first frame structure type (duplex mode) may be indicated. Whether or not a function of supporting reception processing of a DCI format is provided for the second frame structure type (duplex mode) may be indicated in the terminal device 2. Whether or not a function of supporting reception processing of a DCI format is provided for the n-th frame structure type (duplex mode) may be indicated in the terminal device 2. Similarly, whether or not a function of supporting transmission processing of a DCI format is provided for the n-th frame structure type (duplex mode) may be indicated in the terminal device 2. That is, the base station apparatus 1 performs transmission and reception processing and scheduling processing in accordance with the frame structure type supported by the terminal device 2. The transmission and reception processing and the scheduling processing may be performed based on the function information which indicates whether transmission and reception processing is performed in accordance with the frame structure type of a cell which performs scheduling or whether transmission and reception processing is performed in accordance with the frame structure type of a scheduled cell, in the terminal device 2. The transmission and reception processing may be performed in accordance with the frame structure type of a primary cell or a specific cell. In a case where the UL/DL configuration is applied to the FDD cell, transmission and reception processing of a DCI format for TDD may be performed. In a case where the UL/DL configuration is not applied to the FDD cell, the transmission and reception processing of a DCI format for FDD may not be performed.

In a case where carrier aggregation (TDD-FDD carrier aggregation) of different frame structure types is performed from carrier aggregation (for example, TDD-TDD carrier aggregation or FDD-FDD carrier aggregation) of the same frame structure type, in a cell in which switching is performed from a first frame structure type to a second frame structure type, the terminal device 2 may perform an instruction of the switching, and then perform transmission and reception processing considering the cell as a cell having the second frame structure type after subframes of a predetermined number. That is, a frame structure type of which an instruction is performed may not be applied immediately after the instruction of switching is performed.

In a case where a plurality of cells is aggregated, the terminal device 2 performs processing on the assumption that guard periods of special subframes in different cells overlap each other at least 1456 basic time unit times. In a case where a plurality of cells having different frame structure types is aggregated, the terminal device 2 performs processing on the assumption that guard periods of special subframes in a plurality of TDD cells overlap each other at least 1456 basic time unit times.

FIG. 1 is a schematic block diagram illustrating a configuration of the base station apparatus 1 according to the present invention. As illustrated in FIG. 1, the base station apparatus 1 includes a higher layer processing unit 101, a control unit 103, a reception unit 105, a transmission unit 107, a channel measurement unit 109, and a transmit/receive antenna 111. The reception unit 105 includes a decoding portion 1051, a demodulation portion 1053, a demultiplexing portion 1055, and a radio reception portion 1057. Reception processing of the base station apparatus 1 is performed by the higher layer processing unit 101, the control unit 103, the reception unit 105, and the transmit/receive antenna 111. The transmission unit 107 includes a coding portion 1071, a modulation portion 1073, a multiplexing portion 1075, a radio transmission portion 1077, and a downlink reference signal generation portion 1079. Transmission processing of the base station apparatus 1 is performed by the higher layer processing unit 101, the control unit 103, the transmission unit 107, and the transmit/receive antenna 111.

The higher layer processing unit 101 performs processing of a medium access control (MAC) layer, a packet data convergence protocol (PDCP) layer, a radio link control (RLC) layer, and a radio resource control (RRC) layer.

The higher layer processing unit 101 generates information assigned in each channel of a downlink, or acquires the information from a higher node, and then outputs the information to the transmission unit 107. The higher layer processing unit 101 assigns radio resources (resource block) for causing the terminal device 2 to allocate a physical uplink shared channel (PUSCH) which is data information of an uplink, from radio resources of the uplink. The higher layer processing unit 101 determines radio resources (resource block) for allocating a physical downlink shared channel (PDSCH) which is data information of a downlink, from radio resources of the downlink. Information for allocating radio resources may be also referred to as resource block assignment or resource allocation.

The higher layer processing unit 101 generates downlink control information indicating assignment of the radio resources, and transmits the generated information to the terminal device 2 through the transmission unit 107.

The higher layer processing unit 101 preferentially allocates radio resources having good channel quality, based on a channel measurement result of the uplink, which is input from the channel measurement unit 109 when radio resources for allocating the PUSCH are assigned. That is, the higher layer processing unit 101 generates information regarding configurations of various downlink signals, and information regarding configurations of various uplink signals for a certain terminal device or a certain cell.

The higher layer processing unit 101 may generate information regarding setting of various downlink signals, and information regarding setting of various uplink signals for each cell. The higher layer processing unit 101 may generate information regarding configurations of various downlink signals, and information regarding configurations of various uplink signals for each terminal device 2.

The higher layer processing unit 101 may generate plural pieces of information from information regarding a first configuration to information regarding an n-th configuration (n is natural number), and may transmit the generated pieces of information to the terminal device 2 through the transmission unit 107. The pieces of information are generated for a certain terminal device 2 or a certain cell, that is, are generated so as to be terminal device-specific or cell-specific. For example, the information regarding configurations of the downlink signal and/or the uplink signal may include parameters relating to resource assignment.

The information regarding configurations of the downlink signal and/or the uplink signal may include parameters used in calculating a sequence. The radio resources may be also referred to as time-frequency resources, subcarriers, resource elements (RE), a resource element group (REG), control channel elements (CCE), a resource block (RB), a resource block group (RBG), and the like.

Each of the configuration information and the control information may be defined as an information element. Each of the configuration information and the control information may be defined as an RRC message. Each of the configuration information and the control information may be transmitted as system information, to the terminal device 2. The configuration information and the control information may be transmitted to the terminal device 2 by dedicated signaling.

The higher layer processing unit 101 configures at least one TDD UL/DL configuration (TDD UL/DL configuration(s), TDD config, tdd-Config, and uplink-downlink configuration(s)) in the system information block Type 1. The TDD UL/DL configuration may be defined as in FIG. 3. The constitution of TDD may be shown by configuring an index. The terminal device 2 is notified of the index, and thus communication can be performed by using a subframe constitution (subframe pattern) of TDD corresponding to the index. A second TDD UL/DL configuration may be configured as a downlink reference. The system information block may prepare a plurality of types. For example, the system information block Type 1 includes an information element regarding the TDD UL/DL configuration. The system information Type 1 is one type of system information block type 1. The TDD UL/DL configuration may be transmitted in another system information block.

The system information block Type 2 includes an information element regarding a radio resource control. A parameter relating to an information element thereof may be included as an information element in certain information elements. For example, referring to a parameter may be performed in a physical layer, but in a higher layer, definition as an information element may be performed.

In the present invention, an identity, an identifier, and identification are referred to as an ID (identifier, identification sign, and identification number). As an ID (UEID) configured so as to be terminal-specific, a cell radio network temporary identifier (C-RNTI), a semi-persistent scheduling C-RNTI (SPS C-RNTI), a Temporary C-RNTI, a TPC-PUSCH RNTI, a TPC-PUCCH RNTI, and a random value for contention resolution are provided. The IDs are used in a unit of a cell. The IDs are configured by the higher layer processing unit 101.

The higher layer processing unit 101 configures various identifiers for the terminal device 2. The higher layer processing unit 101 notifies the terminal device 2 of the various configured identifiers through the transmission unit 107. For example, the higher layer processing unit 101 configures the RNTI and notifies the terminal device 2 of the configured RNTI. The higher layer processing unit 101 configures a physical layer cell ID, a virtual cell ID, or an ID corresponding to the virtual cell ID, and notifies the terminal device 2. For example, as the ID corresponding to the virtual cell ID, IDs (PUSCH ID, PUCCH ID, scrambling initialization ID, reference signal ID (RSID), and the like) which may be configured so as to be specific to a physical channel are provided. The physical layer cell ID or the virtual cell ID may be used in generating a physical channel and a sequence of a physical signal.

The higher layer processing unit 101 generates a DCI which is transmitted by using the PDCCH or the EPDCCH, and transmits the generated DCI to the terminal device 2 through the transmission unit 107.

The higher layer processing unit 101 generates the control information for controlling the reception unit 105 and the transmission unit 107 based on uplink control information (UCI) of which notification is performed on a physical uplink control channel (PUCCH) from the terminal device 2, and a situation of a buffer of which notification is performed from the terminal device 2, or various types of configuration information (RRC message, system information, parameter, and information element) of each terminal device 2, which are configured by the higher layer processing unit 101. The higher layer processing unit 101 outputs the generated information to the control unit 103. The UCI includes at least one of HARQ response information (HARQ-ACK, ACK/NACK/DTX), a scheduling request (SR), and channel state information (CSI). The CSI includes at least one of the CQI, the PMI, and the RI.

The higher layer processing unit 101 configures transmission power of an uplink signal (PRACH, PUCCH, PUSCH, UL DMRS, P-SRS, and A-SRS), and a parameter relating to the transmission power. The higher layer processing unit 101 transmits transmission power of a downlink signal (CRS, DL DMRS, CSI-RS, PDSCH, PDCCH/EPDCCH, and the like), and a parameter relating to the transmission power, to the terminal device 2 through the transmission unit 107. That is, the higher layer processing unit 101 transmits information regarding power control of the uplink and the downlink to the terminal device 2 through the transmission unit 107.

In other words, the higher layer processing unit 101 generates information regarding transmission power control of the base station apparatus 1 and the terminal device 2. For example, the higher layer processing unit 101 transmits a parameter relating to transmission power of the base station apparatus 1, to the terminal device 2.

The higher layer processing unit 101 transmits parameters used for configuring the maximum transmission power $P_{CMAX, c}$ and the total maximum output power $P_{CMAX}$ of the terminal device 2, to the terminal device 2. The higher layer processing unit 101 transmits information regarding transmission power control of various physical channels, to the terminal device 2.

The higher layer processing unit 101 sets transmission power of the terminal device 2 in accordance with information indicating the interference quantity from the adjacent base station apparatus, information indicating the interference quantity of which notification is performed from the adjacent base station apparatus 1, and which is applied to the adjacent base station apparatus, quality of a channel, which is input from the channel measurement unit 109, and the like. The higher layer processing unit 101 sets transmission power of the terminal device 2 so as to cause a PUSCH and the like to satisfy predetermined channel quality, considering interference to the adjacent base station apparatus 1. The higher layer processing unit 101 transmits information indicating the above setting, to the terminal device 2 through the transmission unit 107.

Specifically, the higher layer processing unit 101 transmits a PUSCH, standard power ($P_{O\_NOMINAL\_PUSCH}$, $P_{O\_NOMINAL\_PUCCH}$) for each PUCCH, a path loss compensation coefficient (attenuation coefficient) $\alpha$, power offset for Message 3, power offset defined for each PUCCH format, and the like in system information. The above-described pieces of information are transmitted as information (information of a shared parameter relating to uplink power control) shared between terminal devices 2 or information which is configured as a common parameter (sharable parameter) between terminal devices 2. At this time, the power offset of PUCCH format 3 and power offset of delta-PUCCH format 1bCS may be added and notification thereof may be performed. Notification of the information of the shared parameters may be performed in a RRC message.

The higher layer processing unit 101 performs notification of terminal device-specific PUSCH power $P_{0\_UE\_PUSCH}$, a parameter (deltaMCS-Enabled) for an instruction of whether or not a delta-MCS is effective, a parameter (accumulation-Enabled) for an instruction of whether or not accumulation is effective, terminal device-specific PUCCH power $P_{0\_UE\_PUCCH}$, P-SRS power offset $P_{SRS\_OFFSET}(0)$, and a filter coefficient, as information which may be configured for each terminal device 2 (information of a dedicated parameter relating to uplink power control) in the RRC message. At this time, notification of power offset of transmission diversity in each PUCCH format, and A-SRS power offset $P_{SRS\_OFFSET}(1)$ may be performed. $\alpha$ described herein is a coefficient (attenuation coefficient, path loss compensation coefficient) which is used for setting the transmission power along with a path loss value, and indicates the extent for compensating the path loss. In other words, $\alpha$ is a coefficient for determining the extent that the transmission power is increased or decreased in accordance with path loss (that is, the degree of transmission power to be compensated). $\alpha$ is normally set to have a value of 0 to 1. If $\alpha$ is 0, compensation of power in accordance with path loss is not performed. If $\alpha$ is 1, compensation of the transmission power of the terminal device 2 is performed so as to cause no influence of the path loss to occur in the base station apparatus 1. The pieces of information may be transmitted to the terminal device 2 as reconfiguration information. The shared parameter and the dedicated parameter may be independently configured in the primary cell and the secondary cell, or in a plurality of serving cells.

In a case where the reception unit 105 receives function information of the terminal device 2 from the terminal device 2, the higher layer processing unit 101 performs various configurations based on the received function information of the terminal device 2. For example, the higher layer processing unit 101 determines a carrier frequency of an uplink and a carrier frequency of a downlink, from a band (EUTRA Operating Band) supported by the terminal device 2, based on the received function information of the terminal device 2. The higher layer processing unit 101 determines whether or not the MIMO communication is performed for the terminal device 2, based on the received function information of the terminal device 2. The higher layer processing unit 101 determines whether or not the carrier aggregation is performed, based on the received function information of the terminal device 2. The higher layer processing unit 101 determines whether or not the carrier aggregation is performed by using component carriers having different frame structure types, based on the received function information of the terminal device 2. That is, the higher layer processing unit 101 determines whether or not a secondary cell is configured, and determines various parameters used for the secondary cell. The higher layer processing unit 101 notifies the terminal device 2 of the determined information. Notification of the information regarding the carrier frequency may be performed in the RRC message. That is, notification of the information regarding the carrier frequency may be in the system information. Notification of the information regarding the carrier frequency, with being included in mobility control information may be performed. Notification of the information regarding the carrier frequency may be performed as RRC information by a higher layer.

If the function information transmitted from the terminal device 2 indicates that a function of performing cross carrier scheduling on an uplink is supported, the higher layer processing unit 101 sets a configuration (CrossCarrier-SchedulingConfig-UL) relating to cross carrier scheduling for the uplink. The higher layer processing unit 101 transmits configuration information thereof to the terminal device 2 through the transmission unit 107 by using higher layer signaling. The configuration relating to cross carrier scheduling for the uplink may include information (scheduling-CellId-UL) indicating a cell in which uplink grant is subjected to signaling (indicating which cell performs signaling on an uplink grant). The configuration relating to cross carrier scheduling for the uplink may include information (cif-Presence-UL) indicating whether or not a CIF is in a PDCCH/EPDCCH DCI format (DCI format for an uplink).

If the function information transmitted from the terminal device 2 indicates that a function of performing cross carrier scheduling on a downlink is supported, the higher layer processing unit 101 sets a configuration (CrossCarrier-SchedulingConfig-DL) relating to cross carrier scheduling for the downlink. The higher layer processing unit 101 transmits configuration information thereof to the terminal device 2 through the transmission unit 107 by using higher layer signaling. The configuration relating to cross carrier scheduling for the downlink may include information (schedulingCellId-DL) indicating a cell in which downlink allocation (downlink grant) is subjected to signaling (indicating which cell performs signaling on downlink allocation). The configuration relating to cross carrier scheduling for the downlink may include information (pdsch-Start) indicating a starting OFDM symbol which corresponds to information indicating a cell. The configuration relating to cross carrier scheduling for the downlink may include information (cif-Presence-DL) indicating whether or not a CIF is in a PDCCH/EPDCCH DCI format (DCI format for a downlink).

In a case where the higher layer processing unit 101 configures a secondary cell for the terminal device 2, the higher layer processing unit 101 assigns a cell index except for a specific value (for example, "0" or information bit corresponding to "0") to the secondary cell, and transmits the configuration information thereof to the terminal device 2. In a case where the secondary cell is configured, the terminal device 2 considers the cell index of the primary cell as the specific value.

The higher layer processing unit 101 may configure transmission power of a downlink signal/uplink signal, or parameters relating to the transmission power for each terminal device 2. The higher layer processing unit 101 may configure transmission power of a common downlink/uplink signal between terminal devices 2, or parameters relating to the transmission power. The higher layer processing unit 101 may transmit information regarding the parameters to the terminal device 2, as information (information of the parameter relating to the uplink power control) regarding the uplink power control, and/or information (information of the parameter relating to the downlink power control) regarding the downlink power control. The information of the parameter relating to the uplink power control and the information of the parameter relating to the downlink power control include at least one parameter, and are transmitted to the terminal device 2.

The higher layer processing unit 101 configures various IDs relating to various physical channels/physical signals. The higher layer processing unit 101 outputs information regarding the configuration of the IDs to the reception unit 105 and the transmission unit 107 through the control unit 103. For example, the higher layer processing unit 101 configures the value of the RNTI (UEID) for scrambling CRC included in the downlink control information format.

The higher layer processing unit 101 may configure values of various identifiers such as the cell radio network temporary identifier (C-RNTI), the Temporary C-RNTI, Paging-RNTI (P-RNTI), a random access RNTI (RA-RNTI), the semi-persistent scheduling C-RNTI (SPS C-RNTI), and a system information RNTI (SI-RNTI).

The higher layer processing unit 101 configures the value of an ID such as a physical layer cell ID, a virtual cell ID, and a scrambling initialization ID. The configuration information is output to each processing unit through the control unit 103. The configuration information may be transmitted to the terminal device 2, as a RRC message or system information, dedicated information specific to a terminal device, and an information element. Some of RNTIs may be transmitted by using a MAC control element (CE).

The control unit 103 generates a control signal for controlling the reception unit 105 and the transmission unit 107, based on control information from the higher layer processing unit 101. The control unit 103 outputs the generated control signal to the reception unit 105 and the transmission unit 107, so as to control the reception unit 105 and the transmission unit 107.

The higher layer processing unit 101 may apply the uplink reference UL/DL configuration and/or the downlink reference UL/DL configuration (virtual UL/DL configuration) to an FDD cell. The higher layer processing unit 101 may perform uplink and downlink scheduling on the FDD cell to which the uplink reference UL/DL configuration is applied, by using a DCI format for TDD. The higher layer processing unit 101 performs uplink and downlink scheduling on the FDD cell to which the uplink reference UL/DL configuration is not applied, by using a DCI format for FDD.

The higher layer processing unit 101 may schedule transmission of a PUSCH for an FDD cell to which the uplink reference UL/DL configuration is applied, by using a PDCCH/EPDCCH having DCI format 0/4 in which a UL index is set. The higher layer processing unit 101 may schedule transmission of a PUSCH for an FDD cell to which the uplink reference UL/DL configuration is not applied, by using a PDCCH/EPDCCH having DCI format 0/4 in which a UL index is not set.

The higher layer processing unit 101 may determine whether or not the UL/DL configuration is set for the FDD cell, based on the function information transmitted from the terminal device 2.

The higher layer processing unit 101 may determine whether or not the uplink reference UL/DL configuration and/or the downlink reference UL/DL configuration (virtual UL/DL configuration) is applied to an FDD secondary cell, in accordance with the frame structure type of a primary cell. In a case where the frame structure type of a primary cell is TDD, the uplink reference UL/DL configuration and/or the downlink reference UL/DL configuration (virtual UL/DL configuration) may be applied to the FDD secondary cell. In a case where the frame structure type of a primary cell is FDD, the uplink reference UL/DL configuration and/or the downlink reference UL/DL configuration (virtual UL/DL configuration) may not be applied.

The reception unit 105 separates, demodulates, and decodes a reception signal which has been received from the terminal device 2 through the transmit/receive antenna 111, in accordance with the control signal input from the control unit 103. The reception unit 105 outputs the decoded information to the higher layer processing unit 101. The radio reception portion 1057 converts (down-converts) the frequency of the signal of an uplink which has been received through the transmit/receive antenna 111 into an intermediate frequency (IF), and removes an unnecessary frequency component. The radio reception portion 1057 controls an amplification level so as to appropriately maintain the signal level, performs orthogonal demodulation, and converts the analog signal subjected to orthogonal demodulation, into a digital signal. Such demodulation and conversion is performed based on the same phase component and the orthogonal component of the received signal. The radio reception portion 1057 removes a portion corresponding to a guard interval (GI) from the converted digital signal. The radio reception portion 1057 performs Fast Fourier Transform (FFT) on a signal obtained by removing the guard interval. The radio reception portion 1057 extracts the signal in the frequency domain, and outputs the extracted signal to the demultiplexing portion 1055.

The demultiplexing portion 1055 separates the signal input from the radio reception portion 1057 into signals of a PUCCH, a PUSCH, a UL DMRS, a SRS, and the like. The separation is performed based on assignment information of radio resources. The assignment information is determined in advance by the base station apparatus 1, and each terminal device 2 is notified of the assignment information. The demultiplexing portion 1055 performs channel compensation of the PUCCH and the PUSCH from an estimated value of the channel, which is input from the channel measurement unit 109. The demultiplexing portion 1055 outputs the separated UL DMRS and SRS to the channel measurement unit 109.

The demodulation portion 1053 performs inverse discrete Fourier transform (IDFT) on the PUSCH, and acquires modulation symbols. The demodulation portion 1053 demodulates the reception signal with the modulation symbols of the PUCCH and the PUSCH, by using a modulation scheme which is determined in advance, or of which each terminal device 2 is notified in advance in the downlink control information by the base station apparatus 1. Such a modulation scheme includes binary phase shift keying (BPSK), quadrature phase shift keying (QPSK), 16 quadrature amplitude modulation (16QAM), 64 quadrature amplitude modulation (64QAM), and the like.

The decoding portion 1051 decodes coded bits of the PUCCH and the PUSCH, which have been demodulated, at a coding rate of the predetermined coding scheme. The coding rate is determined in advance, or the base station apparatus 1 notifies the terminal device 2 of the coding rate in advance in the uplink grant (UL grant). The decoding portion 1051 outputs the decoded data information and the decoded uplink control information to the higher layer processing unit 101.

The channel measurement unit 109 measures the estimated value of the channel, the quality of the channel, and the like, based on the uplink demodulation reference signal (UL DMRS) input from the demultiplexing portion 1055, and the SRS. The channel measurement unit 109 outputs a result of the measurement to the demultiplexing portion 1055 and the higher layer processing unit 101. The channel measurement unit 109 measures received power of signals from a first signal to the n-th signal, and/or reception quality thereof. The channel measurement unit 109 outputs a result of the measurement to the demultiplexing portion 1055 and the higher layer processing unit 101.

The transmission unit 107 generates a reference signal of a downlink (downlink reference signal), based on the control signal input from the control unit 103. The transmission unit 107 codes and modulates data information and downlink control information input from the higher layer processing unit 101. The transmission unit 107 performs multiplexing on the PDCCH (EPDCCH), the PDSCH, and the downlink reference signal. The transmission unit 107 transmits a downlink signal obtained by multiplexing to the terminal device 2 through the transmit/receive antenna 111.

In a case where the uplink reference UL/DL configuration (or virtual UL/DL configuration) is set for the FDD cell, the transmission unit 107 may set and transmit a UL index or a DAI in a DCI format associated with an uplink for the FDD cell, based on the uplink reference UL/DL configuration.

In a case where the uplink reference UL/DL configuration is not set for the FDD cell, the transmission unit 107 may not set and transmit a UL index or a DAI in a DCI format associated with an uplink for the FDD cell.

In a case where the downlink reference UL/DL configuration (or virtual UL/DL configuration) is set for the FDD cell, the transmission unit 107 may set and transmit a DAI and/or an SRS request in a DCI format associated with an uplink for the FDD cell, based on the downlink reference UL/DL configuration.

In a case where the downlink reference UL/DL configuration is not set for the FDD cell, the transmission unit 107 may not set a DAI and an SRS request in a DCI format associated with a downlink.

The transmission unit 107 may transmit the UL index by using one DCI format, and thus one or more uplink subframes for the terminal device 2 may be scheduled. For example, in a case where the UL index is constituted so as to have two bits, the most significant bit (MSB) and the least significant bit (LSB) are set to be "1", and thus two uplink subframes can be scheduled. For example, in a case where the transmission unit 107 transmits a UL index in which both of the MSB and the LSB are set to be "1", in a subframe n by using DCI format 0/4, the terminal device 2 may perform transmission of a PUSCH in subframes (n+k) and (n+j) (k≠j). In a case where the transmission unit 107 transmits a UL index in which only the MSB is set to be "1", in the subframe n by using DCI format 0/4, the terminal device 2 performs transmission of a PUSCH in a subframe (n+k). In a case where the transmission unit 107 transmits a UL index in which only the LSB is set to be "1", in the subframe n by using DCI format 0/4, the terminal device 2 performs transmission of a PUSCH in a subframe (n+j).

In a case where TDD-FDD carrier aggregation is performed, the transmission unit 107 may perform transmission processing of a DCI format to be transmitted, based on the frame structure type of a cell which performs scheduling. In a case where TDD-FDD carrier aggregation is performed, the transmission unit 107 may perform transmission processing of a DCI format to be transmitted, based on the frame structure type of a scheduled cell.

In a case where a DCI format having CRC which is scrambled by using a specific RNTI may be transmitted to the terminal device 2, the transmission unit 107 may set and transmit a virtual UL/DL configuration in the DCI format.

The coding portion 1071 performs coding such as turbo-coding, convolutional coding, and block coding, on the downlink control information input from the higher layer processing unit 101, and data information. The modulation portion 1073 modulates the coded bits by using a modulation scheme such as QPSK, 16QAM, and 64QAM. The downlink reference signal generation portion 1079 performs generation as a downlink reference signal with a sequence known by the terminal device 2. The downlink reference signal is obtained by using a rule which is determined based on a cell identifier (Cell ID, Cell Identity, Cell Identifier, Cell Identification), and the like for identifying the base station apparatus 1. The multiplexing portion 1075 performs multiplexing on the modulated channel and the generated downlink reference signal.

The radio transmission portion 1077 performs Inverse Fast Fourier Transform (IFFT) on the multiplexed modulation symbol, and performs modulation of the OFDM scheme. The radio transmission portion 1077 adds a guard interval to OFDM symbols obtained by OFDM modulation, and generates a baseband digital signal. The radio transmission portion 1077 converts the baseband digital signal into an analog signal, and generates the same-phase component and the orthogonal component of an intermediate frequency, from the analog signal. The radio transmission portion 1077 removes an extra frequency component from the intermediate frequency band, and converts (up-converts) a signal having an intermediate frequency into a signal having a high frequency. The radio transmission portion 1077 removes an extra frequency component, amplifies power, and outputs the signal to the transmit/receive antenna 111 so as to perform transmission.

Figure 2:
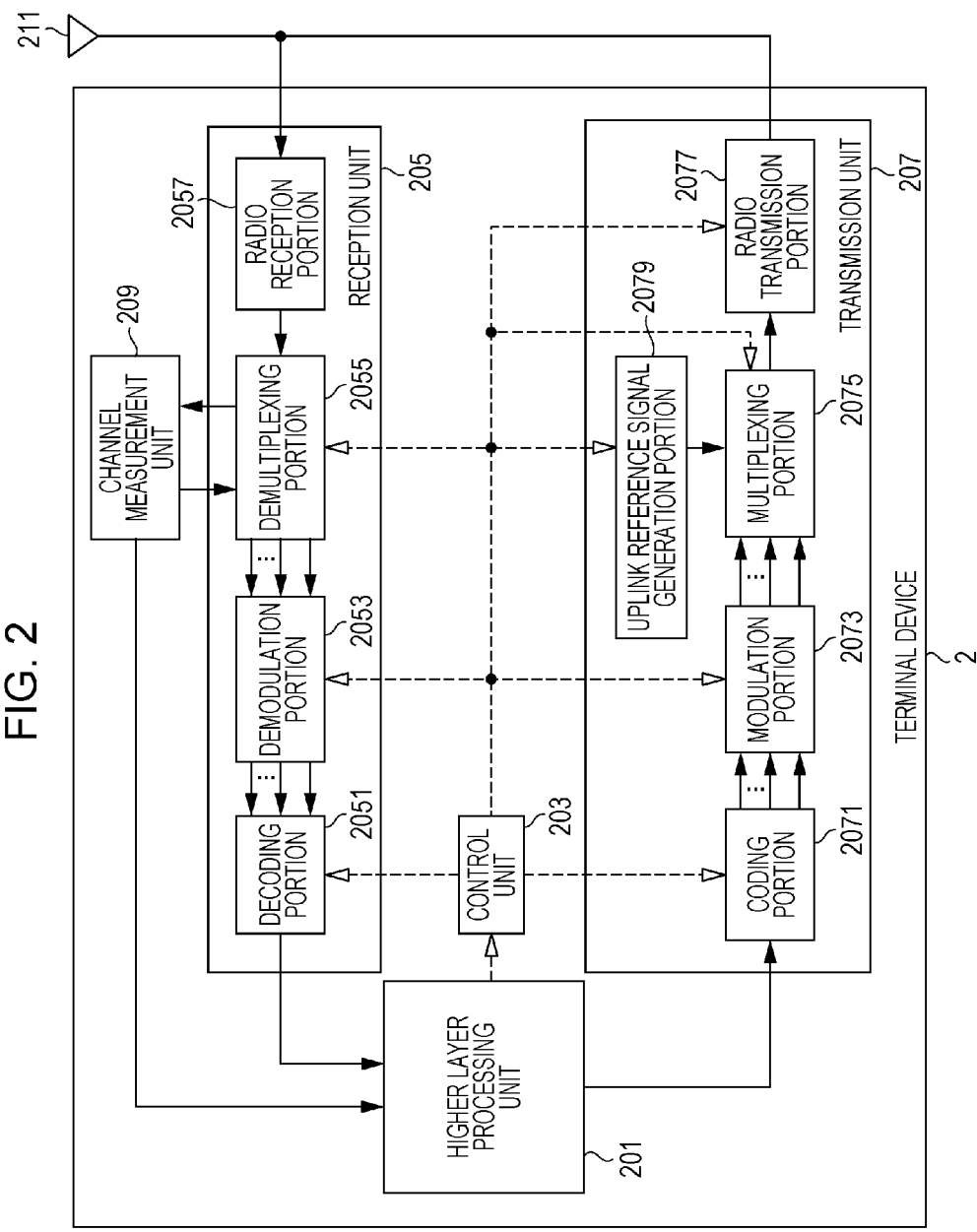
FIG. 2 is a schematic block diagram illustrating a configuration of a terminal device 2 according to the embodiment of the present invention.

FIG. 2 is a schematic block diagram illustrating a configuration of the terminal device 2 according to the embodiment. As illustrated in FIG. 2, the terminal device 2 includes a higher layer processing unit 201, a control unit 203, a reception unit 205, a transmission unit 207, a channel measurement unit 209, and a transmit/receive antenna 211.

The reception unit 205 includes a decoding portion 2051, a demodulation portion 2053, a demultiplexing portion 2055, and a radio reception portion 2057. Reception processing of the terminal station apparatus 2 is performed by the higher layer processing unit 201, the control unit 203, the reception unit 205, and the transmit/receive antenna 211. The transmission unit 207 includes a coding portion 2071, a modulation portion 2073, a multiplexing portion 2075, and a radio transmission portion 2077. Transmission processing of the terminal device 2 is performed by the higher layer processing unit 201, the control unit 203, the transmission unit 207, and the transmit/receive antenna 211.

The higher layer processing unit 201 outputs data information of an uplink, which is generated by an operation of a user, and the like, to the transmission unit. The higher layer processing unit 201 performs processing of a medium access control (MAC) layer, a packet data convergence protocol (PDCP) layer, a radio link control (RLC) layer, and a radio resource control (RRC) layer.

The higher layer processing unit 201 manages various types of configuration information of the terminal device 2. The higher layer processing unit 201 generates information assigned to each channel of the uplink, and outputs the generated information to the transmission unit 207. The higher layer processing unit 201 generates control information for controlling the reception unit 205 and the transmission unit 207, based on downlink control information of which notification is performed on a PDCCH from the base station apparatus 1, and various types of configuration information of the terminal device 2, which are managed by the higher layer processing unit 201 in which radio resource control information of which notification is performed on a PDSCH is configured. The higher layer processing unit 201 outputs the generated control information to the control unit 203. The higher layer processing unit 201 sets various parameters (information elements and RRC messages) of each signal, based on pieces of information from information regarding a first configuration of which notification is performed from the base station apparatus 1, to information regarding the n-th configuration. The higher layer processing unit 201 generates information set described above, and outputs the generated information to the transmission unit 207 through the control unit 203. When connection with the base station apparatus 1 is established, the higher layer processing unit 201 generates function information of the terminal device 2, outputs the generated function information to the transmission unit 207 through the control unit 203, and notifies the base station apparatus 1 thereof. After the connection with the base station apparatus 1 is established, the higher layer processing unit 201 may notify the base station apparatus 1 of the function information.

The function information may include information (RF-Parameters) regarding a RF parameter.

The information regarding the RF parameter may include information (1st SupportedBandCombination) indicating a band supported by the terminal device 2. The information regarding the RF parameter may include information (SupportedBandCombinationExt) indicating a band supporting the carrier aggregation and/or MIMO. The information regarding the RF parameter may include information (2nd SupportedBandConbination) indicating a band which supports a function of performing a plurality of timing advances between bands which are simultaneously integrated in the terminal device 2, or of performing simultaneous transmission and reception between bands. The bands may be listed. The value (entry) indicated by plural pieces of listed information may be used commonly (may indicates the same).

Whether each band (bandE-UTRA, FreqBandIndicator, and E-UTRA Operating Band) supported by the terminal device 2 supports half duplex may be indicated. In a band in which half duplex is not supported, full duplex is supported.

Whether a band supported by the terminal device 2 supports the carrier aggregation and/or MIMO in an uplink may be indicated.

Whether a band supported by the terminal device 2 supports the carrier aggregation and/or MIMO in a downlink may be indicated.

The information regarding the RF parameter may include information indicating a band which supports TDD-FDD carrier aggregation. The above-described bands may be listed.

The information regarding the RF parameter may include information indicating whether a function of performing simultaneous transmission and reception between bands which support TDD-FDD carrier aggregation is supported.

The information regarding the RF parameter may include information indicating whether or not simultaneous transmission and reception is performed between bands of different duplex modes.

The function information may include information (PhyLayerParameters) regarding a parameter of a physical layer. The information regarding a parameter of a physical layer may include information indicating whether a function of performing cross carrier scheduling is supported. The information regarding a parameter of a physical layer may include information indicating a function (CrossCarrierScheduling-UL) of performing cross carrier scheduling for an uplink is supported. The information regarding a parameter of a physical layer may include information indicating a function (CrossCarrierScheduling-DL) of performing cross carrier scheduling for a downlink is supported.

The base station apparatus 1 may perform a configuration relating to cross carrier scheduling for an uplink, for the terminal device 2 in which a function of performing cross carrier scheduling for an uplink is provided, and thus may notify the terminal device 2 of an uplink grant by cross carrier scheduling. That is, the base station apparatus 1 may transmit a DCI format (uplink grant) relating to scheduling of a PUSCH for a second cell, to the terminal device 2 by using a PDCCH of a first cell. The terminal device 2 may read a CIF included in the DCI format having the PDCCH which is transmitted on the PDCCH of the first cell, and thus may recognize a cell in which the DCI format is provided.

The base station apparatus 1 may perform a configuration relating to cross carrier scheduling for a downlink, for the terminal device 2 in which a function of performing cross carrier scheduling for a downlink is provided, and thus may notify the terminal device 2 of a downlink grant by cross carrier scheduling. That is, the base station apparatus 1 may transmit a DCI format (downlink grant) relating to scheduling of a PDSCH for the second cell, to the terminal device 2 by using a PDCCH of the first cell. The terminal device 2 may read a CIF included in the DCI format having the PDCCH which is transmitted on the PDCCH of the first cell, and thus may recognize a cell in which the DCI format is provided.

Here, capacity of cross carrier scheduling relating to a downlink and capacity of cross carrier scheduling relating to an uplink may be (independently) included as a portion of capacity (function, performance) of the terminal device 2, of which the base station apparatus 1 is notified from the terminal device 2. As one example, a parameter group of a physical layer of an information element (for example, UE-EUTRA-Capability) in an RRC message may include a field (first field) and a field (second field). The RRC message is used when the base station apparatus 1 is notified of capacity of the terminal device 2 from the terminal device 2. The field (first field) indicates whether or not cross carrier scheduling relating to a downlink is supported. The field (second field) indicates whether or not cross carrier scheduling relating to an uplink is supported. The terminal device 2 which supports cross carrier scheduling relating to a downlink notifies the base station apparatus 1 of the parameter group of the physical layer with including the first field. The base station apparatus 1 which receives the notification may recognize that the terminal device 2 is a terminal device which supports cross carrier scheduling relating to a downlink. The terminal device 2 which does not support cross carrier scheduling relating to a downlink may notify the base station apparatus 1 of the parameter group of the physical layer without including the first field (with omitting a value set in the first field). The base station apparatus 1 which receives the notification may recognize that the terminal device 2 is a terminal device which does not support cross carrier scheduling relating to a downlink. The terminal device 2 which supports cross carrier scheduling relating to an uplink notifies the base station apparatus 1 of the parameter group of the physical layer with including the second field. The base station apparatus 1 which receives the notification may recognize that the terminal device 2 is a terminal device which supports cross carrier scheduling relating to an uplink. The terminal device 2 which does not support cross carrier scheduling relating to an uplink may notify the base station apparatus 1 of the parameter group of the physical layer without including the second field. The base station apparatus 1 which receives the notification may recognize that the terminal device 2 is a terminal device which does not support cross carrier scheduling relating to an uplink. In this manner, a case where the value which has been set in the field is omitted means that the value is different from any value (for example, "1" which is a value indicating that the corresponding function is supported) which has been set in the field (for example, that the corresponding function is not supported).

The functions may be set to cause only a terminal device which supports cross carrier scheduling in carrier aggregation (carrier aggregation between FDD and FDD, and carrier aggregation between TDD and TDD) of the related art, to support the functions. That is, in order to set a value (for example, "1" indicating support) in the first field and/or the second field, it may be necessary that a value (for example, "1" indicating support) indicating whether or not cross carrier scheduling is supported in the carrier aggregation of the related art is set in the field.

As another example, a field (first field) and a field (second field) are set to be normally included in a parameter group of feature group information (FGI) in an information element of a RRC message. The field (first field) indicates whether or not cross carrier scheduling relating to a downlink is supported. The field (second field) indicates whether or not cross carrier scheduling relating to an uplink is supported. The RRC message is used when the base station apparatus 1 is notified of capacity of the terminal device 2 from the terminal device 2. Values which are set in the fields may be set to indicate whether or not the functions are supported. For example, "1" may be set in a case where the functions are supported, and "0" may be set in a case where the functions are not supported. In addition, "0" may be set in a case where the functions are supported, and "1" may be set in a case where the functions are not supported.

The base station apparatus 1 may notify a terminal device 2 of a downlink grant by cross carrier scheduling. The terminal device 2 has a function of performing cross carrier scheduling for a downlink and does not have a function of performing cross carrier scheduling for an uplink. The terminal device 2 may ignore an uplink grant even when notification of the uplink grant is performed by cross carrier scheduling.

The base station apparatus 1 may notify a terminal device 2 of an uplink grant by cross carrier scheduling. The terminal device 2 has a function of performing cross carrier scheduling for an uplink and does not have a function of performing cross carrier scheduling for a downlink. The terminal device 2 may ignore a downlink grant even when notification of the downlink grant is performed by cross carrier scheduling.

In a case where a function which is not supported is present among functions included in the function information, the higher layer processing unit 201 may not set information indicating whether or not the function is supported, in the function information. The base station apparatus 1 considers the function which is not set in the function information not to be supported by the terminal device 2, and performs various configurations. The information indicating whether or not the function is supported may be information indicating the function is supported.

If the function which is not supported is present, the higher layer processing unit 201 sets a specific value (for example, "0") indicating not to be supported or information (for example, "not supported", "disable", "FALSE", and the like), regarding the function. The higher layer processing unit 201 may notify the base station apparatus 1 of function information including the above information.

If the function which is supported is present, the higher layer processing unit 201 sets a specific value (for example, "1") indicating to be supported or information (for example, "supported", "enable", "TRUE", and the like), regarding the function. The higher layer processing unit 201 may notify the base station apparatus 1 of function information including the above information.

In a case where there is no a function of performing simultaneous transmission and reception between bands which may be simultaneously integrated, the higher layer processing unit 201 sets a specific value or information indicating that the function is not supported, in information (simultaneousRx-Tx) indicating whether or not the function of performing simultaneous transmission and reception between bands which may be simultaneously integrated is supported. In addition, the information indicating whether or not the function of performing simultaneous transmission and reception between bands which may be simultaneously integrated is supported may be not set in the function information.

The higher layer processing unit 201 acquires the following pieces of information from the reception unit 205. The pieces of information include information indicating a sounding subframe, and a bandwidth of the radio resources reserved for transmitting the SRS in the sounding subframe; information indicating a subframe in which the periodic SRS of which the terminal device 2 is notified by the base station apparatus 1, a frequency band, and the quantity of cycling shift used in CAZAC sequences of the periodic SRS; and information indicating a frequency band for transmitting the aperiodic SRS of which the terminal device 2 is notified by the base station apparatus 1, and the quantity of cycling shift used in CAZAC sequences of the aperiodic SRS. The sounding subframe (SRS subframe, SRS transmission subframe) is a subframe for reserving radio resources which are used for transmitting the SRS reported by the base station apparatus 1.

The higher layer processing unit 201 controls SRS transmission in accordance with the information. Specifically, the higher layer processing unit 201 controls the transmission unit 207 to transmit a periodic SRS in accordance with information regarding the periodic SRS once or periodically. In a case where transmission of the aperiodic SRS in a SRS request (SRS indicator) input from the reception unit 205 is required, the higher layer processing unit 201 transmits the aperiodic SRS in accordance with information regarding the aperiodic SRS, the predetermined number of times (for example, one time).

The higher layer processing unit 201 controls transmission power of the PRACH, the PUCCH, the PUSCH, the periodic SRS, and the aperiodic SRS, based on information regarding transmission power control of various uplink signals transmitted from the base station apparatus 1. Specifically, the higher layer processing unit 201 configures the transmission power of the various uplink signals, based on information regarding various types of uplink power control acquired from the reception unit 205. For example, the transmission power of the SRS is controlled based on $P_{O\_PUSCH}$, $\alpha$, power offset $P_{SRS\_OFFSET}(0)$ (first power offset (pSRS-Offset)) for the periodic SRS, power offset $P_{SRS\_OFFSET}(1)$ (second power offset (pSRS-OffsetAp)) for the aperiodic SRS, and a TPC command. The higher layer processing unit 201 performs switching between the first power offset and the second power offset, in accordance with which the periodic SRS or the aperiodic SRS is provided for $P_{SRS\_OFFSET}$.

In a case where third power offset is configured for the periodic SRS and/or aperiodic SRS, the higher layer processing unit 201 sets transmission power, based on the third power offset. The third power offset may be configured so as to have a value in a range wider than that of the first power offset or the second power offset. The third power offset may be configured for each of the periodic SRS and the aperiodic SRS. That is, the information of parameters relating to the uplink power control corresponds to an information element or a RRC message which includes parameters relating to control of transmission power of various uplink physical channels.

In a case where the sum of transmission power of a first uplink reference signal and transmission power of a physical uplink shared channel exceeds the maximum transmission power (for example, $P_{CMAX}$ or $P_{CMAX,\ c}$) configured in the terminal device 2, in a certain serving cell or a certain subframe, the higher layer processing unit 201 output instruction information to the transmission unit 207 through the control unit 203, so as to transmit the physical uplink shared channel.

In a case where the sum of transmission power of the first uplink reference signal and transmission power of a physical uplink control channel exceeds the maximum transmission power (for example, $P_{CMAX}$ or $P_{CMAX,\ c}$) configured in the terminal device 2, in a certain serving cell or a certain subframe, the higher layer processing unit 201 output instruction information to the transmission unit 207 through the control unit 203, so as to transmit the physical uplink control channel.

In a case where the sum of transmission power of a second uplink reference signal and transmission power of the physical uplink shared channel exceeds the maximum transmission power configured in the terminal device 2, in a certain serving cell or a certain subframe, the higher layer processing unit 201 output instruction information to the transmission unit 207 through the control unit 203, so as to transmit the physical uplink shared channel.

In a case where the sum of transmission power of the second uplink reference signal and transmission power of the physical uplink control channel exceeds the maximum transmission power configured in the terminal device 2, in a certain serving cell (for example, serving cell c) or a certain subframe (for example, subframe i), the higher layer processing unit 201 output instruction information to the transmission unit 207 through the control unit 203, so as to transmit the physical uplink control channel.

In a case where transmission of a plurality of physical channels occurs at the same timing (for example, subframe), the higher layer processing unit 201 may control transmission power of various physical channels or control transmission of the various physical channels, in accordance with the priorities of the various physical channels. The higher layer processing unit 201 outputs control information thereof to the transmission unit 207 through the control unit 203.

In a case where carrier aggregation is performed by using a plurality of component carriers which respectively correspond to a plurality of serving cells or a plurality of serving cells, the higher layer processing unit 201 may control transmission power of various physical channels or control transmission of the various physical channels, in accordance with the priorities of the various physical channels.

The higher layer processing unit 201 may control transmission of various physical channels which are to be transmitted from a cell, in accordance with the priority of the cell. The higher layer processing unit 201 outputs control information thereof to the transmission unit 207 through the control unit 203.

The higher layer processing unit 201 outputs instruction information to the transmission unit 207 through the control unit 203, based on information regarding a configuration of the uplink reference signal of which notification is performed from the base station apparatus 1, for example, such that the uplink reference signal is generated. That is the reference signal control unit 2013 outputs the information regarding the configuration of the uplink reference signal, to the uplink reference signal generation portion 2079 through the control unit 203.

The control unit 203 generates a control signal for controlling the reception unit 205 and the transmission unit 207, based on the control information from the higher layer processing unit 201. The control unit 203 outputs the generated control signal to the reception unit 205 and the transmission unit 207, and thus controls the reception unit 205 and the transmission unit 207.

The reception unit 205 separates, demodulates, and decodes a reception signal which is received from the base station apparatus 1 through the transmit/receive antenna 211, in accordance with the control signal input from the control unit 203. The reception unit 205 outputs information obtained by the decoding to the higher layer processing unit 201.

The reception unit 205 performs appropriate reception processing in accordance with whether or not information regarding a first configuration and/or information regarding a second configuration is received. For example, in a case where either of the information regarding the first configuration and the information regarding the second configuration is received, the reception unit 205 detects a first control information field from the received downlink control information format. In a case where the information regarding the first configuration and the information regarding the second configuration are received, the reception unit 205 detects a second control information field from the received downlink control information format.

In a case where the reception unit 205 performs TDD-FDD carrier aggregation, the reception unit 205 may perform reception processing on the received DCI format, based on the frame structure type of a cell which performs scheduling. In a case where the reception unit 205 performs TDD-FDD carrier aggregation, the reception unit 205 may perform reception processing on the received DCI format, based on the frame structure type of a scheduled cell. For example, if the frame structure type is FDD, the reception unit 205 performs reception processing with a DCI format for FDD. If the frame structure type is TDD, the reception unit 205 performs reception processing with a DCI format for TDD.

The radio reception portion 2057 converts (down-converts) the frequency of the signal of a downlink which has been received through the receive antenna into an intermediate frequency, and removes an unnecessary frequency component. The radio reception portion 2057 controls an amplification level so as to appropriately maintain the signal level, and performs orthogonal demodulation based on the same phase component and the orthogonal component of the received signal. The radio reception portion 2057 converts the analog signal subjected to orthogonal demodulation, into a digital signal. The radio reception portion 2057 removes a portion corresponding to a guard interval from the converted digital signal. The radio reception portion 2057 performs Fast Fourier Transform on a signal obtained by removing the guard interval, and thus extracts a signal in the frequency domain.

The demultiplexing portion 2055 separates the extracted signal into a PDCCH, a PDSCH, and a downlink reference signal (DL-RS). The separation is performed based on assignment information and the like of radio resources of which notification is performed in downlink control information. The demultiplexing portion 2055 performs compensation of a path of the PDCCH and the PDSCH, based on an estimated value of the path, which is input from the channel measurement unit 209. The demultiplexing portion 2055 outputs the downlink reference signal obtained by the separation, to the channel measurement unit 209.

The demodulation portion 2053 performs demodulation of the QPSK modulation scheme, on the PDCCH transmitted by using the DCI format. The demodulation portion 2053 outputs a result obtained by the demodulation, to the decoding portion 2051. The demodulation portion 2053 performs demodulation of the modulation scheme of which notification is performed in the downlink control information, such as QPSK, 16QAM, and 64QAM on the PDSCH. The demodulation portion 2053 outputs a result obtained by the demodulation, to the decoding portion 2051.

The decoding portion 2051 examines decoding of a PDCCH. In a case where decoding is determined to succeed, the decoding portion 2051 outputs the decoded downlink control information to the higher layer processing unit 201. The decoding portion 2051 performs decoding with the coding rate of which notification is performed in the downlink control information, and outputs data information obtained by decoding, to the higher layer processing unit 201.

In a case where a function of independently performing cross carrier scheduling for an uplink and a downlink is not provided, the decoding portion 2051 performs decoding processing (blind decoding) by using DCI format 0 and DCI format 1A as one DCI format.

In a case where a function of independently performing cross carrier scheduling for an uplink and a downlink is provided, the decoding portion 2051 performs decoding processing by using DCI format 0 and DCI format 1A as independent DCI formats.

In a case where a function of performing cross carrier scheduling for an uplink is not provided, the decoding portion 2051 does not expect that cross carrier scheduling of an uplink grant such as DCI format 0 or DCI format 4 is performed.

In a case where a function of performing cross carrier scheduling for a downlink is not provided, the decoding portion 2051 does not expect that cross carrier scheduling of a downlink grant such as DCI format 1 or DCI format 1A is performed.

In a case where a configuration relating to cross carrier scheduling for either of an uplink and a downlink is performed, the decoding portion 2051 may increase the total number of performing blind decoding.

In a case where a configuration relating to cross carrier scheduling only for either of an uplink and a downlink is set, the decoding portion 2051 performs decoding processing so as not to exceed the total number of performing blind decoding. For example, the number of PDCCH candidates in an USS is restricted. The aggregation level for performing decoding in the USS is restricted. In addition, a cell (component carrier) which performs decoding processing is restricted. For example, decoding processing is performed only for a primary cell. The base station apparatus 1 transmits a PDCCH by using the number of PDCCH candidates, the aggregation level, or the cell which is restricted so as not to increase the number of performing blind decoding.

The channel measurement unit 209 measures the path loss of the downlink based on the downlink reference signal input from the demultiplexing portion 2055, and outputs the measured path loss to the higher layer processing unit 201. The channel measurement unit 209 calculates an estimated value of a channel of a downlink, based on the downlink reference signal, and outputs the calculated value to the demultiplexing portion 2055. The channel measurement unit 209 measures received power of a first signal and/or a second signal, or measures reception quality thereof, in accordance with various types of information regarding measurement, of which notification is performed from the reference signal control unit 2013 through the control unit 203, and various types of information regarding a measurement report. The channel measurement unit 209 outputs the result thereof to the higher layer processing unit 201. In a case where an instruction of performing a channel evaluation of the first signal and/or the second signal is performed, the channel measurement unit 209 may output a result regarding the channel evaluation of each of the signals, to the higher layer processing unit 201. Here, the first signal or the second signal are reference signals (pilot signals, pilot channels, base signals). In addition to the first signal or the second signal, a third signal or a fourth signal may be provided. That is, the channel measurement unit 209 measures channels of one or more signals. The channel measurement unit 209 configures a signal for measuring the channel, in accordance with the control information of which notification is performed from the higher layer processing unit 201 through the control unit 203.

In a certain cell (first cell), in a case where an uplink subframe in which uplink transmission is required is generated, and thus measurement of CRS or CSI-RS is not possible in the same subframe of a cell (second cell) different from the certain cell, the channel measurement unit 209 may perform processing except for a subframe in which measurement of an average of measurement results (received power, reception quality, channel quality, and the like) in the second cell is not possible. In other words, the channel measurement unit 209 may calculate an average value of the measurement results (received power, reception quality, channel quality, and the like), only by using the received CRS or CSI-RS. The channel measurement unit 209 may transmit the calculation result thereof (indicator or information corresponding to the calculation result) to the base station apparatus 1 through the transmission unit 207.

The transmission unit 207 generates an uplink demodulation reference signal (UL DMRS) and/or a sounding reference signal (SRS), based on the control signal (control information) input from the control unit 203. The transmission unit 207 codes and modulates data information input from the higher layer processing unit 201, and performs multiplexing of a PUCCH, a PUSCH, and the generated UL DMRS and/or the generated SRS. The transmission unit 207 adjusts transmission power of the PUCCH, the PUSCH, the UL DMRS, and the SRS, and transmits the adjusted transmission power to the base station apparatus 1 through the transmit/receive antenna 211.

In a case where information regarding a measurement result is output from the higher layer processing unit 201, the transmission unit 207 transmits the output information, to the base station apparatus 1 through the transmit/receive antenna 211.

In a case where channel state information which is a result regarding the channel evaluation is output from the higher layer processing unit 201, the transmission unit 207 performs feedback of channel state information to the base station apparatus 1. That is, the higher layer processing unit 201 generates channel state information (CSI, CQI, PMI, RI) based on a measurement result of which notification is performed from the channel measurement unit 209, and performs feedback to the base station apparatus 1 through the control unit 203.

If a predetermined grant (or a predetermined downlink control information format) is detected in the reception unit 205, the transmission unit 207 transmits an uplink signal corresponding to the predetermined grant in the first uplink subframe among subframes subsequent to a predetermined subframe from a subframe in which the grant is detected. For example, if the grant is detected in the subframe i, the uplink signal may be transmitted in the first uplink subframe among subframes subsequent to a subframe (i+k).

In a case where a transmission subframe of the uplink signal is the subframe i, the transmission unit 207 sets transmission power of the uplink signal, based on a power control adjustment value obtained by a TPC command which is received in a subframe (i-k). Here, the power control adjustment value f(i) (or g(i)) is configured based on a corrected value or an absolute value which is correlated with a value set in the TPC command. In a case where the accumulation is effective, corrected values correlated with the value set in the TPC command are accumulated, and the accumulation result is applied as the power control adjustment value. In a case where the accumulation is not effective, a single absolute value which is correlated with a value set in the TPC command is applied as the power control adjustment value. The power control adjustment value f(i) for transmission of a PUSCH may be set for each serving cell. The power control adjustment value f(i) for transmission of a PUSCH may be set for each subframe set. In a case where a PUCCH may be transmitted for each serving cell, the power control adjustment value g(i) for transmission of a PUCCH may be set for each serving cell. In a case where a PUCCH may be transmitted in a plurality of subframe sets, the power control adjustment value g(i) for transmission of a PUCCH may be set for each subframe set. In a case where the PUCCH may not be transmitted in a plurality of subframe sets, even when a plurality of subframe sets is configured, the power control adjustment value g(i) for transmission of a PUCCH is set for only one subframe set. In a case where the PUCCH may be transmitted only to the primary cell, the power control adjustment value g(i) for transmission of the PUCCH may be set for the primary cell.

In a case where a transmission subframe of the PUSCH is the subframe i, the transmission unit 207 configures the power control adjustment value $f_c(i)$ by using a correction value or an absolute value which is obtained by a TPC command received in the subframe $(i-K_{PUSCH})$, and sets transmission power for the PUSCH transmitted in the subframe i, by using the power control adjustment value $f_c(i)$.

The transmission unit 207 specifies the value of $K_{PUSCH}$ for transmission of the PUSCH in a certain subframe to be 4 for FDD. If it is assumed that one or more serving cells are configured in the terminal device 2, and TDD UL/DL configurations of at least two serving cells are not the same as each other, for TDD, the TDD UL/DL configurations refer to an uplink reference UL/DL configuration for the serving cell c. The transmission unit 207 specifies the value of $K_{PUSCH}$ for any of TDD UL/DL configurations 1 to 6, for example, based on the table illustrated in FIG. 7. If it is assumed that transmission of the PUSCH is scheduled in the subframe #2 or #7, by using a PDCCH/EPDCCH having DCI format 0/4 in which the least significant bit of a UL index is set to be "1", regarding the TDD UL/DL configuration 0, the transmission unit 207 specifies the value of $K_{PUSCH}$ to be 7. In a case where transmission of the PUSCH is performed in an uplink subframe other than the subframe #2 or #7, the transmission unit 207 specifies the value of $K_{PUSCH}$, for example, based on the table illustrated in FIG. 7.

The uplink reference UL/DL configuration may be applied to the FDD cell. In a case where any of uplink reference UL/DL configurations 1 to 6 is provided for the FDD cell to which the uplink reference UL/DL configuration is applied, the transmission unit 207 specifies the value of $K_{PUSCH}$, for example, based on the table illustrated in FIG. 7. In a case of the uplink reference UL/DL configuration 0, if transmission of the PUSCH in the subframe #2 or #7 is scheduled by using a PDCCH/EPDCCH having DCI format 0/4 in which the least significant bit of a UL index is set to be "1", the transmission unit 207 specifies the value of $K_{PUSCH}$ to be 7. In a case where transmission of the PUSCH is performed in an uplink subframe other than the subframe #2 or #7, the transmission unit 207 specifies the value of $K_{PUSCH}$, for example, based on the table illustrated in FIG. 7. If transmission of the PUSCH is not scheduled for the FDD cell to which the uplink reference UL/DL configuration is applied, by using the DCI format having an attached UL index, the transmission unit 207 specifies the value of $K_{PUSCH}$, for example, based on the table illustrated in FIG. 7.

In a case where a UL index (or DAI) is not set in the DCI format for the FDD cell to which the uplink reference UL/DL configuration is applied, the transmission unit 207 specifies the value of $K_{PUSCH}$ to be a predetermined value (for example, 4).

In a case where the uplink reference UL/DL configuration is not applied to the FDD cell, the transmission unit 207 specifies the value of $K_{PUSCH}$ for the PUSCH in a certain uplink subframe, to be a predetermined value (for example, 4).

The transmission unit 207 specifies a downlink subframe in which a TPC command for transmission of the PUSCH in a certain subframe is transmitted, based on the specified value of $K_{PUSCH}$, and sets transmission power for transmission of the PUSCH by using a value obtained by the TPC command detected from the downlink subframe.

If the subframe i is not an uplink subframe in TDD or FDD to which the uplink UL/DL configuration is applied, the transmission unit 207 sets the value obtained from the TPC command to 0. In other words, the power control adjustment value $f_c(i)$ in the subframe i is the same as the power control adjustment value $f_c(i-1)$ in the subframe $(i-1)$.

In a case where DRX occurs in the subframe i, the transmission unit 207 sets the value obtained from the TPC command to 0. In other words, the power control adjustment value $f_c(i)$ in the subframe i is the same as the power control adjustment value $f_c(i-1)$ in the subframe $(i-1)$.

In a case where the TPC command for the subframe i is not decoded, the transmission unit 207 sets the value obtained from the TPC command to 0. In other words, the power control adjustment value $f_c(i)$ in the subframe i is the same as the power control adjustment value $f_c(i-1)$ in the subframe $(i-1)$.

In a case where either of the information regarding the first configuration and the information regarding the second configuration is received in the reception unit 205, the transmission unit 207 sets transmission power based on a parameter relating to the first uplink power control. In a case where the information regarding the first configuration and the information regarding the second configuration are received in the reception unit 205, the transmission unit 207 sets the transmission power based on a parameter relating to the second uplink power control, and transmits the uplink signal.

The coding portion 2071 performs coding such as turbo-coding, convolutional coding, and block coding, on the uplink control information input from the higher layer processing unit 201, and data information. The modulation portion 2073 modulates the coded bits input from the coding portion 2071, by using a modulation scheme such as BPSK, QPSK, 16QAM, and 64QAM.

The uplink reference signal generation portion 2079 generates an uplink reference signal based on information regarding the configuration of the uplink reference signal. That is, the uplink reference signal generation portion 2079 generates CAZAC sequences known by the base station apparatus 1. The CAZAC sequences are obtained by using a rule which is determined based on a cell identifier for identifying the base station apparatus 1, a bandwidth for assigning an uplink demodulation reference signal, the first uplink reference signal, and the second uplink reference signal, and the like. The uplink reference signal generation portion 2079 adds the cycling shift to the CAZAC sequences of the generated uplink demodulation reference signal, the first uplink reference signal, and the second uplink reference signal, based on the control signal input from the control unit 203.

The uplink reference signal generation portion 2079 may initialize base sequences of the uplink demodulation reference signal, and/or the sounding reference signal, and the uplink reference signal, based on predetermined parameters.

The predetermined parameters may be the same as each other in the reference signals. The predetermined parameters may be configured independently in the reference signals. That is, the uplink reference signal generation portion 2079 may initialize the base sequences of the reference signals by using the same parameter, as long as there is no parameter which is independently configured.

The multiplexing portion 2075 arranges modulation symbols of the PUSCH in parallel with each other, based on the control signal input from the control unit 203, so as to perform discrete Fourier transform (DFT), and performs multiplexing of the PUCCH, the signal of the PUSCH, and the generated UL DMRS, and the generated SRS.

The radio transmission portion 2077 performs Inverse Fast Fourier Transform on the multiplexed signals, and performs modulation of the SC-FDMA scheme. The radio transmission portion 2077 adds a guard interval to SC-FDMA symbols obtained by SC-FDMA modulation, and generates a baseband digital signal. The radio transmission portion 2077 converts the baseband digital signal into an analog signal, and generates the same-phase component and the orthogonal component of an intermediate frequency, from the analog signal. The radio transmission portion 2077 removes an extra frequency component from the intermediate frequency band, and converts (up-converts) a signal having an intermediate frequency into a signal having a high frequency (radio frequency). The radio transmission portion 2077 removes an extra frequency component, amplifies power, and outputs the signal to the transmit/receive antenna 211 so as to perform transmission.

In the embodiment of the present invention, the reception processing may include detection processing (detection). The reception processing may include demodulation processing (demodulation). The reception processing may include decoding processing (decode, decoding).

In the terminal device 2, the priorities of the physical channels/physical signals to be transmitted may be configured or defined in advance, in accordance with the type of the physical channel.

In the embodiment of the present invention, the terminal device 2 may report a measurement result of the received power to the base station apparatus 1 based on the CSI-RS or a discovery reference signal (DRS). The terminal device 2 may perform periodically reporting. The terminal device 2 may perform the reporting in a case where a certain condition is satisfied.

In the embodiment of the present invention, in a case where the terminal device 2 measures the received power based on the CSI-RS or the DRS, the terminal device 2 may perform transmission power control of the uplink signal based on the received power. That is, the terminal device 2 may determine downlink path loss based on the received power.

In the embodiment of the present invention, in a case where the sum of transmission power of the various uplink signals, which includes transmission power of the first uplink reference signal and/or the second uplink reference signal exceeds the maximum transmission power configured in the terminal device 2, the terminal device 2 may not transmit the first uplink reference signal and/or the second uplink reference signal.

In the embodiment of the present invention, if the base station apparatus 1 or the terminal device 2 satisfies a certain condition, one thereof may be configured as an uplink reference UL-DL configuration, and another may be configured as a downlink reference UL-DL configuration. For example, the terminal device 2 may receive two pieces of information regarding a first configuration and information regarding a second configuration, and then may set the received pieces of information as the uplink reference UL-DL configuration and the downlink reference UL-DL configuration. A DCI format (for example, DCI format 0/4) associated with an uplink may be transmitted in a downlink subframe configured in the uplink reference UL-DL configuration.

Each of the uplink reference UL-DL configuration and the downlink reference UL-DL configuration may be configured by using the same table. In a case where indices of the uplink reference UL-DL configuration and the downlink reference UL-DL configuration are configured based on the same table, it is preferable that the uplink reference UL-DL configuration and the downlink reference UL-DL configuration are configured so as to have different indices from each other. That is, it is preferable that different subframe patterns are respectively configured in the uplink reference UL-DL configuration and the downlink reference UL-DL configuration.

In a case where a plurality of TDD UL/DL configuration (UL/DL configuration, UL-DL configuration) is indicated for one serving cell (primary cell, secondary cell), any one thereof may be configured as an uplink reference UL-DL configuration, and another may be configured as a downlink reference UL-DL configuration in accordance with conditions. The uplink reference UL-DL configuration may be used for determining a correspondence between a subframe in which at least a physical downlink control channel is allocated, and a subframe in which a physical uplink shared channel corresponding to the physical downlink control channel is allocated. The uplink reference UL-DL configuration may be different from a transmission direction (that is, uplink or downlink) of an actual signal. The downlink reference UL-DL configuration may be used for determining a correspondence between a subframe in which at least a physical downlink shared channel is allocated, and a subframe in which HARQ-ACK corresponding to the physical downlink shared channel is transmitted. The downlink reference UL-DL configuration may be different from a transmission direction (that is, uplink or downlink) of an actual signal). That is, the uplink reference UL-DL configuration is used for specifying (selecting, determining) a correspondence between a subframe n in which a PDCCH/EPDCCH/PHICH is allocated, and a subframe (n+k) in which a PUSCH corresponding to the PDCCH/EPDCCH/PHICH is allocated. In a case where one primary cell is configured, or in a case where one primary cell and one secondary cell are configured, and the uplink reference UL-DL configuration for the primary cell and the uplink reference UL-DL configuration for the secondary cell are the same as each other, the corresponding uplink reference UL-DL configuration is used for determining a correspondence between a subframe in which a PDCCH/EPDCCH/PHICH is allocated, and a subframe in which a PUSCH corresponding to the PDCCH/EPDCCH/PHICH is allocated, in each of the two serving cells. The downlink reference UL-DL configuration is used for specifying (selecting, determining) a correspondence between a subframe n in which a PDSCH is allocated, and a subframe (n+k) in which HARQ-ACK corresponding to the PDSCH is allocated. In a case where one primary cell is configured, or in a case where one primary cell and one secondary cell are configured, and the downlink reference UL-DL configuration for the primary cell and the downlink reference UL-DL configuration for the secondary cell are the same as each other, the corresponding downlink reference UL-DL configuration is used for specifying (selecting, determining) a correspondence between a subframe n in which a PDSCH is allocated, and a subframe (n+k) in which a HARQ-ACK corresponding to the PDSCH is transmitted, in each of the two serving cells.

If a TDD UL/DL configuration (first TDD UL/DL configuration) for the uplink transmission reference, and a TDD UL/DL configuration (second TDD UL/DL configuration) for the downlink transmission reference are configured, and information regarding the uplink transmission power control is configured, in a case where subframes having the same type are configured in the first TDD UL/DL configuration and the second TDD UL/DL configuration, the terminal device 2 sets the uplink power control of the subframe, based on the parameters relating to the first uplink power control. In a case where subframes having different types are configured in the first TDD UL/DL configuration and the second TDD UL/DL configuration, the uplink power of the subframe is set based on the parameters relating to the second uplink power control. The first TDD UL/DL configuration may be referred to as an uplink reference UL/DL configuration, and the second TDD UL/DL configuration may be referred to as a downlink reference UL/DL configuration.

The flexible subframe is a subframe which is an uplink subframe or a downlink subframe. The flexible subframe is a subframe which is a downlink subframe or a special subframe. The flexible subframe is a subframe which is uplink subframe or the special subframe. That is, the flexible subframe is a subframe which is a first subframe or a second subframe. For example, a subframe configured as the flexible subframe is processed as the first subframe (for example, uplink subframe) in a case of Condition 1, and is processed as the second subframe (for example, downlink subframe) in a case of Condition 2.

The flexible subframe may be set based on the first configuration and the second configuration. For example, in a case where a certain subframe i is configured as the uplink subframe in the first configuration, and is configured as the downlink subframe in the second configuration, the subframe i functions as the flexible subframe. The flexible subframe may be configured based on information for performing an instruction of a subframe pattern of the flexible subframe.

A plurality of subframes may be configured not based on two TDD UL/DL configurations, but based on one TDD UL/DL configuration and a flexible subframe pattern (downlink candidate subframe pattern or uplink candidate subframe pattern, addition subframe). The terminal device 2 may receive a downlink signal by using a subframe index indicated by a flexible subframe pattern as long as, even when indication as the uplink subframe in the TDD UL/DL configuration is performed, the uplink signal is transmitted in the subframe. The terminal device 2 may transmit the uplink signal as long as even when indication as the downlink subframe in the TDD UL/DL configuration is performed, an instruction of transmitting the uplink signal in the subframe is performed in advance. An instruction for a specific subframe as an uplink/downlink candidate subframe may be performed.

If a certain condition is satisfied, the terminal device 2 may recognize one set of subframes as a subframe set for an uplink, and recognize the other set of subframes as a subframe set for a downlink. Here, the subframe set for an uplink corresponds to a set of subframes configured for transmitting a PUSCH and a PHICH. The downlink subframe set corresponds to a set of subframes configured for transmitting a PDSCH and HARQ. Information indicating association of subframes with the PUSCH and the PHICH, and information indicating association of subframes with the PDSCH and the HARQ may be configured in the terminal device 2 in advance.

In the embodiment of the present invention, a plurality of subframe sets is configured for one serving cell (primary cell, secondary cell, carrier frequency, transmission frequency, component carrier). A cell in which a plurality of subframe sets is configured, and a cell in which a plurality of subframe sets is not configured may be provided.

In the embodiment of the present invention, in a case where two or more subframe sets are independently configured for one serving cell, the maximum transmission power ($P_{CMAX}$, $P_{CMAX, c}$) for each terminal device 2 may be configured for each of the subframe sets. That is, the terminal device 2 may configure plural pieces of independent maximum transmission power to be plural. That is, plural pieces of maximum transmission power ($P_{CMAX}$, $P_{CMAX, c}$) may be set for one serving cell. Plural pieces of the maximum allowable output power ($P_{EMAX, c}$) may be configured for one serving cell.

In a case where resource assignments of various uplink signals are the same as each other, the base station apparatus 1 may detect the various uplink signals by using a difference between signal sequences of the uplink signals. That is, the base station apparatus 1 may recognize the uplink signal by using the difference between the signal sequences of the received uplink signals. The base station apparatus 1 may determine whether or not transmission to the base station apparatus 1 is performed, by using the difference between the signal sequences of the received uplink signals.

In a case where an instruction of measuring received power is performed by using the CSI-RS or the DRS from the base station apparatus 1, the terminal device 2 may calculate downlink path loss based on the measurement result, and use the calculated downlink path loss in the uplink transmission power control.

Here, the measurement of the received power may be referred to as reference signal received power (RSRP) measurement or reception signal power measurement. Measurement of reception quality may be referred to as reference signal received quality (RSRQ) measurement or reception signal quality measurement.

The resource assignment (resource allocation, mapping to resource elements, mapping to physical resources) of the CSI-RS or the DRS may be frequency-shifted. The frequency shift of the CSI-RS or the DRS may be determined based on the physical cell ID. The frequency shift of the CSI-RS or the DRS may be determined based on the virtual cell ID.

For example, if notification of information is not performed from the base station apparatus 1, the terminal device 2 measures received power of the first downlink reference signal. Notification of information for an instruction of whether or not received power of the second downlink reference signal is measured is performed for the terminal device 2 from the base station apparatus 1. In a case where the instruction information indicates that the received power of the second downlink reference signal may be measured, the terminal device 2 measures the received power of the second downlink reference signal. At this time, the terminal device 2 may measure the received power of the first downlink reference signal along with the measurement of the second downlink reference signal. In a case where the instruction information indicates that measuring the received power of the second downlink reference signal is not possible, the terminal device 2 measures the received power of only the first downlink reference signal. The instruction information may include information for an instruction of whether or not reception quality of the second downlink reference signal is measured. Regardless the instruction information, received power of a third downlink reference signal may be measured.

In a case where two subframe sets are configured for one serving cell, if the second subframe set is set to be a subframe pattern of the flexible subframe, information of instructing the flexible subframe of a pattern of a subframe in which the DCI format including the TPC command field can be received may be transmitted to the terminal device 2 from the base station apparatus 1.

A pattern of a subframe in which a TPC command applicable to the uplink subframe which belongs to the first subframe set, and a pattern of a subframe in which a TPC command applicable to the uplink subframe which belongs to the second subframe set may be respectively configured. The correspondence between the uplink subframe and the downlink subframe in which the DCI format including the TPC command for the uplink subframe is transmitted may be managed in a table.

RSRP measurement results may be independent from each other in a subframe set. A RSRP by the CRS received in a downlink subframe of a fixation subframe and a RSRP by the CRS received in the flexible subframe may be independently measured.

In the embodiment of the present invention, in a case where a plurality of subframe sets is configured in one cell (serving cell, primary cell, secondary cell), the subframe sets may be indicated by a bitmap (bit sequence). For example, a subframe set constituted by fixation subframes may be indicated by a bit sequence. A subframe set constituted by flexible subframes may be indicated by a bit sequence. The subframe sets may be independently configured in FDD and TDD. For example, the subframe sets may be indicated by a 40-bit bit sequence in FDD, may be indicated by a 20-bit bit sequence in TDD and the subframe configurations (TDD UL/DL configurations) 1 to 5. The subframe sets may be indicated by a 70-bit bit sequence in the subframe configuration 0, and may be indicated by a 60-bit bit sequence in the subframe configuration 6. The first bit or a left-end bit of the bit sequence corresponds to the subframe #0 of a radio frame which satisfies a system frame number (SFN) mod x=0. A subframe in which "1" is set in the bit sequence is used. For example, in a case where "1011000011" (in a case where the left end indicates the subframe #0) or "1100001101" (in a case where the right end indicates the subframe #0) is indicated in a 10-bit bit sequence, the subframes #0, #2, #3, #8, and #9 are used.

In the embodiment of the present invention, in a case where a plurality of subframe sets is configured in one cell (serving cell, primary cell, secondary cell), an uplink subframe set may be configured based on the uplink reference UL/DL configuration, and a downlink subframe set may be configured based on the downlink reference UL/DL configuration.

In the embodiment of the present invention, a subframe pattern (measSubframePatternPCell), a subframe pattern (csi-measSubframeSet1, csi-measSubframeSet2), and a subframe pattern (epdcch-SubframePattern) are configured for the primary cell. The subframe pattern (measSubframePatternPCell) is for measuring a primary cell, such as RSRP/RSRQ/radio link monitoring. The subframe pattern (csi-measSubframeSet1, csi-measSubframeSet2) is used for measuring a CSI. The subframe pattern (epdcch-SubframePattern) is used for monitoring an EPDCCH.

In the embodiment of the present invention, a subframe pattern (epdcch-SubframePattern) for monitoring an EPDCCH is configured for the secondary cell.

In the embodiment of the present invention, a subframe pattern (measSubframePatternNeigh) for measuring RSRP and RSRQ at a carrier frequency is configured for an adjacent cell.

In the embodiment of the present invention, the subframe pattern (csi-measSubframeSet1, csi-measSubframeSet2) for measuring a CSI may be common between the primary cell and the secondary cell.

In the embodiment of the present invention, the subframe pattern may be independently configured in FDD and TDD. For example, the subframe pattern may be indicated by a 40-bit bit sequence in FDD and indicated by a 20-bit bit sequence in TDD and the subframe configurations (TDD UL/DL configurations) 1 to 5. The subframe pattern may be indicated by a 70-biy bit sequence in the subframe configuration 0, and indicated by a 60-bit bit sequence in the subframe configuration 6. The first bit or a left-end bit of the bit sequence corresponds to the subframe #0 of a radio frame which satisfies a system frame number (SFN) mod x=0. A subframe in which "1" is set in the bit sequence is used. For example, in a case where "1011000011" (in a case where the left end indicates the subframe #0) or "1100001101" (in a case where the right end indicates the subframe #0) is indicated in a 10-bit bit sequence, the subframes #0, #2, #3, #8, and #9 are used.

In the embodiment of the present invention, the TDD UL/DL configuration may be transmitted (notified, transferred) to the terminal device 2 from the base station apparatus 1. Notification of the TDD UL/DL configuration may be performed by SIB1. The notification of the TDD UL/DL configuration may be performed by using a SIB different from SIB1. The notification of the TDD UL/DL configuration may be performed by higher layer signaling (RRC signaling, RRC message). The base station apparatus 1 may notify the terminal device 2 which performs communication by using a plurality of TDD UL/DL configurations, of the TDD UL/DL configuration by L1 signaling or L2 signaling. The base station apparatus 1 may notify the terminal device 2 which performs communication by using a plurality of TDD UL/DL configurations, of the TDD UL/DL configuration by using a DCI format, a PDCCH/EPDCCH, or a MAC CE.

In the embodiment of the present invention, the virtual UL/DL configuration is transmitted (notified, transferred) to the terminal device 2 from the base station apparatus 1. Notification of the virtual UL/DL configuration may be performed by SIB1. The notification of the virtual UL/DL configuration may be performed by using a SIB different from SIB1. The notification of the virtual UL/DL configuration may be performed by higher layer signaling (RRC signaling, RRC message). The base station apparatus 1 may notify the terminal device 2 which performs communication by using a plurality of virtual UL/DL configurations, of the virtual UL/DL configuration by L1 signaling (DCI format, PDCCH/EPDCCH) or L2 signaling (MAC CE). The base station apparatus 1 may notify the terminal device 2 which performs communication by using a plurality of virtual UL/DL configurations, of the virtual UL/DL configuration by using a DCI format, a PDCCH/EPDCCH, or a MAC CE.

In the embodiment of the present invention, in a case where a plurality of TDD UL/DL configurations is set, one TDD UL/DL configuration is used as an uplink reference, and one TDD UL/DL configuration is used as a downlink reference. The TDD UL/DL configuration configured as the uplink reference is used for performing processing relating to uplink transmission/reception at a transmission timing of a PUSCH, a reception timing of a PHICH in response to the PUSCH, a reception timing of an uplink grant, and the like. The TDD UL/DL configuration configured as the downlink reference is used for performing processing relating to downlink transmission/reception at a reception (monitoring) timing of a PDCCH/EPDCCH/PDSCH, a reception timing of a downlink grant, a transmission timing of a PUCCH having HARQ-ACK, and the like.

In the embodiment of the present invention, in a case where a plurality of TDD UL/DL configurations (UL/DL configurations) is set for the primary cell, each subframe pattern in the primary cell may be determined based on the TDD UL/DL configuration of which a notification is performed by SIB1. Each subframe pattern in the primary cell may be determined based on the TDD UL/DL configuration of which a notification is performed by higher layer signaling (RRC signaling, RRC message). The subframe pattern in the primary cell may be determined based on the TDD UL/DL configuration of which a notification is performed by L1 signaling (downlink grant, uplink grant, PDCCH/EPDCCH, DCI format). The subframe pattern in the primary cell may be determined based on the TDD UL/DL configuration of which a notification is performed by L2 signaling (MAC CE). The subframe pattern in the primary cell may be determined based on the TDD UL/DL configuration used as the uplink reference (uplink reference UL/DL configuration). The subframe pattern in the primary cell may be determined based on the TDD UL/DL configuration used as the downlink reference (downlink reference UL/DL configuration). The subframe pattern in the primary cell may be determined based on the common TDD UL/DL configuration. The subframe pattern in the primary cell may be independently determined. For example, a subframe pattern for measuring a primary cell may be determined based on the TDD UL/DL configuration of which a notification is performed by SIB1. A subframe pattern for monitoring an EPDCCH may be determined based on the TDD UL/DL configuration of which a notification is performed by higher layer signaling (RRC signaling, RRC message). The subframe pattern for measuring a primary cell may be determined based on the TDD UL/DL configuration of which a notification is performed by SIB1, and a subframe pattern for measuring a CSI may be determined based on L1 signaling. Specifically, the subframe pattern for measuring a primary cell may be determined based on a bit sequence corresponding to the subframe configuration (TDD UL/DL configuration) 0. The subframe pattern monitoring an EPDCCH may be determined based on the subframe configuration (TDD UL/DL configuration) 3. The subframe pattern for measuring a CSI may be determined based on the subframe configuration (TDD UL/DL configuration) 6. The value of the subframe configuration (TDD UL/DL configuration) is only an example, and may be a different value.

In the embodiment of the present invention, in a case where a plurality of TDD UL/DL configurations (UL/DL configurations) is set for the secondary cell, a subframe pattern in the secondary cell may be determined based on the TDD UL/DL configuration of which the secondary cell is notified by system information. The subframe pattern in the secondary cell may be determined based on the TDD UL/DL configuration of which a notification is performed by higher layer signaling (RRC signaling, RRC message). The subframe pattern in the secondary cell may be determined based on the TDD UL/DL configuration of which a notification is performed by L1 signaling (downlink grant, uplink grant, PDCCH/EPDCCH, DCI format). The subframe pattern in the secondary cell may be determined based on the TDD UL/DL configuration of which a notification is performed by L2 signaling (MAC CE). The subframe pattern in the secondary cell may be determined based on the TDD UL/DL configuration used as the uplink reference (uplink reference UL/DL configuration). The subframe pattern in the secondary cell may be determined based on the TDD UL/DL configuration used as the downlink reference (downlink reference UL/DL configuration). In a case where a subframe pattern for measuring a CSI is configured so as to be independent from that of the primary cell, the subframe pattern for measuring a CSI in the secondary cell may be determined so as to be independent from that of the primary cell.

In the embodiment of the present invention, in a case where a plurality of TDD UL/DL configurations (UL/DL configurations) is set for each of the primary cell and the secondary cell, each subframe pattern in each of the primary cell and the secondary cell may be determined based on the common TDD UL/DL configuration. For example, the common TDD UL/DL configuration may be a TDD UL/DL configuration of which a notification is performed by SIB1, a TDD UL/DL configuration of which a notification is performed by higher layer signaling, or a TDD UL/DL configuration of which a notification is performed by L1/L2 signaling. The common TDD UL/DL configuration may be a TDD UL/DL configuration (uplink reference UL/DL configuration) configured as an uplink reference or a TDD UL/DL configuration (downlink reference UL/DL configuration) configured as a downlink reference. Each subframe pattern in each of the primary cell and the secondary cell may be independently determined. For example, the subframe pattern in the primary cell may be determined based on the TDD UL/DL configuration of which a notification is performed by SIB1, and the subframe pattern in the secondary cell may be determined based on the TDD UL/DL configuration of which a notification is performed by L1/L2 signaling. The subframe pattern in the primary cell may be determined based on the TDD UL/DL configuration configured as an uplink reference, and the subframe pattern in the secondary cell may be determined based on the TDD UL/DL configuration configured as a downlink reference.

In the embodiment of the present invention, in a case where a plurality of TDD UL/DL configurations (UL/DL configurations) is set for each of the primary cell and the secondary cell, a notification of the uplink reference UL/DL configuration of the primary cell may be performed by SIB1 (or system information other than SIB1). The notification of the uplink reference UL/DL configuration of the primary cell may be performed by higher layer signaling (RRC signaling, RRC message). The notification of the uplink reference UL/DL configuration of the primary cell may be performed by higher layer signaling (RRC signaling, RRC message) which is common between terminal device or is dedicated for a terminal device. The notification of the uplink reference UL/DL configuration of the primary cell may be performed by L1/L2 signaling. A notification of the downlink reference UL/DL configuration of the primary cell may be performed by using a method similar to the methods described for the uplink reference UL/DL configuration of the primary cell. The uplink reference UL/DL configuration and the downlink reference UL/DL configuration of the primary cell may be configured as independent parameters.

In the embodiment of the present invention, in a case where a plurality of TDD UL/DL configurations (UL/DL configurations) is set for each of the primary cell and the secondary cell, a notification of the uplink reference UL/DL configuration of the secondary cell may be performed by higher layer signaling (RRC signaling, RRC message) corresponding to system information. The notification of the uplink reference UL/DL configuration of the secondary cell may be performed by higher layer signaling (RRC signaling, RRC message) which does not correspond to the system information, and is common between terminal devices or dedicated for a terminal device. The notification of the uplink reference UL/DL configuration of the secondary cell may be performed by L1/L2 signaling. A notification of the downlink reference UL/DL configuration of the secondary cell may be performed by using a method similar to the methods described for the uplink reference UL/DL configuration of the secondary cell. The uplink reference UL/DL configuration and the downlink reference UL/DL configuration of the secondary cell may be configured as independent parameters.

In the embodiment of the present invention, the downlink reference UL/DL configuration (TDD UL/DL configuration) for a serving cell is determined based on the TDD UL/DL configuration of the primary cell and the TDD UL/DL configuration of the secondary cell.

In the embodiment of the present invention, in a case where a plurality of TDD UL/DL configurations (UL/DL configurations) is set for each of the primary cell and the secondary cell, the downlink reference UL/DL configuration for a serving cell may be determined as the TDD UL/DL configuration for notifying the primary cell by using SIB1, or as the TDD UL/DL configuration for notifying the secondary cell by higher layer signaling. The downlink reference UL/DL configuration for the serving cell may be determined as the TDD UL/DL configuration obtained by performing a notification of a UL/DL configuration of the primary cell by SIB1, or as the TDD UL/DL configuration obtained by performing a notification of a UL/DL configuration of the secondary cell by L1 signaling. The downlink reference UL/DL configuration for the serving cell may be determined by setting the UL/DL configuration of the primary cell as a downlink reference UL/DL configuration, and by setting the UL/DL configuration of the secondary cell as a downlink reference UL/DL configuration. The downlink reference UL/DL configuration for the serving cell may be determined by setting the UL/DL configuration of the primary cell as a downlink reference UL/DL configuration, and by setting the UL/DL configuration of the secondary cell as an uplink reference TDD UL/DL configuration. The downlink reference UL/DL configuration for the serving cell may be determined by setting the UL/DL configuration of the primary cell as an uplink reference TDD UL/DL configuration, and by setting the UL/DL configuration of the secondary cell as a downlink reference TDD UL/DL configuration. The UL/DL configurations of the primary cell and the secondary cell are only an example, and may be TDD UL/DL configurations of which a notification is performed, in accordance with other conditions.

In the embodiment of the present invention, the uplink reference UL/DL configuration (TDD UL/DL configuration) for the serving cell is determined based on the TDD UL/DL configuration of a certain serving cell and the TDD UL/DL configuration of another serving cell.

In the embodiment of the present invention, in a case where a plurality of TDD UL/DL configurations (UL/DL configurations) is set for each of a plurality of serving cells, uplink reference UL/DL configurations for a serving cell may be determined by setting a TDD UL/DL configuration of which a notification is performed by SIB1, for a certain serving cell, and by setting a TDD UL/DL configuration of which a notification is performed by higher layer signaling, for another serving cell. The uplink reference UL/DL configurations for the serving cell may be determined by setting the UL/DL configuration of a certain serving cell as a TDD UL/DL configuration of which a notification is performed by SIB1, and by setting the UL/DL configuration of another serving cell as a TDD UL/DL configuration of which a notification is performed by L1 signaling. The uplink reference UL/DL configurations for the serving cell may be determined by setting the UL/DL configuration of a certain serving cell as an uplink reference UL/DL configuration, and by setting the UL/DL configuration of another serving cell as an uplink reference UL/DL configuration. The uplink reference UL/DL configurations for the serving cell may be determined by setting the UL/DL configuration of a certain serving cell as an uplink reference UL/DL configuration, and by setting the UL/DL configuration of another serving cell as a downlink reference UL/DL configuration. The TDD UL/DL configurations of the plurality of serving cells are only an example, and may be TDD UL/DL configurations of which a notification is performed, in accordance with other conditions.

In the embodiment of the present invention, in a case where a plurality of TDD UL/DL configurations (UL/DL configurations) is set for each of a plurality of serving cells (primary cell and secondary cell), and cross carrier scheduling is performed, downlink transmission/reception processing in the primary cell is performed based on the UL/DL configuration for the serving cell. Uplink transmission/reception processing in the primary cell is performed based on the UL/DL configuration for the serving cell. The uplink transmission/reception processing in the primary cell is performed based on the uplink reference UL/DL configuration for the serving cell. In this case, if a downlink grant for the secondary cell is detected in the primary cell, downlink reception (PDSCH reception) of the secondary cell is performed based on the downlink reference UL/DL configuration for the serving cell. HARQ-ACK in response to downlink reception of the secondary cell is transmitted on a PUCCH of the primary cell. At this time, the PUCCH is transmitted based on the downlink reference UL/DL configuration for the serving cell. In this case, if an uplink grant for the secondary cell is detected in the primary cell, uplink transmission (for example, PUSCH reception) of the secondary cell is performed based on the uplink reference UL/DL configuration for the serving cell. A PHICH in response to uplink transmission of the secondary cell is transmitted in the primary cell. At this time, the PHICH is transmitted based on the uplink reference UL/DL configuration for the serving cell. That is, in this case, the terminal device 2 and the base station apparatus 1 perform transmission/reception of an uplink/downlink based on the uplink reference UL/DL configuration and the downlink reference UL/DL configuration. In this case, the terminal device 2 is determined by PHICH resources of the serving cell c in a subframe $(n+k_{PHICH})$, in response to PUSCH transmission (for a serving cell c or a cell different from the serving cell c) which is scheduled in the subframe n by the serving cell c. $k_{PHICH}$ is determined based on the uplink reference UL/DL configuration for the serving cell. In this case, if a PUSCH (for a serving cell c or a cell different from the serving cell c) which is scheduled from the serving cell c in the subframe n is received, the base station apparatus 1 transmits HARQ-ACK in response to the PUSCH, by using the PHICH resources of the serving cell c in a subframe $(n+k_{PHICH})$.

In the embodiment of the present invention, in a case where a plurality of TDD UL/DL configurations (UL/DL configurations) is set for an adjacent cell, a subframe pattern in the adjacent cell may be determined based on a TDD UL/DL configuration of which the adjacent cell is notified by system information. The subframe pattern in the adjacent cell may be determined based on a TDD UL/DL configuration of which a notification is performed by higher layer signaling (RRC signaling, RRC message). The subframe pattern in the adjacent cell may be determined based on a TDD UL/DL configuration of which a notification is performed by higher layer signaling (RRC signaling, RRC message) which is common between terminal device or is dedicated for a terminal device. The subframe pattern in the adjacent cell may be determined based on a TDD UL/DL configuration of which a notification is performed by L1 signaling (downlink grant, uplink grant, PDCCH/EPDCCH, DCI format). The subframe pattern in the adjacent cell may be determined based on a TDD UL/DL configuration of which a notification is performed by L2 signaling (MAC CE). The subframe pattern in the adjacent cell may be determined based on a TDD UL/DL configuration (uplink reference UL/DL configuration) configured as an uplink reference. The subframe pattern in the adjacent cell may be determined based on a TDD UL/DL configuration (downlink reference UL/DL configuration) configured as a downlink reference.

In the embodiment of the present invention, the descriptions are made by using a resource element or a resource block as a mapping unit of various uplink signals or various downlink signals, and by using a symbol, a subframe, or a radio frame as a transmission unit in the time direction. However, it is not limited thereto. Similar effects may be also obtained by using a region unit and a time unit configured by an arbitrary frequency and time instead of the above-described units. In the embodiment of the present invention, a case where demodulation is performed by using a RS subjected to precoding processing is described. Furthermore, the descriptions are made by using a port which is equivalent to the layer of MIMO, as a port (antenna port) corresponding to the RS subjected to the precoding processing. However, it is not limited thereto. In addition, the present invention is applied to ports corresponding to reference signals which are different from each other, and thus similar effects may be obtained. For example, as the port, a port which is equivalent to an output end after precoding is processed, or a port which is equivalent to a physical antenna (or combination of physical antennae) may be used by using Unprecoded (Nonprecoded) RS, not Precoded RS.

In the embodiment of the present invention, in a case where only DCI format 3/3A is received in a certain downlink subframe, a correction value (or absolute value) corresponding to a value set in the TPC command field which is included in DCI format 3/3A is applied to the power control adjustment value for the transmission power of a PUSCH which is transmitted in a specific subframe set, regardless of which subframe set the downlink subframe belongs to. In a case where only DCI format 3/3A is received in a certain downlink subframe, the accumulation of TPC commands included in DCI format 3/3A may be applied to the power control adjustment value for the transmission power of a PUSCH which is transmitted in a specific subframe set. The specific subframe set may be a set of fixation subframes, a set of flexible subframes, or a set of arbitrary subframes.

In the embodiment of the present invention, the parameter relating to the uplink power control corresponds to the parameter used in the transmission power control of the uplink physical channel/physical signal (PUSCH, PUCCH, PRACH, SRS, DMRS, and the like). The parameter used in the transmission power control includes information regarding switching or (re)configuring of various parameters which are used in configuring transmission power of various uplink physical channels. The parameter relating to the downlink transmission power control corresponds to the parameter used in the transmission power control of the downlink physical channel/physical signal (CRS, UERS (DL DMRS), CSI-RS, PDSCH, PDCCH/EPDCCH, PBCH, PSS/SSS, PMCH, PRS, and the like). The parameter used in the transmission power control includes information regarding switching or (re)configuring of various parameters which are used in configuring transmission power of various downlink physical channels.

In the embodiment of the present invention, the base station apparatus 1 may configure a plurality of virtual cells ID for one terminal device 2. For example, the base station apparatus 1 and a network including at least one base station apparatus 1 may configure independently virtual cells ID for each physical channel/physical signal. A plurality of virtual cells ID for one physical channel/physical signal may be configured. That is, the virtual cell ID may be set for each configuration of the physical channel/physical signal. The virtual cell ID may be shared between a plurality of physical channels/physical signals.

In the descriptions of the embodiment of the present invention, for example, a case of setting power includes a case where a value of the power is set. The case of setting power includes a case where a value is set in a parameter relating to the power. A case of calculating power includes a case where the value of the power is calculated, and a case of measuring power includes a case where the value of the power is measured. A case of reporting power includes a case where the value of the power is reported. In this manner, the expression of the power appropriately includes the meaning of the value of the power.

In the descriptions of the embodiment of the present invention, a case where transmission is not performed includes a case where transmission processing is not performed. The case where transmission is not performed includes a case where a signal for transmission is not generated. The case where transmission is not performed includes a case where a signal (or information) is generated, but the generated signal (or information) is not transmitted. A case where reception is not performed includes a case where reception processing is not performed. The case where reception is not performed includes a case where detection processing is not performed. The case where reception is not performed includes a case where decoding or demodulation processing is not performed.

In the descriptions of the embodiment of the present invention, for example, a case of calculating the pathloss includes a case where the value of the pathloss is calculated. In this manner, the expression of the pathloss appropriately includes the meaning of the value of the pathloss.

In the descriptions of the embodiment of the present invention, a case of configuring various parameters includes a case where values of the various parameters are configured. In this manner, the expression of various parameters appropriately includes the meaning of the value of the various parameters.

The present invention may include the following features with the above descriptions.

(1) According to a first aspect of the present invention, there is provided a terminal device which communicates with a base station apparatus. The terminal device includes a transmission unit that sets transmission power for transmission of a physical uplink shared channel (PUSCH) in a subframe i, in a certain serving cell. The transmission unit sets the transmission power for the transmission of the PUSCH, by using a value which is obtained by a transmission power control (TPC) command included in a physical downlink control channel (PDCCH) which is received in a subframe (i-$K_{PUSCH}$). A value of $K_{PUSCH}$ for a serving cell of frame structure type 1 is 4. The value of $K_{PUSCH}$ is given in accordance with an uplink reference UL/DL configuration for a serving cell of frame structure type 2. In a case where a PDCCH for the serving cell of the frame structure type 2 is monitored in the serving cell of the frame structure type 1, the uplink reference UL/DL configuration for the serving cell of the frame structure type 2 corresponds to a UL/DL configuration for the serving cell of the frame structure type 2.

(2) According to a second aspect of the present invention, in the above-mentioned terminal device, in a case where the UL/DL configuration for the serving cell of the frame structure type 2 is 0, and a UL index is included in the PDCCH, the value of $K_{PUSCH}$ is specified based on a value of the UL index.

(3) According to a third aspect of the present invention, in the above-mentioned terminal device, in a case where a specific radio network temporary identifier (RNTI) is configured for at least one serving cell, the value of KPUSCH is specified based on the uplink reference UL/DL configuration for the serving cell of the frame structure type 2.

(4) According to a fourth aspect of the present invention, in the above-mentioned terminal device, a downlink control information (DCI) format included in the PDCCH is constituted based on the serving cell of the frame structure type 2.

(5) According to a fifth aspect of the present invention, there is provided a base station apparatus which communicates with a terminal device. The base station apparatus includes a transmission unit that transmits a physical downlink control channel (PDCCH) including a transmission power control (TPC) command to a certain serving cell in a subframe (i-$K_{PUSCH}$), and performs scheduling of transmission of the PUSCH in the subframe i for the serving cell. A value of $K_{PUSCH}$ for a serving cell of frame structure type 1 is 4. The value of $K_{PUSCH}$ is given in accordance with an uplink reference UL/DL configuration for a serving cell of frame structure type 2. In a case where a PDCCH for the serving cell of the frame structure type 2 is monitored in the serving cell of the frame structure type 1, the uplink reference UL/DL configuration for the serving cell of the frame structure type 2 corresponds to a UL/DL configuration for the serving cell of the frame structure type 2.

(6) According to a sixth aspect of the present invention, there is provided a method in a terminal device which communicates with a base station apparatus. The method includes a step of setting transmission power for transmission of a physical uplink shared channel (PUSCH) in a subframe i, in a certain serving cell, and a step of setting the transmission power for the transmission of the PUSCH, by using a value which is obtained by a transmission power control (TPC) command included in a physical downlink control channel (PDCCH) which is received in a subframe (i-$K_{PUSCH}$). A value of $K_{PUSCH}$ for a serving cell of frame structure type 1 is 4. The value of $K_{PUSCH}$ is given in accordance with an uplink reference UL/DL configuration for a serving cell of frame structure type 2. In a case where a PDCCH for the serving cell of the frame structure type 2 is monitored in the serving cell of the frame structure type 1, the uplink reference UL/DL configuration for the serving cell of the frame structure type 2 corresponds to a UL/DL configuration for the serving cell of the frame structure type 2.

(7) According to a seventh of the present invention, the above-mentioned method further includes a step of specifying the value of $K_{PUSCH}$ based on a value of a UL index, in a case where the UL/DL configuration for the serving cell of the frame structure type 2 is 0, and the UL index is included in the PDCCH.

(8) According to an eighth of the present invention, the above-mentioned method further includes a step of specifying the value of $K_{PUSCH}$ based on the uplink reference UL/DL configuration for the serving cell of the frame structure type 2, in a case where a specific radio network temporary identifier (RNTI) is configured for at least one serving cell.

According to the present invention, programs operated in the base station apparatus 1 and the terminal device 2 correspond to a program of controlling a CPU and the like (program of causing a computer to perform functions), so as to realize the functions in the embodiment according to the present invention. Pieces of information handled in the base station apparatus 1 and the terminal device 2 are temporarily accumulated in a RAM during the processing, and then, the pieces of information are stored in various ROMs or various HDDs. The stored pieces of information are read by the CPU, if necessary, and modification and writing is performed. As a recoding medium of storing the program, any of a semiconductor medium (for example, ROM, non-volatile memory card, and the like), an optical recording medium (for example, DVD, MO, MD, CD, BD, and the like), a magnetic recording medium (for example, magnetic tape, flexible disc, and the like), and the like may be used. The loaded program is executed, and thus the above-described functions of the embodiment are performed, and an operating system, other applications, or the like are processed together, based on an instruction of the program. Thus, the functions according to the present invention may be realized.

In a case where distribution to markets is performed, the program may be stored in a portable recoding medium and be distributed, or may be transmitted to a server computer connected through a network such as the Internet. In this case, the present invention also includes a recording device of the server computer. In the above-described embodiment, some or all of components of the base station apparatus 1 and the terminal device 2 may be realized as a LSI which is a typical integrated circuit. Function blocks of the base station apparatus 1 and the terminal device 2 may be individually formed as a form of the chip. Some or all of the function blocks may be integrated so as to be formed as a form of the chip. A method of integration of circuits is not limited to the LSI, and may be realized as a dedicated circuit or a public processor. In a case where the progress of the semiconductor technology causes a technology of integration of circuits, which substitute the LSI to be expressed, an integrated circuit obtained by using the expressed technology may be used.

Hitherto, the embodiment according to the invention is described in detail with reference to the drawings. However, the specific configuration is not limited to the embodiment, and includes design modification and the like in a range without departing from the gist of the invention. The present invention may be changed in a scope described in the claims, and an embodiment obtained by appropriately combining technological means disclosed in different embodiments is also included in the technological scope of the present invention. The components are components described in the embodiment of the present invention, and a configuration obtained by substituting components of exhibiting similar effects with each other is also included.

This application invention is not limited to the above-described embodiment. This application invention may be applied to a general portable terminal. For example, the portable terminal includes a tablet, camera equipment, and the like. That is, this application invention is applied to the apparatus and the device in this application invention, or to general equipment having a chip or a program mounted therein. The terminal device in this application invention is not limited to application to a mobile station, and may be applied to a stationary type electronic apparatus or a non-movable electronic apparatus which is installed indoor or outdoor. Examples of such an electronic apparatus include AV devices, kitchen utensils, cleaning or washing devices, an air-conditioning device, business appliances, vending machines, other domestic appliances. The present invention is preferably used in a radio base station apparatus, a radio terminal device, a radio communication system, or a radio communication method.

REFERENCE SIGNS LIST

1 BASE STATION APPARATUS
2 TERMINAL DEVICE
101 HIGHER LAYER PROCESSING UNIT
103 CONTROL UNIT
105 RECEPTION UNIT
107 TRANSMISSION UNIT
109 CHANNEL MEASUREMENT UNIT
111 TRANSMIT/RECEIVE ANTENNA
1051 DECODING PORTION
1053 DEMODULATION PORTION
1055 DEMULTIPLEXING PORTION
1057 RADIO RECEPTION PORTION
1071 CODING PORTION
1073 MODULATION PORTION
1075 MULTIPLEXING PORTION
1077 RADIO TRANSMISSION PORTION
1079 DOWNLINK REFERENCE SIGNAL GENERATION PORTION
201 HIGHER LAYER PROCESSING UNIT
203 CONTROL UNIT
205 RECEPTION UNIT
207 TRANSMISSION UNIT
209 CHANNEL MEASUREMENT UNIT
211 TRANSMIT/RECEIVE ANTENNA
2051 DECODING PORTION
2053 DEMODULATION PORTION
2055 DEMULTIPLEXING PORTION
2057 RADIO RECEPTION PORTION
2071 CODING PORTION
2073 MODULATION PORTION
2075 MULTIPLEXING PORTION
2077 RADIO TRANSMISSION PORTION
2079 UPLINK REFERENCE SIGNAL GENERATION PORTION

The invention claimed is:

1. A terminal device comprising:
a reception circuitry that receives a physical downlink control channel (PDCCH), and
a transmission circuitry that sets transmitted power for transmission of a physical uplink shared channel (PUSCH) in a subframe i, in a certain serving cell,
wherein
the transmission circuitry sets the transmission power for the transmission of the PUSCH, by using a value which is obtained by a transmission power control (TPC) command included in a PDCCH which is received in a subframe (i-$K_{PUSCH}$),
a value of $K_{PUSCH}$ for a serving cell of frame structure type 1 is 4,
the value of $K_{PUSCH}$ for a serving cell of frame structure type 2 is given in accordance with an uplink reference UL/DL configuration, and
in a case where a PDCCH for the serving cell of the frame structure type 2 is monitored in the serving cell of the frame structure type 1, the uplink reference UL/DL configuration for the serving cell of the frame structure type 2 corresponds to a UL/DL configuration for the serving cell of the frame structure type 2.

2. The terminal device according to claim 1, wherein in a case where the UL/DL configuration for the serving cell of the frame structure type 2 is 0, and a UL index is included in the PDCCH, the value of $K_{PUSCH}$ is specified based on a value of the UL index.

3. The terminal device according to claim 1, wherein in a case where a specific radio network temporary identifier (RNTI) is configured for at least one serving cell, the value of KPUSCH is specified based on the uplink reference UL/DL configuration for the serving cell of the frame structure type 2.

4. The terminal device according to claim 1, wherein a downlink control information (DCI) format included in the PDCCH is constituted based on the serving cell of the frame structure type 2.

5. A base station apparatus comprising:
a reception circuitry that receives a physical uplink shared channel (PUSCH), and
a transmission circuitry that transmits a physical downlink control channel (PDCCH) including a transmission power control (TPC) command to a certain serving cell in a subframe (i-$K_{PUSCH}$), and performs scheduling of transmission of the PUSCH in the subframe i for the serving cell,
wherein
a value of $K_{PUSCH}$ for a serving cell of frame structure type 1 is 4,
the value of $K_{PUSCH}$ for a serving cell of frame structure type 2 is given in accordance with an uplink reference UL/DL configuration, and
in a case where a PDCCH for the serving cell of the frame structure type 2 is monitored in the serving cell of the frame structure type 1, the uplink reference UL/DL configuration for the serving cell of the frame structure type 2 corresponds to a UL/DL configuration for the serving cell of the frame structure type 2.

6. A method in a terminal device which communicates with a base station apparatus, the method comprising:
receiving a physical downlink control channel,
setting transmitted power for transmission of a physical uplink shared channel (PUSCH) in a subframe i, in a certain serving cell, and
setting the transmitted power for the transmission of the PUSCH, by using a value which is obtained by a transmission power control (TPC) command included in a physical downlink control channel (PDCCH) which is received in a subframe (i-$K_{PUSCH}$), wherein
a value of $K_{PUSCH}$ for a serving cell of frame structure type 1 is 4,
the value of $K_{PUSCH}$ for a serving cell of frame structure type 2 is given in accordance with an uplink reference UL/DL configuration, and
in a case where a PDCCH for the serving cell of the frame structure type 2 is monitored in the serving cell of the frame structure type 1, the uplink reference UL/DL configuration for the serving cell of the frame structure type 2 corresponds to a UL/DL configuration for the serving cell of the frame structure type 2.

7. The method according to claim 6, further comprising:
a step of specifying the value of $K_{PUSCH}$ based on a value of a UL index, in a case where the UL/DL configuration for the serving cell of the frame structure type 2 is 0, and the UL index is included in the PDCCH.

8. The method according to claim 6, further comprising:
a step of specifying the value of $K_{PUSCH}$ based on the uplink reference UL/DL configuration for the serving cell of the frame structure type 2, in a case where a specific radio network temporary identifier (RNTI) is configured for at least one serving cell.

\* \* \* \* \*